(12) United States Patent
Kitazato et al.

(10) Patent No.: US 11,206,457 B2
(45) Date of Patent: *Dec. 21, 2021

(54) RECEPTION APPARATUS, RECEPTION METHOD, TRANSMISSION APPARATUS, AND TRANSMISSION METHOD

(71) Applicant: Saturn Licensing LLC, New York, NY (US)

(72) Inventors: Naohisa Kitazato, Tokyo (JP); Yasuaki Yamagishi, Kanagawa (JP); Yoshiharu Dewa, Tokyo (JP); Jun Kitahara, Saitama (JP); Mark Eyer, Woodinville, WA (US)

(73) Assignee: Saturn Licensing LLC, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/854,602

(22) Filed: Dec. 26, 2017

(65) Prior Publication Data

US 2018/0124465 A1 May 3, 2018

Related U.S. Application Data

(63) Continuation of application No. 13/777,429, filed on Feb. 26, 2013, now Pat. No. 9,883,247.
(Continued)

(51) Int. Cl.
*H04N 21/478* (2011.01)
*H04N 5/44* (2011.01)
(Continued)

(52) U.S. Cl.
CPC ............ *H04N 21/478* (2013.01); *H04N 5/38* (2013.01); *H04N 5/44* (2013.01);
(Continued)

(58) Field of Classification Search
CPC .......... H04N 21/478; H04N 21/23617; H04N 21/2362; H04N 21/4307; H04N 21/4345;
(Continued)

(56) References Cited

U.S. PATENT DOCUMENTS 7,702,760 B2 4/2010 Latvakoski et al.
2001/0049720 A1 12/2001 Eyer
(Continued)

FOREIGN PATENT DOCUMENTS

CN 1738419 2/2006
JP 2005-510145 A 4/2005
(Continued)

OTHER PUBLICATIONS

International Search Report dated Oct. 8, 2013 in PCT/JP2013/070591 (with English language translation).
(Continued)

*Primary Examiner* — Michael E Teitelbaum
(74) *Attorney, Agent, or Firm* — Oblon, McClelland, Maier & Neustadt, L.L.P.

(57) ABSTRACT

A reception apparatus, including circuitry configured to receive a content including at least one of audio content or video content, extract fingerprint information from data of the content, and provide the fingerprint information to a first server via a communication network. The circuitry is further configured to receive control information in response to providing the fingerprint information to the first server.

19 Claims, 46 Drawing Sheets

Related U.S. Application Data

(60) Provisional application No. 61/682,566, filed on Aug. 13, 2012.

(51) Int. Cl.

| | | |
|---|---|---|
| *H04N 5/38* | (2006.01) | |
| *H04N 21/236* | (2011.01) | |
| *H04N 21/2362* | (2011.01) | |
| *H04N 21/43* | (2011.01) | |
| *H04N 21/434* | (2011.01) | |
| *H04N 21/488* | (2011.01) | |
| *H04N 21/858* | (2011.01) | |

(52) U.S. Cl.
CPC ... *H04N 21/2362* (2013.01); *H04N 21/23617* (2013.01); *H04N 21/4307* (2013.01); *H04N 21/4345* (2013.01); *H04N 21/4349* (2013.01); *H04N 21/4884* (2013.01); *H04N 21/8586* (2013.01)

(58) Field of Classification Search
CPC ........... H04N 21/4349; H04N 21/4884; H04N 21/8586; H04N 5/38; H04N 5/44
See application file for complete search history.

(56) References Cited

U.S. PATENT DOCUMENTS

| | | | |
|---|---|---|---|
| 2002/0188958 A1 | 12/2002 | Miller | |
| 2003/0051252 A1 | 3/2003 | Miyaoku et al. | |
| 2003/0065738 A1 | 4/2003 | Yang et al. | |
| 2004/0237102 A1* | 11/2004 | Konig | G06Q 30/02 725/36 |
| 2005/0015802 A1 | 1/2005 | Masson | |
| 2006/0194535 A1 | 8/2006 | Houldsworth et al. | |
| 2007/0204293 A1 | 8/2007 | Hamada | |
| 2009/0213270 A1 | 8/2009 | Ismert et al. | |
| 2009/0320066 A1 | 12/2009 | Soldan et al. | |
| 2011/0075990 A1 | 3/2011 | Eyer | |
| 2011/0088075 A1 | 4/2011 | Eyer | |
| 2011/0243536 A1 | 10/2011 | Eyer | |
| 2011/0246488 A1 | 10/2011 | Eyer | |
| 2011/0247028 A1 | 10/2011 | Eyer | |
| 2011/0298981 A1 | 12/2011 | Eyer | |
| 2011/0299827 A1 | 12/2011 | Eyer | |
| 2011/0302599 A1 | 12/2011 | Eyer | |
| 2011/0302611 A1 | 12/2011 | Eyer | |
| 2011/0307920 A1 | 12/2011 | Blanchard et al. | |
| 2012/0044418 A1 | 2/2012 | Eyer | |
| 2012/0047531 A1 | 2/2012 | Eyer | |
| 2012/0050619 A1 | 3/2012 | Kitazato et al. | |
| 2012/0050620 A1 | 3/2012 | Kitazato | |
| 2012/0054214 A1 | 3/2012 | Yamagishi et al. | |
| 2012/0054235 A1 | 3/2012 | Kitazato et al. | |
| 2012/0054267 A1 | 3/2012 | Yamagishi et al. | |
| 2012/0054268 A1 | 3/2012 | Yamagishi | |
| 2012/0054783 A1 | 3/2012 | Yamagishi | |
| 2012/0054784 A1 | 3/2012 | Kitazato et al. | |
| 2012/0054816 A1 | 3/2012 | Dewa | |
| 2012/0060197 A1 | 3/2012 | Kitahara et al. | |
| 2012/0063508 A1 | 3/2012 | Hattori et al. | |
| 2012/0072965 A1 | 3/2012 | Dewa | |
| 2012/0081508 A1 | 4/2012 | Kitazato | |
| 2012/0081607 A1 | 4/2012 | Kitazato | |
| 2012/0082266 A1 | 4/2012 | Kitazato et al. | |
| 2012/0082440 A1 | 4/2012 | Kitazato | |
| 2012/0084802 A1 | 4/2012 | Kitazato | |
| 2012/0084824 A1 | 4/2012 | Kitazato | |
| 2012/0084829 A1 | 4/2012 | Kitazato | |
| 2012/0185888 A1 | 7/2012 | Eyer et al. | |
| 2012/0253826 A1 | 10/2012 | Kitazato et al. | |
| 2012/0274848 A1 | 11/2012 | Kitahara et al. | |
| 2012/0275764 A1 | 11/2012 | Eyer | |
| 2013/0024894 A1 | 1/2013 | Eyer | |
| 2013/0024897 A1 | 1/2013 | Eyer | |
| 2013/0031569 A1 | 1/2013 | Eyer | |
| 2013/0036440 A1 | 2/2013 | Eyer | |
| 2013/0047178 A1* | 2/2013 | Moon | H04N 21/4122 725/25 |
| 2013/0055313 A1 | 2/2013 | Eyer | |
| 2013/0103716 A1 | 4/2013 | Yamagishi | |
| 2013/0145414 A1 | 6/2013 | Yamagishi | |
| 2013/0167171 A1 | 6/2013 | Kitazato et al. | |
| 2013/0191860 A1 | 7/2013 | Kitazato et al. | |
| 2013/0198768 A1 | 8/2013 | Kitazato | |
| 2013/0201399 A1 | 8/2013 | Kitazato et al. | |
| 2013/0205327 A1 | 8/2013 | Eyer | |
| 2013/0212634 A1 | 8/2013 | Kitazato | |
| 2013/0215327 A1 | 8/2013 | Kitazato et al. | |
| 2013/0250173 A1 | 9/2013 | Eyer | |
| 2013/0254824 A1 | 9/2013 | Eyer | |
| 2013/0258191 A1 | 10/2013 | Eyer | |
| 2013/0282870 A1 | 10/2013 | Dewa et al. | |
| 2013/0283311 A1 | 10/2013 | Eyer | |
| 2013/0283328 A1 | 10/2013 | Kitazato | |
| 2013/0291022 A1 | 10/2013 | Eyer | |
| 2013/0291049 A1 | 10/2013 | Kitazato | |
| 2013/0340007 A1 | 12/2013 | Eyer | |
| 2014/0013347 A1 | 1/2014 | Yamagishi | |
| 2014/0013379 A1 | 1/2014 | Kitazato et al. | |
| 2014/0020038 A1 | 1/2014 | Dewa | |
| 2014/0020042 A1 | 1/2014 | Eyer | |
| 2014/0040965 A1 | 2/2014 | Kitazato et al. | |
| 2014/0040968 A1 | 2/2014 | Kitazato et al. | |
| 2014/0043540 A1 | 2/2014 | Kitazato et al. | |
| 2014/0053174 A1 | 2/2014 | Eyer et al. | |
| 2014/0067922 A1 | 3/2014 | Yamagishi et al. | |

FOREIGN PATENT DOCUMENTS

| | | |
|---|---|---|
| JP | 2007-116717 A | 5/2007 |
| JP | 2011-066556 | 3/2011 |
| JP | 2012-70351 A | 4/2012 |

OTHER PUBLICATIONS

Digital Video Broadcasting (DVB); Globally Executable MHP (GEM) Specification 1.2.2 (including IPTV), DVB Document A 139 r4, Jun. 2009, pp. 85-87.

Office Action dated May 17, 2017 in Chinese Patent Application No. 201380003358.3.

* cited by examiner

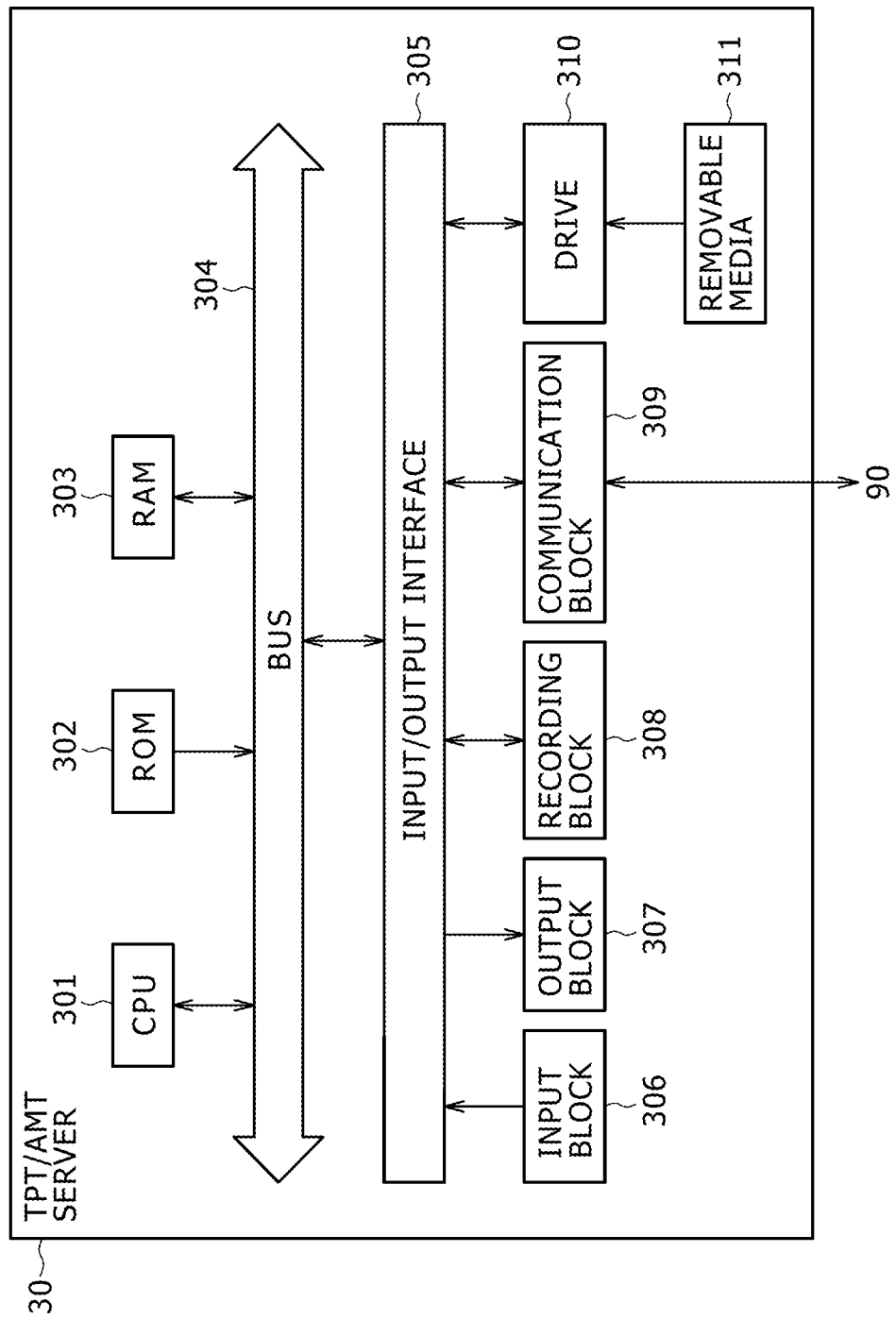

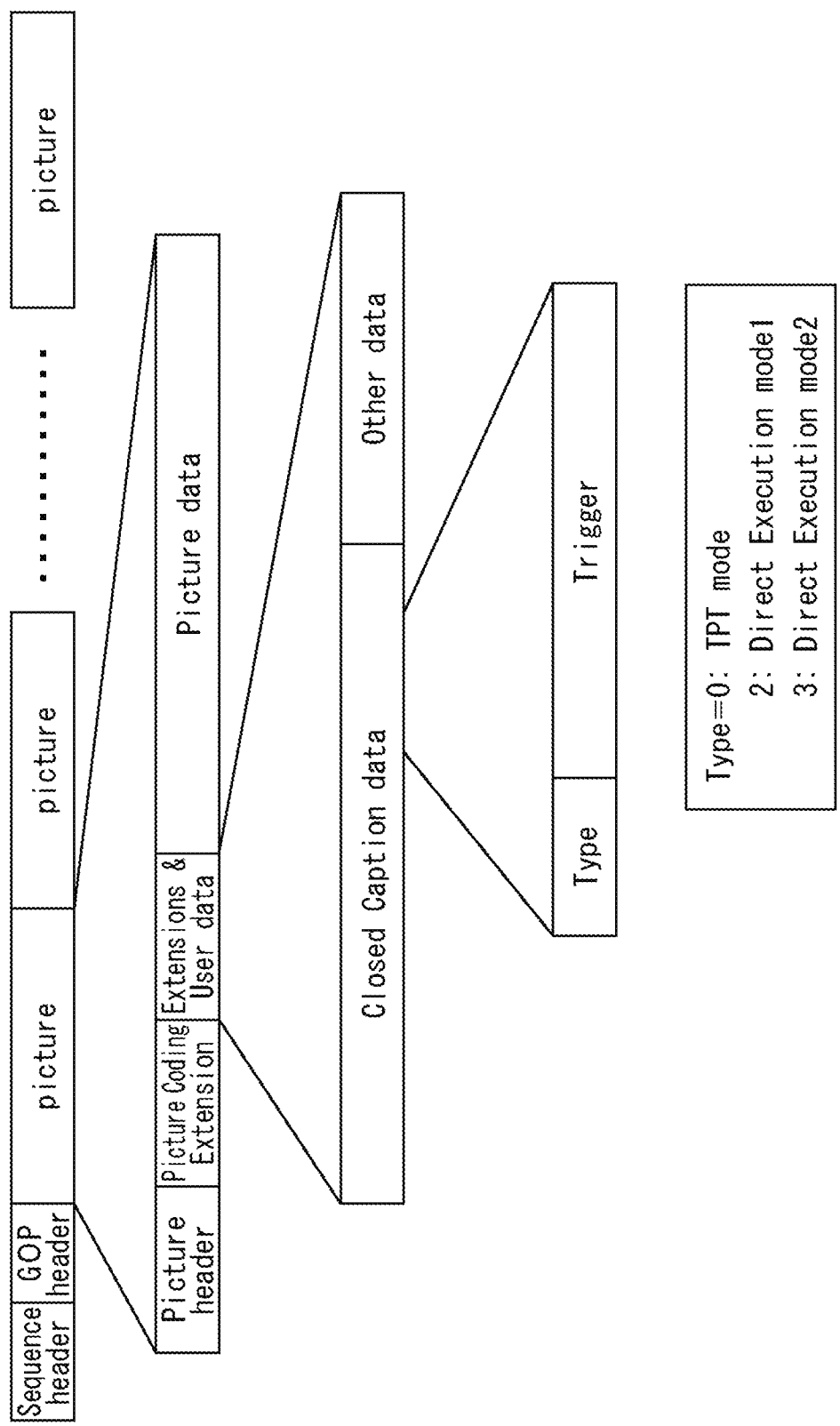

FIG. 6

| item | description |
|---|---|
| domain_name | The domain name of the provider's server (which TPT files are located) |
| segment_id | The unique name for the target segment. Provider can define it freely. |
| media_time | The time stamp of the target time position of the segment. |
| event_id | The ID for broadcast event related with any action for App control. |
| event_time | The target time for the broadcast event measured by media_time |
| spread | Randomized diffusion range of trigger action timing |
| additional_information | Any metadata which is fed to the application |

FIG. 7

```
<domain_name>/<segment_id>
<domain_name>/<segment_id>?m=<media_time>
<domain_name>/<segment_id>?m=<media_time>&s=<spread>
<domain_name>/<segment_name>?e=<event_id>
<domain_name>/<segment_name>?e=<event_id>&s=<spread>
<domain_name>/<segment_name>?e=<event_id>&t=<event_time>
<domain_name>/<segment_name>?e=<event_id>&t=<event_time>&s=<spread>
<domain_name>/<segment_name>?a=<additional_information>
```

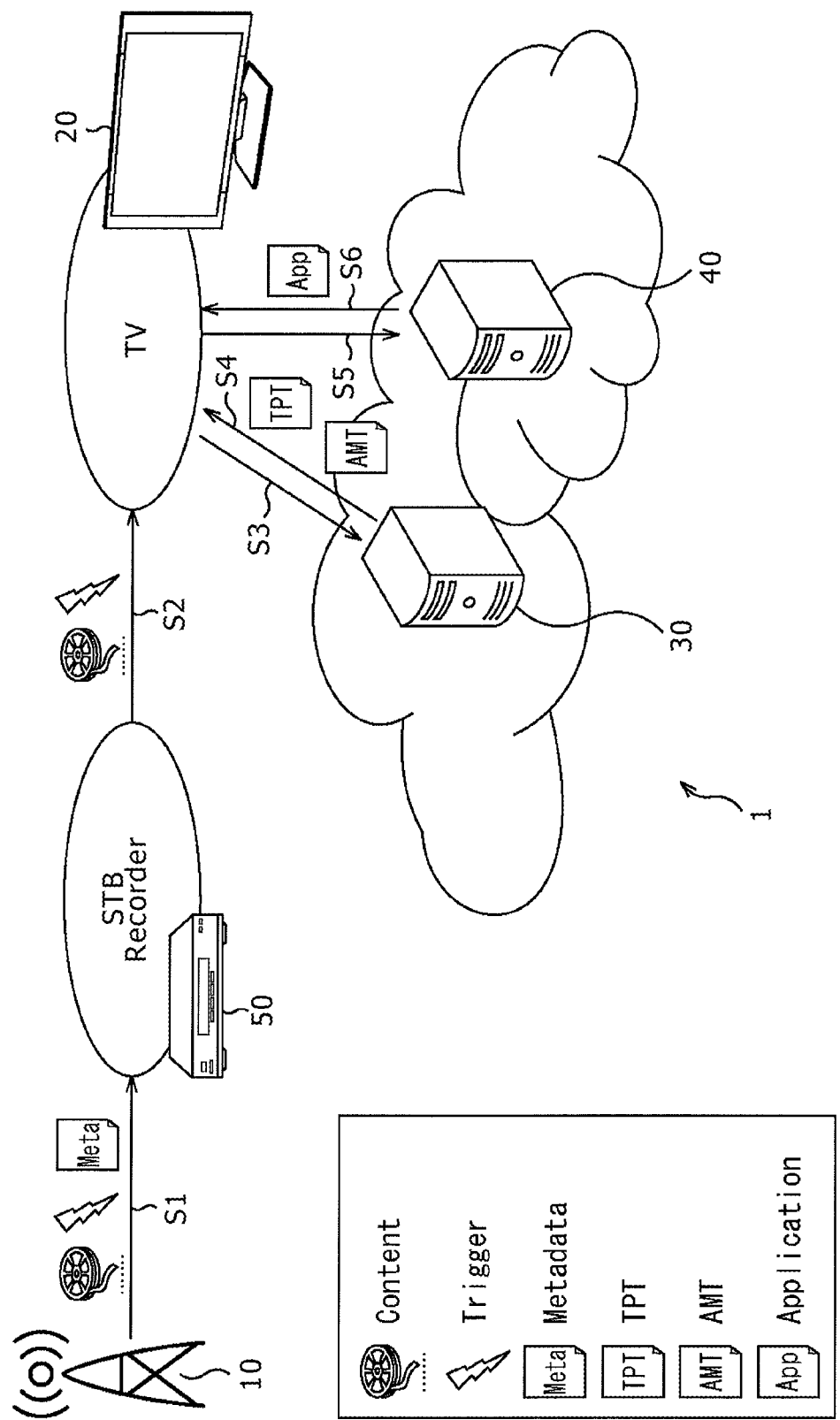

FIG.9

| Element/Attribute (with @) | | | | No. permitted | Description & Value |
|---|---|---|---|---|---|
| TPT | | | | | |
| | @protocolVersion | | | 1 | Protocol version, major/minor |
| | @id | | | 1 | domain_name/program_id = segment id |
| | @tptVersion | | | 1 | Data version of this TPT |
| | @updatingTime | | | 0..1 | Recommended TPT polling interval |
| | @expireDate | | | 0..1 | Date after which this TPT will not be used |
| | @serviceId | | | 0..1 | NRT service_id |
| | @baseURL | | | 0..1 | Base URL for all relative URLs in TPT |
| | Capabilities | | | 0..1 | Essential capabilities for this segment |
| | LiveTrigger | | | 0..1 | Information about live trigger delivery |
| | | @URL | | 1 | URL of server for live Triggers |
| | | @deliveryType | | 1 | Streaming\|long polling\|short polling |
| | | @pollPeriod | | 0..1 | Short polling period in seconds |
| | Application | | | 1..N | Application for this segment |
| | | @appID | | 1 | Application ID, for reference by trigger |
| | | @appType | | 0..1 | Application type (default="App") |
| | | @appName | | 0..1 | Displayable name (for viewer consent) |
| | | @globalId | | 0..1 | Globally unique app ID |
| | | @appVersion | | 0..1 | Version of this app |
| | | @testApp | | 0..1 | Flag for test App; default="false" |
| | | @cookieSpace | | 1 | Bytes of persistent storage needed |
| | | @frequencyOfUse | | 0..1 | 1 hr, 1 day, etc. (for caching guidance) |
| | | @expireDate | | 0..1 | Expire date for caching |
| | | @availInternet | | 0..1 | Default="true" |
| | | @availBroadcast | | 0..1 | Default="true" |
| | | URL | | 1..N | App URL(s) — first URL is entry point |
| | | Capabilities | | 0..1 | Essential capabilities to present this App |
| | | ContentItem | | 0..N | Content item used by this App |
| | | | URL | 1..N | URL(s) of content items |
| | | | updatesAvail | 0..1 | Default="false" |
| | | | Size | 0..1 | Size of content item, in kilobytes |
| | | Event | | 1..N | Event targeted to this App |
| | | | @eventId | 1 | Event ID, for reference by trigger |
| | | | @destination | 0..1 | Targeted device type, e.g., HDTV, SDTV, external_1, external_2, etc. |
| | | | @action | 1 | "register", etc. |
| | | | @diffusion | 0..1 | Period for applying diffusion, in seconds |
| | | | data | 0..1 | Data to be used by this App for stream-event |

FIG.10

| Element/Attribute (with @) | | No. permitted | Description & Value |
|---|---|---|---|
| AMT | | | |
| | @protocolVersion | 1 | Protocol version, major/minor |
| | @segmentId | 1 | domain_name/program_id = segment id |
| | @beginMT | 1 | Start time of this segment time scope |
| | Activation | 1..N | Activation message |
| | @targetId | 1 | Identifies target event in form appId+eventId |
| | @startTime | 1 | Start time of action period |
| | @endTime | 0..1 | End time of action period |

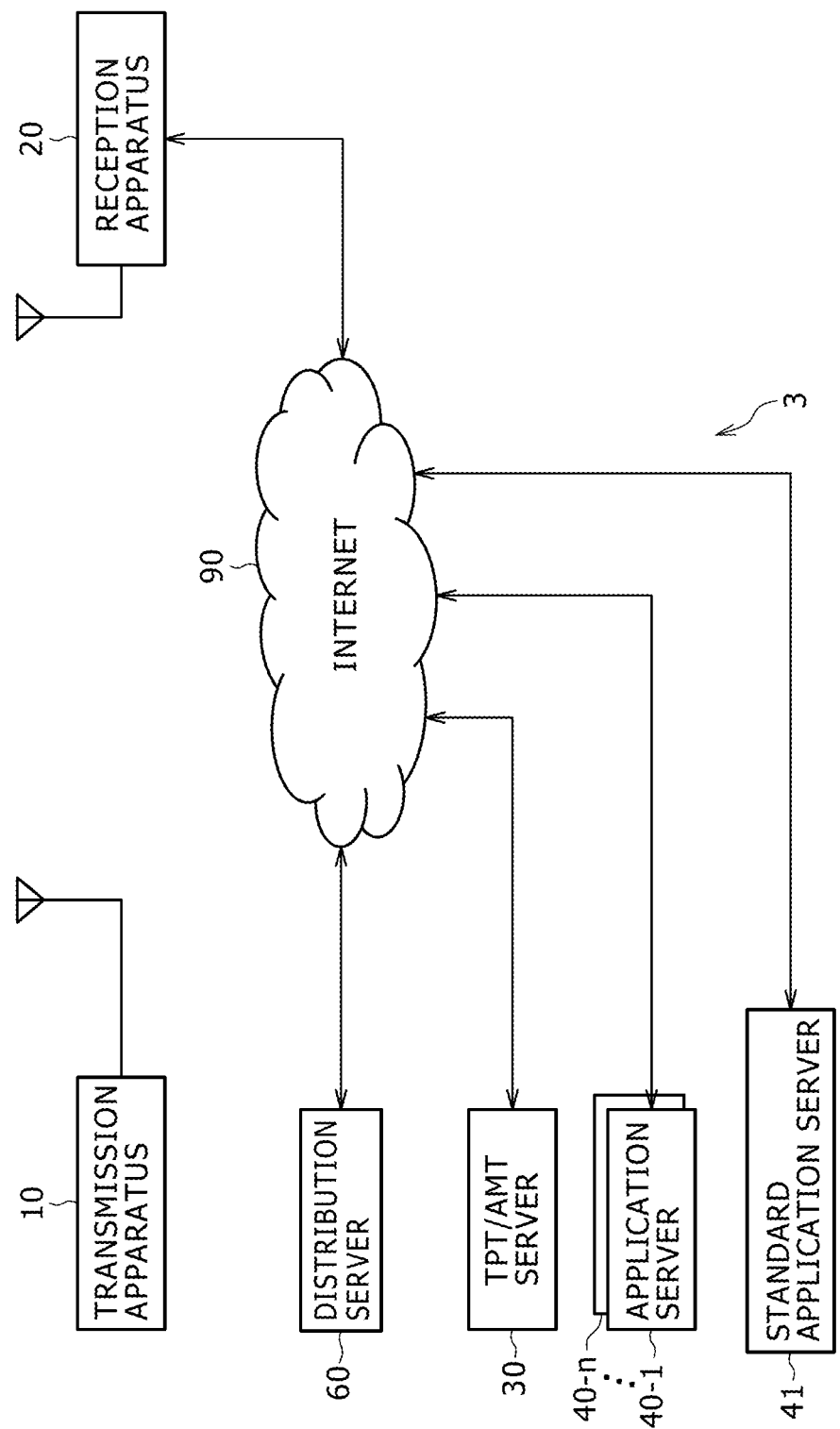

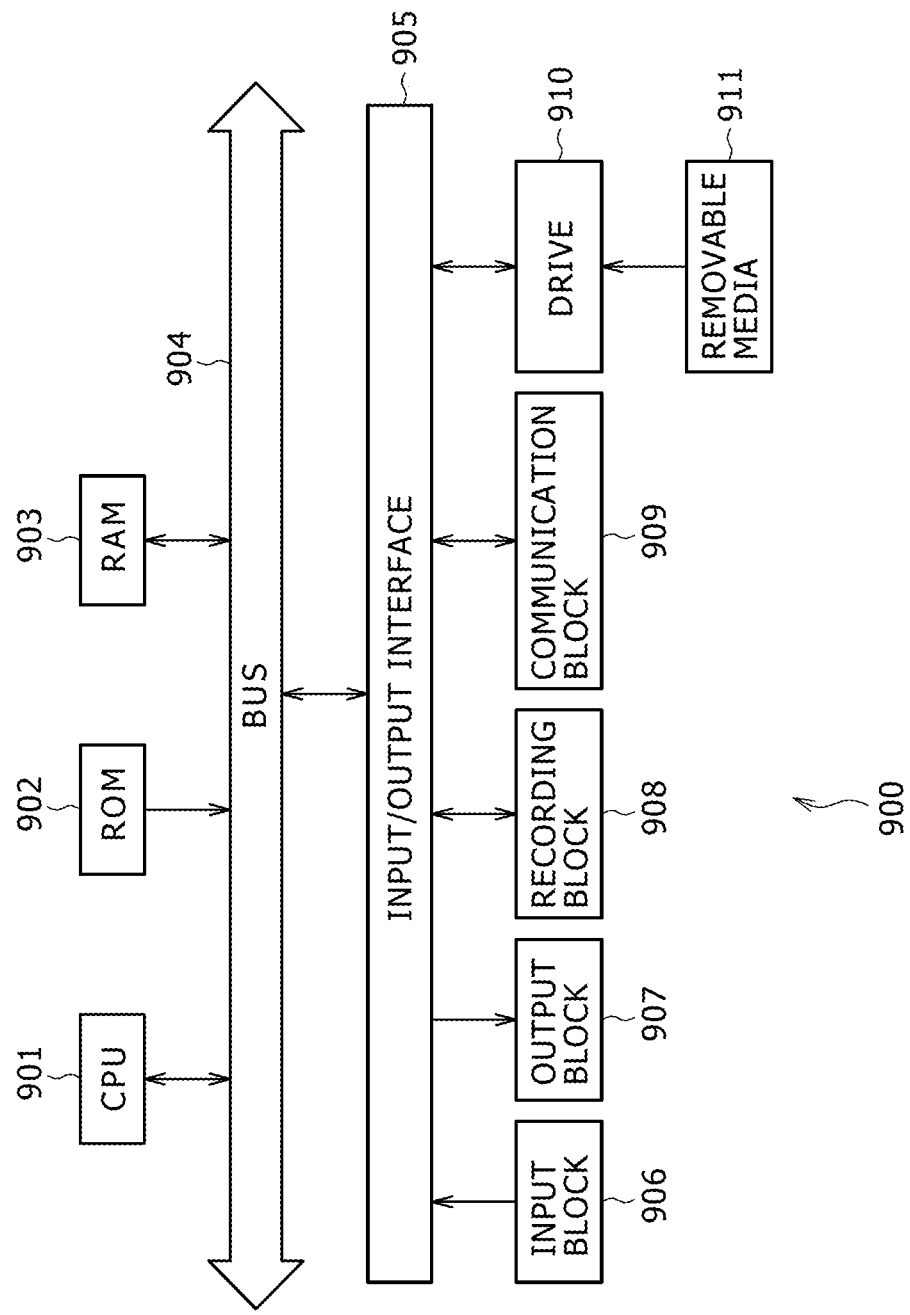

RECEPTION APPARATUS, RECEPTION METHOD, TRANSMISSION APPARATUS, AND TRANSMISSION METHOD

CROSS-REFERENCE TO RELATED APPLICATION

This application is a continuation of U.S. application Ser. No. 13/777,429, filed on Feb. 26, 2013, which claims the benefit of priority of Provisional Application Ser. No. 61/682,566, filed on Aug. 13, 2012, the entire contents of which are incorporated herein by reference.

BACKGROUND

The present technology relates to a reception apparatus, a reception method, a transmission apparatus, and a transmission method and, more particularly, to a reception apparatus, a reception method, a transmission apparatus, and a transmission method that are configured to make application programs to be executed in coordination with AV (audio/visual) content be adaptive to various kinds of operation forms.

These days, in the field of digital broadcasting, the introduction of services coordinated with not only broadcasting-based services but also services to be provided based on the Internet has been assumed (refer to Japanese Patent Laid-Open No. 2011-66556, for example). With these services coordinated with broadcasting and communication, application programs delivered through the Internet may be executed in coordination with broadcast content such as television programs for example.

SUMMARY

In the case where an application program is executed in coordination with a selected piece of broadcast content on a reception apparatus capable of receiving digital television broadcast signals, it is assumed that the application program be operated in various operation modes.

In the current situation, however, no technology is known by which application programs to be executed in coordination with AV content such as broadcast content are made compatible with a variety of operation modes.

Therefore, the present technology disclosed herein addresses the above-identified and other problems associated with related-art methods and apparatuses and solves the addressed problems by providing a reception apparatus, a reception method, a transmission apparatus, and a transmission method that are configured to make application programs to be executed in coordination with AV content are made compatible with a variety of operation modes.

In carrying out the technology disclosed herein and according to a first mode thereof, there is provided a reception apparatus. This reception apparatus has a reception block configured to receive AV content; a trigger information capture block configured to capture trigger information for controlling an operation of an application program to be executed in coordination with the AV content; and a control block configured to control an operation of the application program in accordance with an operation mode specified in the trigger information.

In the above-mentioned reception apparatus, the operation mode is determined in accordance with a control scheme of the application program.

In the above-mentioned reception apparatus, the operation mode includes a first mode for operating a standard application program obtained by standardizing the application program; and, if the first mode is specified as the operation mode, the control block controls an operation of the standard application program in accordance with the trigger information.

In the above-mentioned reception apparatus the trigger information includes additional information for use in controlling an operation of the standard application program; and the control block controls an operation of the standard application program in accordance with the additional information.

The above-mentioned reception apparatus further has a storage block configured to store the standard application program. The above-mentioned control block controls an operation of the standard application program read from the storage block.

The above-mentioned reception apparatus still further has an application capture block configured to capture the standard application program through a network. The above-mentioned control block controls an operation of the standard application program captured by the application capture block in accordance with the trigger information.

In the above-mentioned reception apparatus, the operation mode includes a second mode for controlling the application program by use of a table including control information for controlling an operation of the application program; and a third mode for operating a specific application program not standardized.

In the above-mentioned reception apparatus, the trigger information is transmitted along with the AV content; and the trigger information capture block extracts trigger information from data of the AV content.

The above-mentioned reception processing further has a feature quantity extraction block configured to extract a feature quantity from data of the AV content. The above-mentioned trigger information capture block captures the trigger information corresponding to an identification result of the AV content identified by use of the feature quantity.

The above-mentioned reception apparatus may be a standalone apparatus or an internal component block making up one apparatus.

A reception method of the first mode of the present technology corresponds to the reception apparatus of the first mode of the present technology.

In the reception apparatus and the reception method according to the first mode of the present technology, AV content is received, trigger information for controlling an operation of an application program to be executed in coordination with this AV content is captured, and an operation of this application program is controlled in accordance with an operation mode specified in this trigger information.

A transmission apparatus of a second mode of the present technology has a trigger information generation block configured to generate trigger information for controlling an operation of an application program to be executed in coordination with AV content, the trigger information being specified with an operation mode defined in accordance with a control scheme of the application program; and a transmission block configured to transmit the trigger information along with the AV content.

The above-mentioned transmission apparatus may be a standalone apparatus or an internal component block making up one apparatus.

A transmission method according to the second mode of the present technology corresponds to the transmission apparatus according to the second mode of the present technology.

In the transmission apparatus and the transmission method according to the second mode of the present technology, trigger information for controlling an operation of an application program to be executed in coordination with AV content is generated. An operation mode defined in accordance with a control scheme of the application program is specified in this trigger information. Then, the trigger information is transmitted along with the AV content.

According to the first and second modes of the present technology, an application program that is executed in coordination with AV content may be applied to various types of operation forms.

BRIEF DESCRIPTION OF THE DRAWINGS

FIG. 4 is a diagram illustrating an exemplary configuration of a TPT/AMT server for example;

FIG. 5 is a diagram illustrating an exemplary arrangement of trigger information;

FIG. 6 is a table listing detail configuration of trigger information;

FIG. 7 is a table listing exemplary description of trigger information;

FIG. 8 is a diagram illustrating outlines of apparatuses in a TPT mode;

FIG. 9 is a diagram listing a detail configuration of a TPT;

FIG. 10 is a diagram listing a detail configuration of an AMT;

FIG. 45 is a diagram illustrating an exemplary configuration of the broadcasting-communication coordinated system; and FIG. 46 is a diagram illustrating an exemplary configuration of a computer.

DETAILED DESCRIPTION OF THE PREFERRED EMBODIMENTS

The technology disclosed herein will be described in further detail by way of embodiments thereof with reference to the accompanying drawings.

First Embodiment

[Exemplary Configuration of a Broadcasting-Communication Coordinated System]

Figure 1:
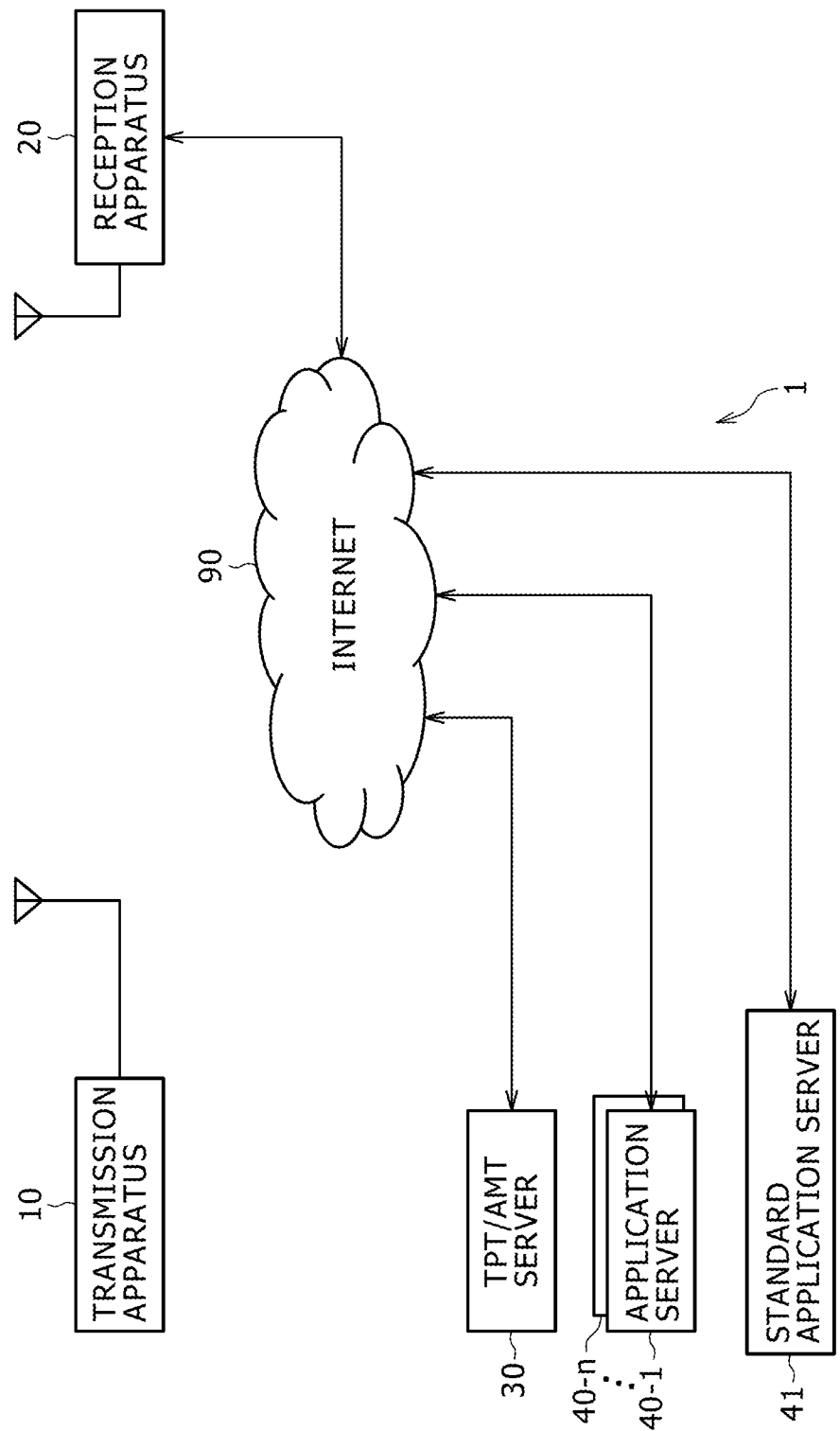
FIG. 1 is a diagram illustrating an exemplary configuration of a broadcasting communication coordinated system.

Now referring to FIG. 1, there is shown a broadcasting-communication coordinated system 1 practiced as a first embodiment of the technology disclosed herein. The broadcasting-communication coordinated system 1 has a transmission apparatus 10, a reception apparatus 20, a TPT/AMT server 30, application servers 40-1 through 40-n, and a standard application server 41.

The reception apparatus 20, the TPT/AMT server 30, the application servers 40-1 through 40-n, and the standard application server 41 are interconnected through the Internet 90.

The transmission apparatus 10 is configured to transmit (or broadcast) broadcast content, such as television programs and commercial messages (CM), by means of digital television broadcast signals (hereafter simply referred to as broadcast signals). The transmission apparatus 10 is provided by a broadcaster for example and arranged in the broadcasting station thereof.

In addition, the transmission apparatus 10 transmits trigger information for controlling operations of each coordinated application by including the trigger information in a broadcast signal.

A coordinated application herein denotes an application program that is executed in coordination with broadcast content. Each coordinated application is distributed by the application server 40 and the like via the Internet 90 or by the transmission apparatus 10 as included in a broadcast signal.

It should be noted that the coordinated application is classified into one that provided for the broadcast content to be broadcast by a particular broadcaster and the other that is provided as standardized for the broadcast content to be broadcast by a given broadcaster. In what follows, the latter is referred to as a standard coordinated application to make distinction from the former. However, if there is no need to make distinction between these types, then the standard coordinated application is simply referred to as a coordinated application.

Trigger information is transmitted as arranged in a video stream multiplexed with a transport stream of a broadcast signal. It should be noted that trigger signal is divided classified into two types; time-base trigger information and active trigger information.

Time-base trigger information is used to provide time information for setting an internal clock that counts the time indicative of the progress of broadcast content or transmit a notification of the URL (Uniform Resource Locator) of a predetermined server.

Active trigger information (or activation trigger) is used to make a specified coordinated application execute a predetermined operation. It should be noted however that, in what follows, the two types of trigger information will be generically referred to as trigger information unless otherwise noted.

The reception apparatus 20 receives a broadcast signal transmitted from the transmission apparatus 10 to obtain video and audio signals of broadcast content. The reception apparatus 20 displays the received video signal on a display monitor and sounds the received audio signal from a loudspeaker.

It should be noted that, in what follows, the reception apparatus 20 will be described as a television receiver; however, the reception apparatus 20 is not limited to a television receiver. The reception apparatus 20 may be built in an electronic device, such as a video recorder for example, by removing a display monitor and a loudspeaker from the configuration.

If a time-base trigger information transmitted from the transmission apparatus 10 is extracted, the reception apparatus 20 sets or resets (or calibrates) the time of the internal clock on the basis of the time information included in the extracted trigger information. In what follows, this internal clock will be referred to as a media clock.

In addition, the reception apparatus 20 accesses the TPT/AMT server 30 through the Internet 90 to obtain a TPT and an AMT in accordance with the extracted trigger information.

The TPT/AMT server 30 manages TPTs and AMTs. The TPT/AMT server 30 is provided by a business operator such as a broadcaster for example.

A TPT (Trigger Parameters Table) is used to identity an action specified by an event for a coordinated application. For example, in each TPT, an ID for identifying an event for a coordinated application is correlated with an action to be specified by that event.

An AMT (Activation Messages Table) is used to identify a time at which an action for a coordinated application is executed. For example, in each AMT, an ID for identifying an event for a coordinated application is correlated with the valid period of this ID. However, the valid period of an event is determined along the progression of broadcast content.

To be more specific, an action for a specified coordinated application to be executed with a predetermined timing is identified by both a TPT and an AMT.

Upon inquiry from the reception apparatus 20, the TPT/AMT server 30 provides a TPT and an AMT through the Internet 90.

On the basis of the active trigger information supplied from the transmission apparatus 10 or a time to be clocked by the media clock, the reception apparatus 20 references a TPT and an AMT to identify an action for the specified coordinated application. Then, in accordance with the identified action, the reception apparatus 20 controls an operation of the specified coordinated application.

In addition, in accordance with the identified action, the reception apparatus 20 accesses any one of the application servers 40-1 through 40-n or the standard application server 41 through the Internet 90 to obtain a coordinated application.

Each of the application servers 40-1 through 40-n (n=1, 2, . . . , N) manages coordinated applications for the broadcast content to be broadcast by a particular broadcaster. The application servers 40-1 through 40-n are provided by business operators such as broadcasters for example. It should be noted that, if there is no need for making distinction between individual application servers 40-1 through 40-n, the application servers are hereinafter generically referred to as the application server 40.

In response to an inquiry from the reception apparatus 20, the application servers 40-1 through 40-n provide coordinated applications upon inquiry from the reception apparatus 20 through the Internet 90. For example, the application server 40-1 manages a coordinated application for xbc broadcasting station and, upon inquiry from the reception apparatus 20 selecting the broadcast content for xbc broadcasting station, provides the coordinated application for xbc broadcasting station.

The standard application server 41 manages standard coordinated applications. The standard application server 41 is provided by a standardization organization for example that formulates the standards for the standard coordinated application. To be more specific, the coordinated application is compatible with the broadcast content broadcast by xbc broadcasting station, zbc broadcasting station, or the like.

In response to an inquiry from the reception apparatus 20, the standard application server 41 provides the standard coordinated application through the Internet 90.

It should be noted that, in the exemplary configuration shown in FIG. 1, the reception apparatus 20 controls the operation of a coordinated application by use of a TPT and an AMT; it is also practicable to control the operation of a coordinated application with no TPT and AMT depending on an operation mode. In such a case, the reception apparatus 20 controls the operation of a coordinated application in accordance with trigger information. The operation modes will be detailed later.

As described above, a coordinated application may be distributed from the transmission apparatus 10 by broadcasting rather than by Internet distribution. In this case, the reception apparatus 20 obtains a coordinated application distributed from the transmission apparatus 10 in accordance with an identified action and controls the operation of the obtained coordinated application.

Further, a TPT and an AMT may be distributed from the transmission apparatus 10 by broadcasting rather than by Internet distribution. In this case, the reception apparatus 20 obtains TPT and AMT multiplexed with the transport stream of a broadcast signal and controls the operation of a coordinated application by use of the obtained TPT and AMT.

It should be noted that, in the exemplary configuration shown in FIG. 1, only one transmission apparatus 10 and only one reception apparatus 20 are illustrated for the brevity of description; actually, however, the broadcasting-communication coordinated system 1 is made up of two or more transmission apparatuses 10 and two or more reception apparatuses 20. To be more specific, each reception apparatus 20 selects desired broadcast content from two or more pieces of broadcast content transmitted from two or more transmission apparatuses 10 arranged in two or more broadcasting stations.

Likewise, in FIG. 1, one TPT/AMT server 30 is illustrated. Actually, however, two or more TPT/AMT servers 30 are arranged for each broadcaster and the reception apparatus 20 can access any one of the TPT/AMT server 30 in accordance with the information specified by trigger signal.

Thus, the broadcasting-communication coordinated system 1 is configured as described so far.

[Exemplary Configuration of the Transmission Apparatus]

Figure 2:
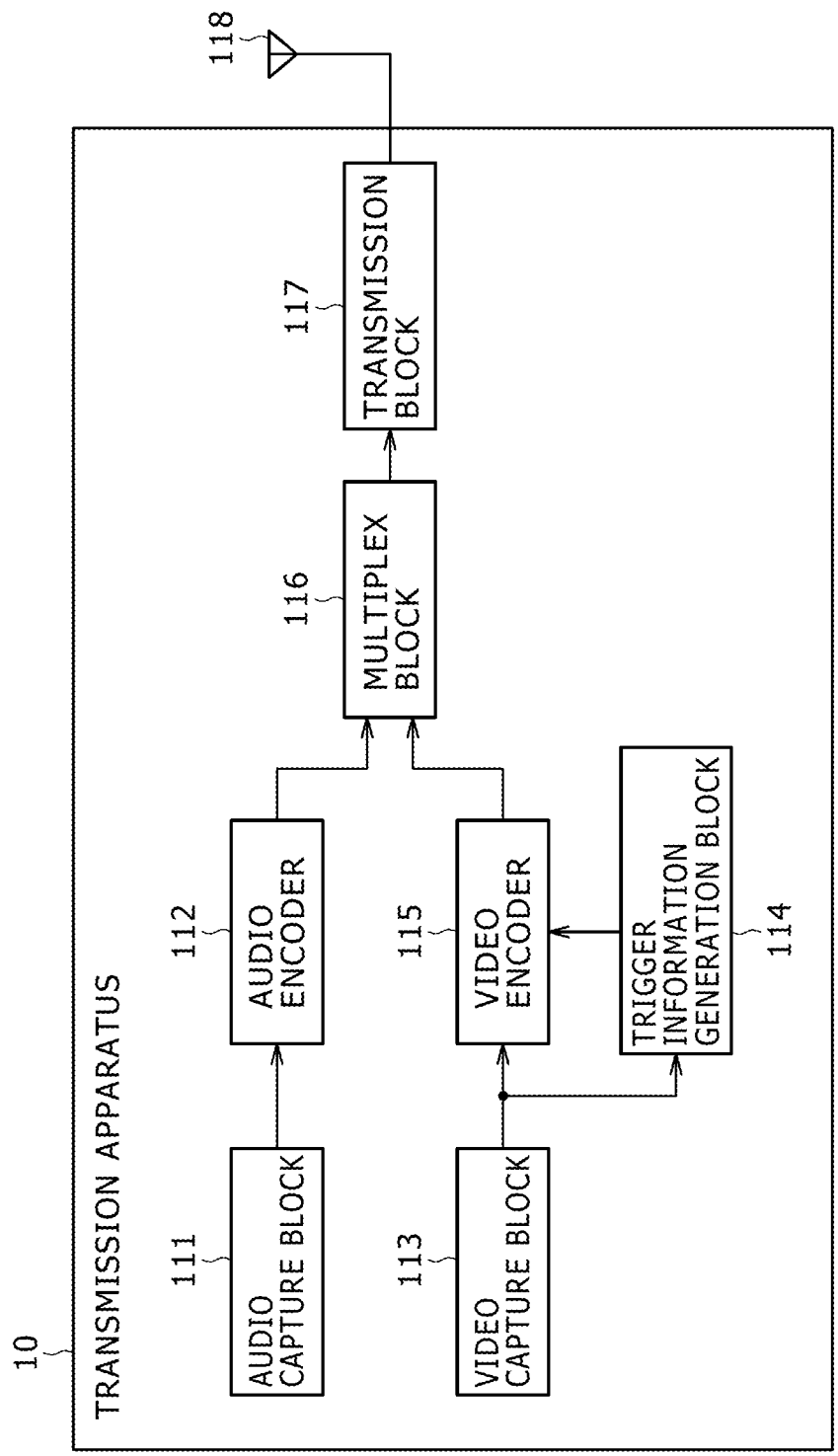
FIG. 2 is a diagram illustrating an exemplary configuration of a transmission apparatus.

Now, referring to FIG. 2, there is shown an exemplary configuration of the transmission apparatus 10 shown in FIG. 1.

As shown in FIG. 2, the transmission apparatus 10 has an audio capture block 111, an audio encoder 112, a video capture block 113, a trigger information generation block 114, a video encoder 115, a multiplex block 116, a transmission block 117, and an antenna 118.

The audio capture block 111 captures an audio signal of broadcast content from an external server, a microphone, or a recording media, for example, and supplies the captured audio signal to the audio encoder 112.

The audio encoder 112 encodes an audio signal supplied from the audio capture block 111 in compliance with encoding such as MPEG2 (Moving Picture Experts Group 2) and supplies a resultant audio stream to the multiplex block 116.

The video capture block 113 captures a video signal of broadcast content from an external server, a camera, or a recording media, for example, and supplies the captured video signal to the trigger information generation block 114 and the video encoder 115.

The trigger information generation block 114 generates trigger information and supplies the generated trigger information to the video encoder 115. For example, trigger information is generated in accordance with the progression of the broadcast content corresponding to the video signal supplied from the video capture block 113.

The video encoder 115 encodes a video signal supplied from the video capture block 113 in compliance with encoding such as MPEG2. The video encoder 115 arranges trigger information in a video stream obtained by encoding. The video stream including trigger information is supplied to the multiplex block 116.

The multiplex block 116 multiplexes an audio stream from the audio encoder 112 with a video stream from the video encoder 115 and transmits a resultant transport stream to the transmission block 117.

The transmission block 117 transmits the transport stream supplied from the multiplex block 116 to the antenna 118, thereby transmitting the transport stream as a broadcast signal.

Thus, the transmission apparatus 10 is configured as described so far.

[Exemplary Configuration of the Reception Apparatus]

Figure 3:
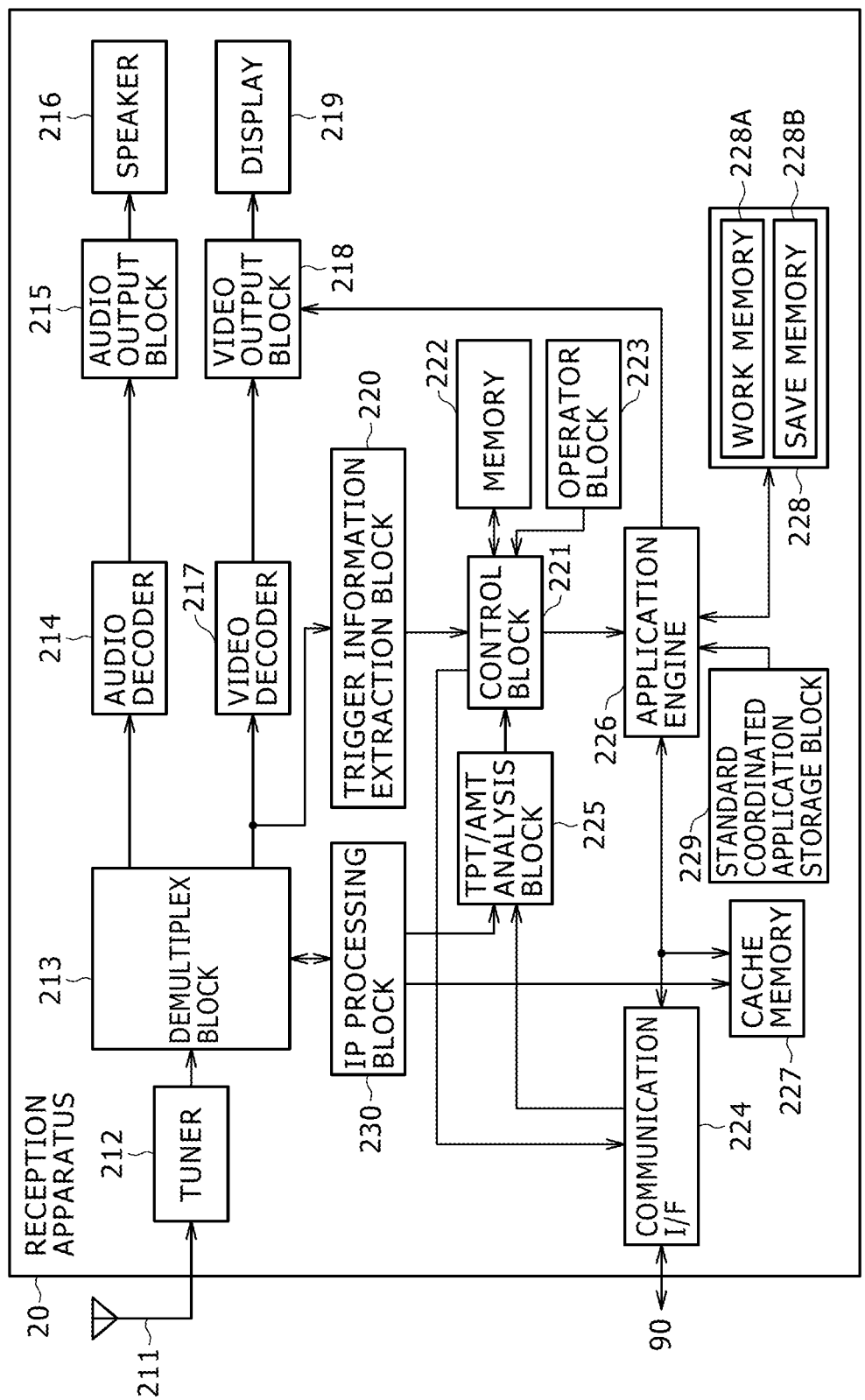
FIG. 3 is a diagram illustrating an exemplary configuration of a reception apparatus.

Referring to FIG. 3, there is shown an exemplary configuration of the reception apparatus 20 shown in FIG. 1.

As shown in FIG. 3, the reception apparatus 20 has a tuner 212, a demultiplexer 213, an audio decoder 214, an audio output block 215, a speaker 216, a video decoder 217, a video output block 218, and a display 219.

In order to operate a coordinated application, the reception apparatus 20 has a trigger information extraction block 220, a control block 221, a memory 222, an operator block 223, a communication I/F 224, a TPT/AMT analysis block 225, an application engine 226, a cache memory 227, an application memory 228, a standard coordinated application storage block 229, and an IP processing block 230.

The tuner 212 demodulates a broadcast signal received through the antenna 211 and supplies a resultant transport stream to the demultiplex block 213.

The demultiplex block 213 separates the transport stream supplied from the tuner 212 into an audio stream and a video stream and supplies the audio stream to the audio decoder 214 and the video stream to the video decoder 217.

The demultiplex block 213 also separates a PSI/PSIP (Program Specific Information/Program and System Information Protocol), an SSC (Service Signaling Channel), and a FLUTE (File Delivery over Unidirectional Transport) from a transport stream.

The audio decoder 214 decodes the audio stream received from the demultiplex block 213 by the decoding corresponding to the encoding by the audio encoder 112 (FIG. 2) such as MPEG2 and supplies a resulting audio signal to the audio output block 215.

The audio output block 215 supplies the audio signal received from the audio decoder 214 to the speaker 216. The speaker 216 sounds the audio signal received from the audio output block 215.

The video decoder 217 decodes the video stream received from the demultiplex block 213 by the decoding corresponding to the encoding by the video encoder 115 (FIG. 2) such as MPEG2 and supplies a resultant video signal to the video output block 218.

The video output block 218 supplies the video signal received from the video decoder 217 to the display 219. The display 219 displays a video corresponding to the video signal received from the video output block 218.

The trigger information extraction block 220 always monitors the video stream obtained by the demultiplex block 213 to extract (or captures) trigger information from the video stream, supplying the extracted trigger information to the control block 221.

The control block 221 controls the operations of component blocks of the reception apparatus 20 by executing a control program stored in the memory 222.

The operator block 223 receives various operations done by the user to generate corresponding operation signals, supplying the generated operation signals to the control block 221. In response to the received operation signals, the control block 221 controls the operations of component blocks of the reception apparatus 20.

In addition, in response to the trigger information received from the trigger information extraction block 220, the control block 221 controls the communication I/F 224 to access the TPT/AMT server 30 through the Internet 90, thereby requesting for a TPT and an AMT. Under the control of the control block 221, the communication I/F 224 receives the TPT and the AMT transmitted from the TPT/AMT server 30 and supplies the received TPT and AMT to the TPT/AMT analysis block 225.

The TPT/AMT analysis block 225 obtains the TPT and the AMT supplied from the communication I/F 224 or the IP processing block 230 to be described later and stores the received TPT and AMT in an internal memory (not shown). In addition, the TPT/AMT analysis block 225 analyzes the TPT and the AMT and supplies analysis results to the control block 221.

If the trigger information supplied from the trigger information extraction block 220 is time-base trigger information, then the control block 221 sets or resets the media clock on the basis of the time information included in this trigger information.

Further, on the basis of the time indicated by the media clock, the control block 221 references the TPT and AMT analysis results received from the TPT/AMT analysis block 225 to identify an action for the specified coordinated application. For example, if the time indicated by the media clock has entered the valid period of an event, thereby satisfying a predetermined validity condition, then the control block 221 identifies the action specified by this valid event.

It should be noted that, if the trigger information received from the transmission apparatus 10 is active trigger information and an ID for identifying an event for a specified coordinated application is included, then the control block 221 references the TPT and AMT analysis results to identify an action for the coordinated application specified by this ID.

Next, in accordance with the identified action, the control block 221 controls the application engine 226 to control the operation of the coordinated application.

It should be noted that, in the exemplary configuration shown in FIG. 3, the reception apparatus 20 controls the operation of a coordinated application by use of a TPT and an AMT; however, in an operation mode in which the operation of a coordinated application is controlled without using a TPT or an AMT, the control block 221 controls the application engine 226 in accordance with trigger information analysis results.

Under the control of the control block 221, the application engine 226 controls the communication I/F 224 to access the application server 40 through the Internet 90, thereby requesting for a coordinated application. The communication I/F 224 receives the coordinated application transmitted from the application server 40 and stores the received coordinated application into the cache memory 227. The same holds true when obtaining a standard coordinated application from the standard application server 41.

Under the control of the control block 221, the application engine 226 reads the coordinated application from the cache memory 227 and executes this coordinated application. A video signal of the active coordinated application is supplied to the video output block 218.

The video output block 218 synthesizes the video signal supplied from the application engine 226 with the video signal supplied from the video decoder 217 and displays a resultant video onto the display 219.

The application memory 228 is made up of a work memory 228A and a save memory 228B. The application engine 226 records data associated with the active coordinated application to the work memory 228A.

If the active coordinated application is to be suspended, the application engine 226 moves the data from the work memory 228A of the application memory 228 to the save memory 228B. When restarting the suspended coordinated application, the application engine 226 moves the data from the save memory 228B to the work memory 228A to resume the state as it was before the suspension.

In an operation in which the standard coordinated application is held in advance, the standard coordinated application storage block 229 stores the standard coordinated application. Under the control of the control block 221, the application engine 226 reads the standard coordinated application from the standard coordinated application storage block 229 and executes the standard coordinated application.

The IP processing block 230 always monitors transport streams obtained by the demultiplex block 213 to obtain a coordinated application that is transmitted by use of a FLUTE session. The IP processing block 230 holds the obtained coordinated application in the cache memory 227.

In addition, the IP processing block 230 always monitors transport streams obtained by the demultiplex block 213 to obtain a TPT and an AMT that are transmitted by use of SSC. The IP processing block 230 supplies the obtained TPT and AMT to the TPT/AMT analysis block 225.

Thus, the reception apparatus 20 is configured as described so far.

[Exemplary Configuration of the TPT/AMT Server]

Referring to FIG. 4, there is shown an exemplary configuration of the TPT/AMT server 30 shown in FIG. 1.

The TPT/AMT server 30 is configured as shown in FIG. 4, for example. A CPU (Central Processing Unit) 301 executes various processing operations as instructed by a program stored in a ROM (Read Only Memory) 302 or a recording block 308. A RAM (Random Access Memory) 303 stores from time to time programs to be executed by the CPU 301 and data necessary the execution. The CPU 301, the ROM 302, and the RAM 303 are interconnected by a bus 304.

The CPU 301 is connected to an input/output interface 305 via the bus 304. The input/output interface 305 is connected to an input block 306 and an output block 307. By following commands entered through the input block 306, the CPU 301 executes various processing operations. Then, the CPU 301 outputs the information obtained as a result of the processing done to the output block 307.

The recording block 308 connected to the input/output interface 305 is made up of a hard disk drive for example and stores programs to be executed by the CPU 301 and various kinds of data (TPTs and AMTs for example). A communication block 309 executes communication with external apparatuses (the reception apparatus 20 for example) via the Internet 90.

A drive 310, connected to the input/output interface 305, drives a removable media 311 such as an optical disk or a semiconductor memory for example when the removable media 311 loaded on the drive 310, thereby obtaining programs and data recorded to the removable media 311. The obtained programs and data are transferred as required to the recording block 308 to be recorded thereto.

Thus, the TPT/AMT server 30 is configured as described so far.

It should be noted that the application server 40 and the standard application server 41 shown in FIG. 1 are substantially the same in configuration as the TPT/AMT server 30 shown in FIG. 4, so that the configurations of the application server 40 and the standard application server 41 are skipped.

[Detail Configuration of Trigger Information]

The following describes a detail configuration of trigger information with reference to FIG. 5 through FIG. 7.

(Exemplary Arrangement of Trigger Information)

Now, referring to FIG. 5, there is shown an exemplary arrangement of trigger information.

As shown in FIG. 5, an MPEG2 video stream is configured by a collection of two or more pictures called GOP (Group Of Pictures). Each GOP begins with a sequence header and a GOP header.

Each picture begins with a picture header followed by an area called picture coding extension and a user area called by extension & user data followed by data of each scene.

The user data area has closed caption data and other data. The closed caption data contains trigger information (or simply, trigger) and information (or type) indicative of the type of trigger information.

This type specifies a TPT mode, a first direct mode (or direct execution mode 1), or a second direct mode (or direction execution 2). It should be noted that "0" is specified in the type when the TPT mode is specified, "2" when the first direct mode is specified, and "3" when the second direct mode is specified.

The operation modes here are indicative of a coordinated application control scheme; the TPT mode is indicative of a control scheme based on TPT and AMT and the first direct mode and the second direct mode are indicative of a control scheme based on trigger information. It should be noted that these operation modes will be detailed later.

As described above, trigger information is transmitted as included in the caption data in the user data area of a video stream along with the information indicative of an operation mode.

(Detail Specifications of Trigger Information)

The following describes the detail specifications of trigger information with reference to FIG. 6.

Trigger information includes items doamin_name, segment_id, media_time, event_id, event_time, spread, and additional_information.

Item domain_name specifies information indicative of a domain name for identifying a predetermined server. For example, item domain_name specifies a domain name corresponding to the name of business operator providing the TPT/AMT server 30, the application server 40, or the standard application server 41.

Item segment_id specifies an ID for identifying a particular segment in broadcast content. It should be noted that a business operator may specify any ID.

Item media_time specifies information indicative of a particular time position on the progression time axis of broadcast content. For example, item media_time specifies a time from a reference time that is a start time or a particular time such as 0:00 on the progression time axis of broadcast content. It should be noted that a time specified in item media_time is in units of seconds or milliseconds, for example.

Item event_id specifies an ID for identifying an event that is identified by a TPT and an AMT. In addition item event_time specifies information indicative of a time at which an event concerned is executed.

Item spread specifies information for stochastically spreading a timing to which trigger information is applied.

Item additional_information specifies additional information to be used for controlling the operation of a coordinated application.

It should be noted that the above-mentioned specifications of trigger information shown in FIG. 6 are illustrative only; therefore other specifications may be employed.

(Exemplary Description of Trigger Information)

Referring to FIG. 7, there is shown an exemplary description of trigger information.

As shown in FIG. 7, trigger information is made up of character strings including characters and values for specifying doamin_name, segment_id, media_time, event_id, event_time, spread, and additional_information, and predetermined symbols such as "/," "?m=," "&" for example which are linked with these characters and values.

For example, if domain_name is "xbc.com," segment_id is "SegA," and media_time is "1000," then a character string indicative of trigger information is "xbc.com/SegA?m=1000."

To be more specific, when "http://" is attached to the beginning of the above-mentioned character string, a URL for accessing a predetermined server, "http://xbc.com/SegA?m=1000," is obtained. Because a query character string m=<media_time> is attached to the end of this URL, use of a GET method of HTTP (Hyper Text Transfer Protocol) allows the accessed server to obtain parameters thereof.

If character string m=<media_time>, e=<event_id>, t=<event_time>, s=<spread>, and a=<additional_information> is linked to a character string indicative of trigger information, the reception apparatus 20 may obtain values of media_time, event_id, event_time, spread, and additional_information. Then, on the basis of the obtained values, the reception apparatus 20 controls the operation of a coordinated application.

It should be noted that the trigger description method is not limited to that mentioned above with reference to FIG. 7. Any other description methods may be used.

Thus, trigger information is configured as described so far.

[Operations Corresponding to Operation Modes of the Reception Apparatus]

As described above, in accordance with an operation mode specified by trigger information, the reception apparatus 20 controls the operation of a coordinated application. There are three operation modes; the TPT mode, the first direct mode, and the second direct mode. The following describes these modes in which the reception apparatus 20 operates.

[1. The Operation Mode: The TPT Mode]

First, with reference to FIG. 8 through FIG. 15, the case in which the reception apparatus 20 operates in the TPT mode is described.

[Operations of Component Apparatuses of the Broadcasting-Communication Coordinated System]

Referring to FIG. 8, there are shown the outlines of operations of apparatuses making up the broadcasting-communication coordinated system 1 when the reception apparatus 20 operates in the TPT mode.

In the broadcasting-communication coordinated system 1 shown in FIG. 8, a broadcast signal of broadcast content including trigger information is transmitted by the transmission apparatus 10 (S1). In addition, each broadcast signal is attached with the metadata associated with the broadcast content concerned.

In receiving a broadcast signal from the transmission apparatus 10 via a CATV network or a satellite communication network for example, the reception apparatus 20 receives a signal converted by a dedicated terminal such as a set-top box 50 via HDMI (High Definition Multimedia Interface) (S2). In this case, the output from the set-top box 50 is only broadcast content and trigger information, so that the reception apparatus 20 cannot use metadata.

In receiving a broadcast signal through the set-top box 50 (S2), in addition to receiving a broadcast signal directly (S1), the reception apparatus 20 may also extract trigger information to be transmitted along with the broadcast signal. Then, the reception apparatus 20 operates in the TPT mode in accordance with the operation mode specified in the extracted trigger information.

In addition, extracting trigger information transmitted from the transmission apparatus 10, the reception apparatus 20 sets or resets the media clock. Further, if the reception apparatus 20 determines that a TPT and an AMT are to be obtained in accordance with trigger information, then the reception apparatus 20 accesses the TPT/AMT server 30 through the Internet 90 to request for a TPT and an AMT (S3).

In response to the request by the reception apparatus 20, the TPT/AMT server 30 transmits the TPT and the AMT to the reception apparatus 20 through the Internet 90 (S4). The reception apparatus 20 receives the TPT and the AMT transmitted from the TPT/AMT server 30 through the Internet 90 and holds the received TPT and AMT.

When a time indicated by the media clock has entered the valid period of an event, for example, the reception apparatus 20 references the TPT and the AMT held therein to identify an action to be specified by this valid event.

In accordance with an action identification result, the reception apparatus 20 accesses the application server 40 through the Internet 90 to request for a coordinated application that is executed in coordination with the selected broadcast content (S5).

In response to the request from the reception apparatus 20, the application server 40 transmits the coordinated application to the reception apparatus 20 through the Internet 90 (S6). The reception apparatus 20 receives the coordinated application transmitted from the application server 40 and activates the received coordinated application.

Subsequently, in the reception apparatus 20, when a time indicated by the media clock has entered the valid period of an event, for example, an action specified by the valid event is identified. Then, in accordance with the identified action, the coordinated application executes event fire, suspension or restart, or termination, for example.

As described above, in the broadcasting-communication coordinated system 1 shown in FIG. 8, the reception apparatus 20 operates in the TPT mode specified in the trigger information transmitted from the transmission apparatus 10, thereby executing a coordinated operation with the TPT/AMT server 30 and the application server 40. Consequently, in the reception apparatus 20, a coordinated application for the selected broadcast content is obtained and executed.

The trigger signal transmitted from the transmission apparatus 10 is also transmitted to the reception apparatus 20 through a dedicated terminal, such as the set-top box 50 for example, so that, in the broadcasting-communication coordinated system 1, coordinated applications may be provided without involving the jobs of renovating broadcasting transmission path facilities such as a CATV network and dedicated terminals or obtaining permission of a broadcaster that relays broadcasting, for example.

It should be noted that, with reference to FIG. 8, a coordinated application and a TPT and an AMT are distributed through the Internet; however, it is also practicable to distribute a coordinated application and a TPT and an AMT by means of broadcasting, which will be described later.

(Detail Configuration of TPT)

The following describes the detail configuration of a TPT.

Referring to FIG. 9, there is shown one example of detail TPT configuration. Each TPT is written in a markup language, such as XML (Extensible Markup Language) for example.

As shown in FIG. 9, a TPT element is written to the root element of TPT. In the TPT element, an event and other information necessary for controlling the operation of a coordinated application are written.

The TPT element includes protocolVersion attribute, id attribute, tptVersion attribute, updatingTime attribute, expireDate attribute, serviceId attribute, baseURL attribute, Capabilities element, LiveTrigger element, and Application element.

In protocolVersion attribute, information indicative of the version of specifications defined in this TPT is specified. This version is made up of major version and minor version.

In id attribute, an ID for identifying this TPT is specified. For example, a character string with domain_name and program_id linked by "/" is specified in id attribute. It should be noted that program_id corresponds to segment_id and is an ID that may identify broadcast content.

In tptVersion attribute, the information indicative of the version of this TPT is specified.

In updatingTime attribute, the information indicative of the update period of this TPT is specified.

In expireDate attribute, the information indicative of the valid period of this TPT is specified.

In the serviceId attribute, an ID indicative in which of the services transmitted as included in a broadcast signal a coordinated application is transmitted is specified. For example, if a coordinated application is transmitted in NRT (Non RealTime) service, then the service id of NRT service is specified in serviceId attribute.

It should be noted that, in NRT (Non-RealTime) service, NRT content to be transmitted by use of a FLUTE session is once accumulated in a storage of a receiving machine and then reproduced. In use of NRT service, a coordinated application is transmitted instead of NRT content.

In baseURL attribute, a URL that is the base of a URL specified in this TPT is specified. For example, "http://xbc.com" is specified in baseURL attribute. Therefore, for other URLs to be specified in this TPT, a relative path with reference to the base URL may be specified.

In Capabilities element, information indicative of capabilities required for the reception apparatus 20 in controlling the operation of a coordinated application by use of this TPT is specified. Namely, if the reception apparatus 20 has a function specified in Capabilities element, the reception apparatus 20 determines that this TPT is usable. On the other hand, if the reception apparatus 20 does not have the specified function, then this TPT is ignored.

LiveTrigger element is a sub element of TPT element. In LiveTrigger element, the information indicative of the trigger information for a broadcaster or the like to execute an event with a desired timing in live-broadcasting broadcast content. Namely, this trigger information may be active trigger information (or activation trigger). LiveTrigger element includes URL attribute, deliveryType attribute, and pollPeriod attribute.

In URL attribute, a URL for accessing a trigger server (a trigger server 80 shown in FIG. 44 to be described later) for providing this trigger information is specified.

In deliveryType attribute, a type for receiving this trigger information is specified. In deliveryType attribute, "Streaming," "long polling," or "short polling" is specified.

In pollPeriod attribute, a time indicative of an interval for inquiring a trigger server for this trigger information is specified. This time is specified in units of seconds for example.

Application element is a sub element of TPT element, in which the information associated with a coordinated application is written. Application element includes appID attribute, appType attribute, appName attribute, globalId attribute, appVersion attribute, testApp attribute, cookieSpace attribute, frequencyOfUse attribute, expireDate attribute, availInternet attribute, availBroadcast attribute, URL element, Capabilities element, ContentItem element, and Event element.

In appID attribute, an ID for identifying this coordinated application is specified.

In appType attribute, the information associated with a file attribute for example of this coordinated application is specified.

In appName attribute, the information indicative of the name of this coordinated application is specified. For example, if two or more coordinated applications are activatable, then the names of these coordinated applications are present to the user for selection, thereby allowing the user to activate a desired coordinated application.

In globalId attribute, a URI (Uniform Resource Identifier) that may globally identify this coordinated application is specified.

In appVersion attribute, the information indicative of the version of this coordinated application is specified.

testApp attribute is specified if this coordinated application is used for the purpose of testing product development for example. Therefore, in a normal operation, this testApp attribute is ignored.

In cookieSpace attribute, the information indicative of the capacity of the storage necessary for the execution of this coordinated application is specified.

In frequencyOfUse attribute, the information indicative how often this coordinated application is used is specified. For example, this frequency of use is specified in units of hours or days. Coordinated applications having higher frequency of use may be cached preferentially by this attribute.

In expireDate attribute, the information indicative of the valid period (or the expiration date) of this coordinated application is specified.

In availInternet attribute, the information indicative whether or not this coordinated application is distributed through the Internet is specified.

In availBroadcast attribute, the information indicative whether or not this coordinated application is distributed by broadcasting is specified.

In URL element, the URL indicative of the acquisition source of this coordinated application is specified. For example, the URL of the application server 40 is specified in URL element. However, if "http://xbc.com" for example is specified as base URL described above, a character string following "/" thereafter is specified in this URL element.

In Capabilities element, the information indicative of the function required for the reception apparatus 20 in the execution of this coordinated application is specified. Namely, if the reception apparatus 20 has the function specified in Capabilities element, the reception apparatus 20 determines that this coordinated application is executable.

ContentItem element is a sub element of Application element and describes the information associated with the cache of files (an HTML file and a JPEG file for example) making up this coordinated application. ContentItem element includes URL element, updateAvail element, and Size element.

In URL attribute, the URL of a file to be cached is specified.

In updatesAvail attribute, the information associated with updating of a file to be cached is specified.

In Size attribute, the information indicative of the size of a file to be cached is specified.

Event element is a sub element of Application element and describes the information for controlling the operation of a coordinated application. Event element includes eventId attribute, destination attribute, action attribute, diffusion attribute, and data element.

In eventId attribute, the ID for identifying an event is specified.

In destination attribute, a device subject to the control of a coordinated application by this event is specified. In this example, if an external apparatus (not shown) is connected to the reception apparatus 20, this apparatus is specified as an event target device in addition to the reception apparatus 20.

For example, if the event target device is a high-definition television receiver, "HDTV (High Definition Television)" is specified in destination attribute; if the event target device is a standard definition television receiver, "SDTV (Standard Definition Television)" is specified in destination attribute. If the event target device is an external apparatus, "external 1" or "external 2" for example is specified in destination attribute.

In action attribute, "register," "execute," "suspend," "terminate," or "stream-event" for example is specified.

"Register" is an action for specifying the capture or registration of a coordinated application. The registration of a coordinated application here denotes the storing of the priority and valid period of an obtained coordinated application by relating the priority and valid period therewith.

"Execute" is an action for specifying the capture or activation of a coordinated application. If a specified coordinated application is in a suspended state, "execute" restarts the execution of this coordinated application.

"Suspend" is an action for discontinuing an active coordinated application to pause the discontinued coordinated application.

"Terminate" is an action for terminating an active coordinated application.

"Stream-event" is an action for firing an event in an active coordinated application.

It should be noted that, in addition to the above-mentioned actions, other actions, "suspend-execute" or "terminate-execute" for example, may be specified in action attribute.

"Suspend-execute" is a composite action in which "execute" for a specified coordinated application and "suspend" for another coordinated application are combined. Namely, "suspend-execute" is specified in action attribute if the capture or activation of a specified coordinated application and the suspension of other coordinated applications are instructed.

"Terminate-execute" is a composite action in which "execute" for a specified coordinated application and "terminate" for other coordinated applications are combined. Namely, "terminate-execute" is specified in action attribute if the capture or activation of a target coordinated application and the termination of other coordinated applications are instructed.

In diffusion attribute, the information for stochastically diffusing the timing for applying an event in the reception apparatus 20 is specified. Setting this information prevents the accesses from being concentrated to a particular period when two or more reception apparatuses 20 obtain coordinated applications from the application server 40.

In data element, data to be referenced when firing this event if the action is a stream event.

The TPT is configured as described so far.

It should be noted that the specifications of TPT shown in FIG. 9 are illustrative only, so that other specifications may be employed as required.

(Detail Configuration of AMT)

The following describes detail specification of an AMT.

Referring to FIG. 10, there is shown one example of detail specifications of an AMT. An AMT is written in a markup language such as XML.

As shown in FIG. 10, an AMT element is written to the AMT root element. Information such as the valid period of an event for controlling the operation of a coordinated application is written to AMT element.

AMT element includes protocolVersion attribute, segmentId attribute, beginMT attribute, and Activation element.

In protocolVersion attribute, the information indicative of the version of the specification defined in this AMT is specified. This version is made up of major version and minor version.

In segmentId attribute, the ID corresponding to id attribute of a TPT is specified. This ID identifies the TPT corresponding to this AMT. For example, a character string with domain_name and program_id linked with "/" is specified in segmentId attribute.

In beginMT attribute, the information indicative of the start time of the time range of a target segment (or a particular section) is specified.

In Activation element, which is a sub element of AMT element, the information for specifying a valid event for a coordinated application is written. Activation element includes targetId attribute, a startTime attribute, and endTime attribute.

In targetId attribute, an ID for specifying an event for a coordinated application to be written to a TPT is specified. For example, for this ID, a combination of an ID specified in appID attribute of Application element of the TPT and an ID to be specified in eventId attribute of Event element is specified.

In startTime attribute, the information indicative of the start time of the valid period of an event to be identified by targetId attribute is specified.

In endTime attribute, the information indicative of the end time of the valid period of an event to be identified by targetId attribute is specified.

To be more specific, the valid period of each event is defined by startTime attribute and endTime attribute indicative of two points on the progression time axis of corresponding broadcast content. Then, for example, in the reception apparatus 20, when a time indicated by the media clock is within the valid period, the event corresponding to this valid period is made valid; when a time indicated by the media clock is before or after the valid period, the event corresponding to this valid period is made invalid.

It is also practicable that, when the time indicated by the media clock has passed the validity start time indicated by startTime attribute, the event corresponding to the validity start time is made valid. In this case, however, only startTime attribute may be specified without specifying endTime attribute.

In other words, in the reception apparatus 20, when the time indicated by the media clock has satisfied a predetermined validity condition based on valid period and valid time, the event corresponding to this validity condition is made valid, thereby identifying an action specified by this event.

Thus, the AMT is configured as described so far.

It should be noted that the specifications of AMT shown in FIG. 10 are illustrative only, so that other specifications may be employed as required.

(Status Transitions of Coordinated Applications)

Figure 11:
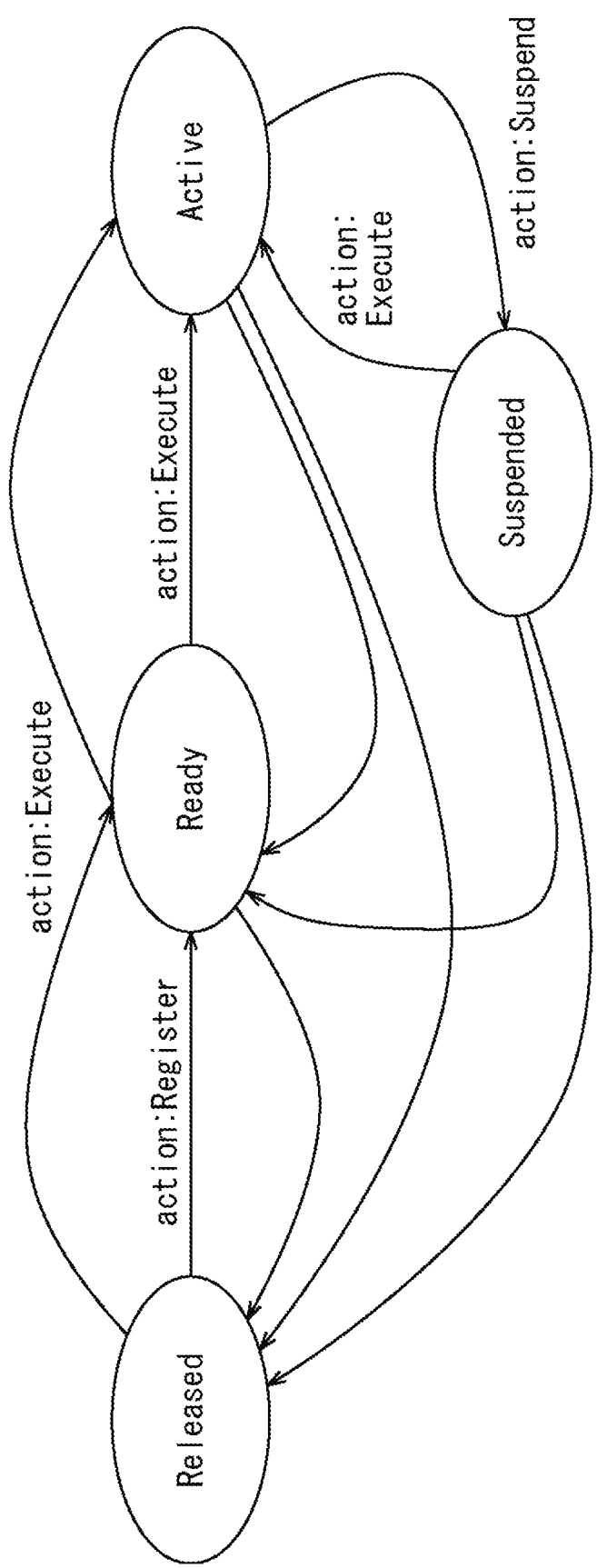
FIG. 11 is a diagram illustrating status transitions of a coordinated application.

Referring to FIG. 11, there is shown a status transition diagram illustrating the status transitions of a coordinated applications operating in the reception apparatus 20 in response to actions that are register, execute, suspend, and terminate. As shown in FIG. 11, the coordinated application is in any one of four statuses "released," "ready," "active," "and suspended."

In the released status, a coordinated application has not yet been captured by the reception apparatus 20. In the ready status, a coordinated application has been registered in the reception apparatus 20 but not yet activated. In the active status, the activated coordinated application is being executed. In the suspended status, the execution of the coordinated application was discontinued and the information indicative of the state indicative of discontinuation has been held in the save memory 228B.

If "register" is identified as an action and a coordinated application is captured (or registered) when the coordinated application has been in the released status (or not yet captured by the reception apparatus 20), then the coordinated application transitions to the ready status.

When "execute" is identified as an action with the coordinated application in the ready status and this coordinated application is activated in response to this "execute," the coordinated application transitions to the active status.

If "suspended" is identified as an action with the coordinated application in the active status and the active coordinated application is suspended in response to "suspended," then the coordinated application transitions to the suspended state.

If "execute" is identified as an action with the coordinated application in the suspended status and suspended coordinated application is restated in response to this "execute," then the coordinated application transitions to active status.

If "terminate" is identified as an action with the coordinated application in the active status or the suspended status and the active coordinated application is terminated, the coordinated application transitions to the ready status.

If the valid period of the coordinated application has passed with the coordinated application is in the ready status, the active status, or the suspended status, then the coordinated application transitions to the released status.

Figure 12:
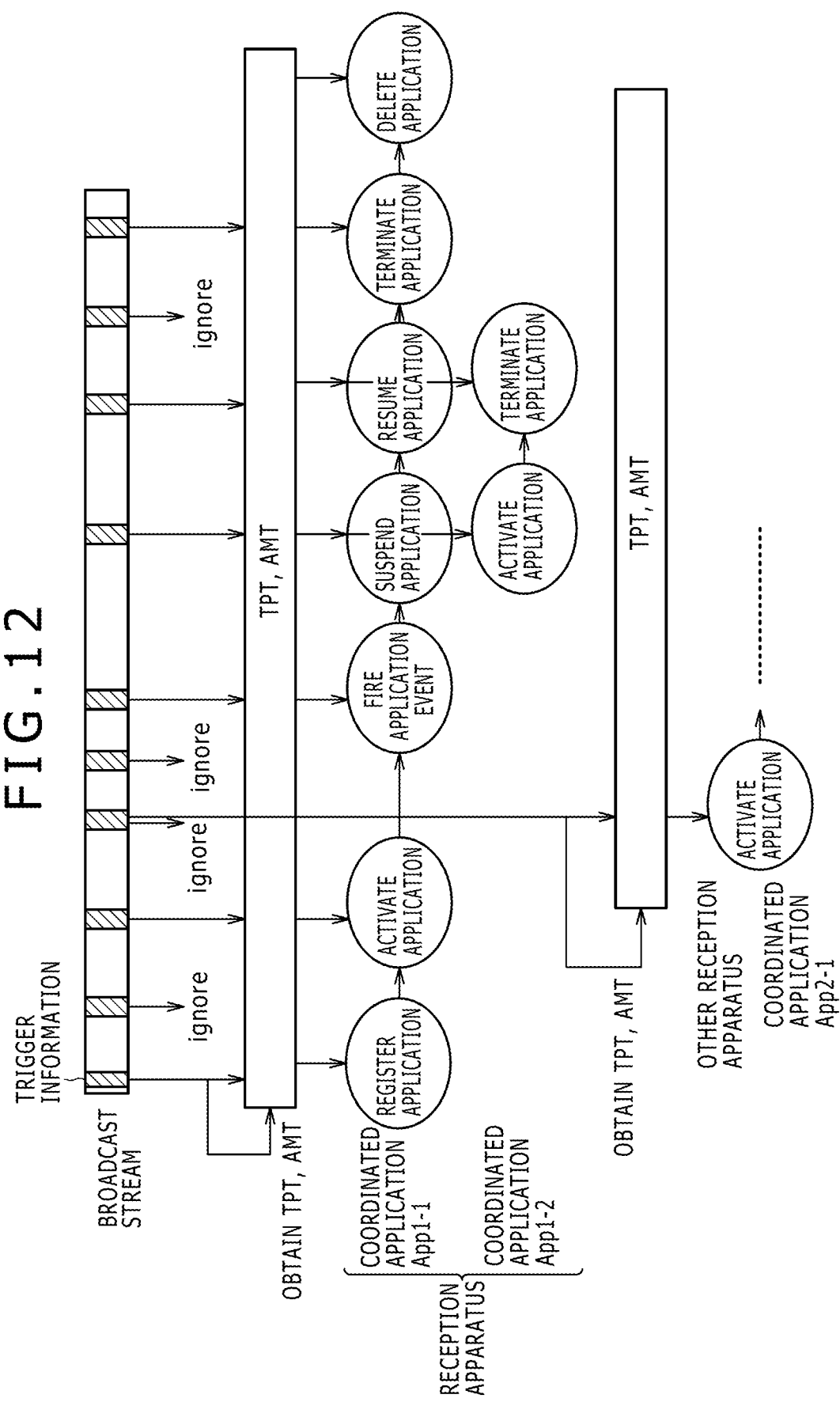
FIG. 12 is a diagram illustrating relationships of actions and status transitions.

Referring to FIG. 12, there is shown relations between the actions and the status transitions.

FIG. 12 schematically shows how the operations of a coordinated application are controlled in accordance with the trigger information transmitted as included in a broadcast signal of broadcast content and the actions identified by TPT and AMT.

It should be noted that, in the reception apparatus 20 shown in FIG. 12, two coordinated applications having different appIDs are executed, so that these coordinated applications are hereafter referred to as coordinated application App1-1 and coordinated application App1-2. A coordinated application that is executed in another apparatus such as an external apparatus connected to the reception apparatus 20 is referred to as coordinated application App2-1. It should also be noted that the reception apparatus 20 does not respond to all extracted trigger information, so that the reception apparatus 20 ignores the trigger information that has already been processed.

In the reception apparatus 20, if coordinated application App1-1 is captured, held, and registered in response to "register" when coordinated application App1-1 is in the released status (or not yet captured by the reception apparatus 20), the coordinated application App1-1 transitions to the ready status.

In the reception apparatus 20, if coordinated application App1-1 is activated in response to "execute" when coordinated application App1-1 is in the ready state, then coordinated application App1-1 transitions to the active status.

In another apparatus, if coordinated application App2-1 is captured and activated in response to "execute" when coordinated application App2-1 is in the released status (or not yet captured by this apparatus), then coordinated application App2-1 transitions to the active status.

In the reception apparatus 20, if an event is fired in active coordinated application App1-1 in response to "stream-event" when coordinated application App1-1 is in the active status, then coordinated application App1-1 remains in the active status.

In the reception apparatus 20, if active coordinated application App1-1 is suspended in response to "suspend" when coordinated application App1-1 is in the active status, then coordinated application App1-1 transitions to the suspended status. In addition, in the reception apparatus 20, if coordinated application App1-2 different from coordinated application App1-1 in the suspended status is activated in response to "execute," then coordinated application App1-2 transitions to the active status.

Then, in the reception apparatus 20, if suspended coordinated application App1-1 is restarted in response to "execute" when coordinated application App1-1 is in the suspended status, coordinated application App1-1 transitions to the active status. Also, in the reception apparatus 20, if active coordinated application App1-2 is terminated in response to "terminate" when coordinated application App1-2 is in the active status, coordinated application App1-2 transitions to the ready status.

To be more specific, if a scene in which a CM is inserted halfway in a television program is assumed, for example, then coordinated application App1-1 for CM is executed when coordinated application App1-1 for television program is in the suspended status. Then, when the CM inserted halfway in the television program comes to an end, the television program is restarted. At the same time, coordinated application App1-2 for CM is terminated, upon which coordinated application App1-1 for television program is restarted.

Also, in the reception apparatus 20, if active coordinated application App1-1 is terminated in response to "terminate" when coordinated application App1-1 is in the active status, then coordinated application App1-1 transitions to the ready status.

It should be noted that, if the valid period of coordinated application App1-1, coordinated application App1-2, or coordinated application App2-1 has passed when the coordinated application is in the ready status, the active status, or the suspended status, the coordinated application concerned is deleted from the cache memory 227 and the registration of this coordinated application is cancelled, upon which coordinated application App1-1, coordinated application App1-2, or coordinated application App2-1 transitions to the released state.

Thus, the statuses of coordinated applications transition as described so far.

(A Method of Capturing Coordinated Applications)

Figure 13:
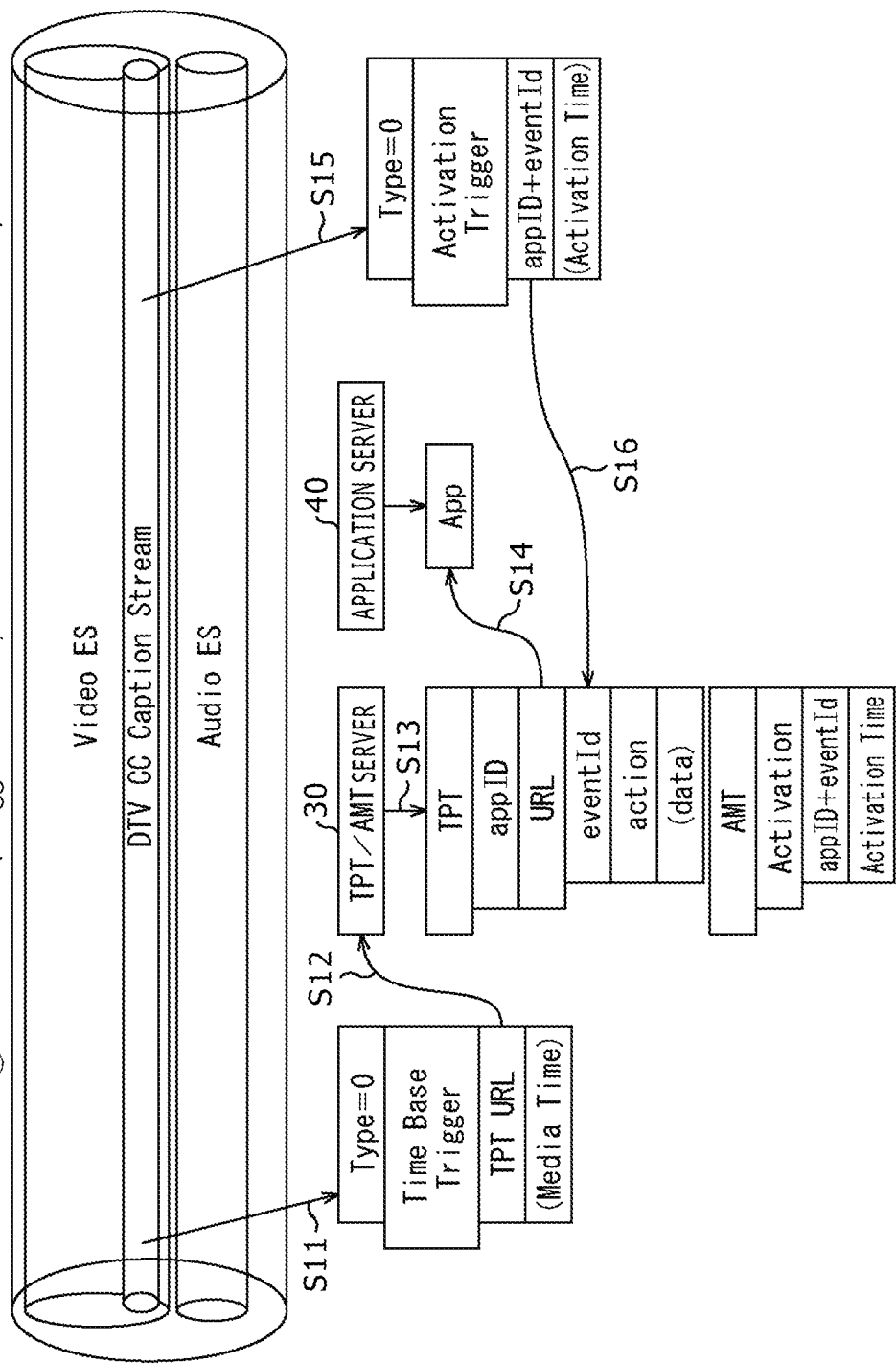
FIG. 13 is a diagram illustrating a method of capturing a coordinated application to be Internet-distributed in the TPT mode.
Figure 14:
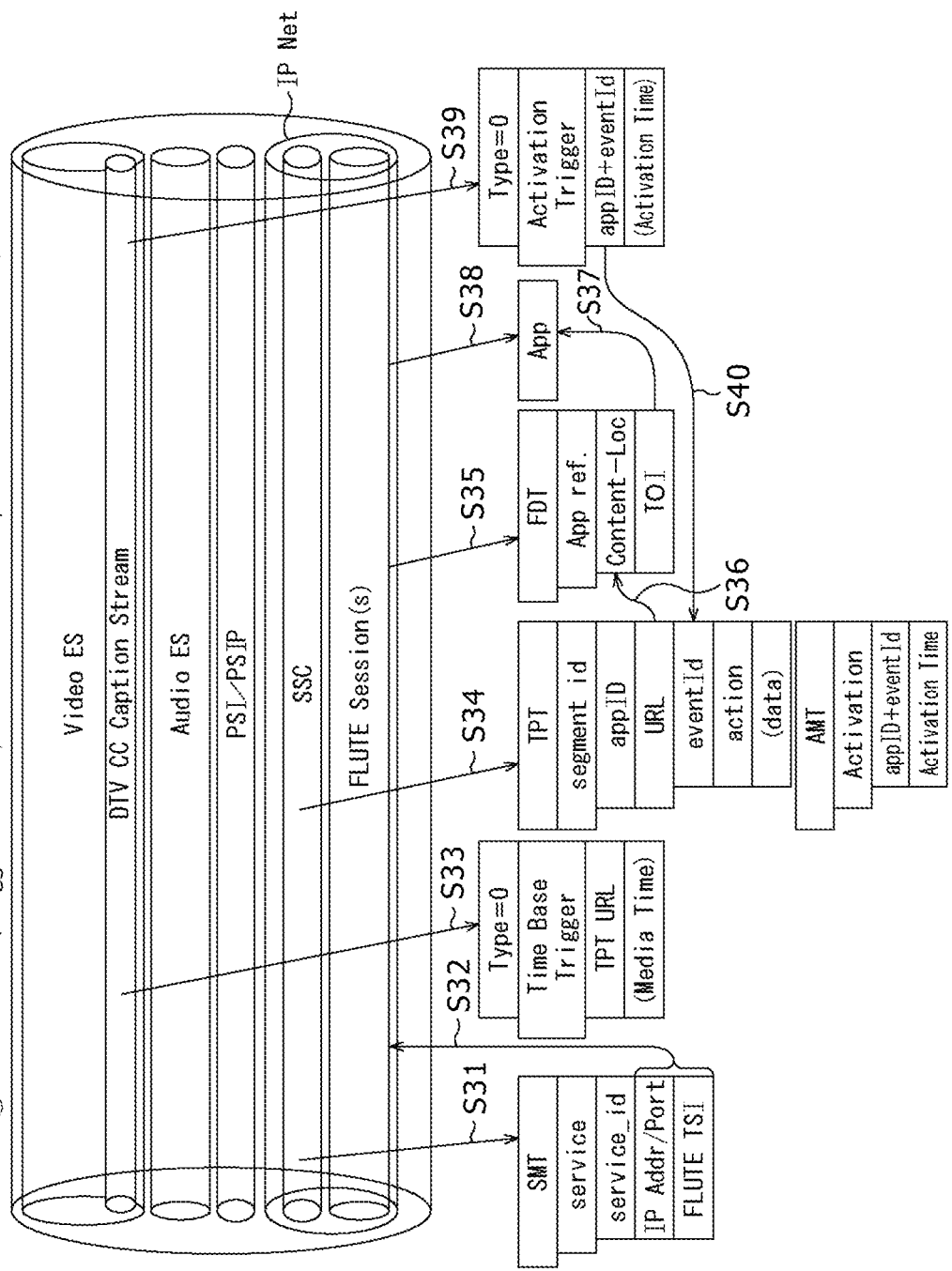
FIG. 14 is a diagram illustrating a method of capturing a coordinated application to be broadcasting-distributed in the TPT mode.

The following describes a method of capturing coordinated applications when the reception apparatus 20 operates in the TPT mode with reference to FIG. 13 and FIG. 14.

FIG. 13 shows a method of capturing coordinated applications that are distributed through the Internet.

FIG. 13 shows a broadcast stream with a video stream (Video ES) and an audio stream (Audio ES) multiplexed. In a caption stream (DTV CC Caption Stream), trigger information is inserted with a given timing. It should be noted that the caption stream is equivalent to caption data included in an MPEG2 video stream described above.

In this case, in the reception apparatus 20, the following operation is executed in order to capture a coordinated application that is distributed through the Internet.

To be more specific, if time-base trigger information is extracted from a caption stream, the reception apparatus 20 sets media_time included in the extracted trigger information to the media clock (S11). It should be noted that, because the operation mode is the TPT mode in this case, "0" is specified for trigger information type.

In addition, the reception apparatus 20 accesses the TPT/AMT server 30 via the Internet 90 in accordance with the URL made up of a character string obtained by linking domain_name, segment_id and the like included in this trigger information (S12). Consequently, the reception apparatus 20 obtains a TPT and an AMT from the TPT/AMT server 30 (S13).

Then, in accordance with the URL specified in the obtained TPT, the reception apparatus 20 accesses the application server 40 via the Internet 90 to obtain a coordinated application (App) (S14). Thus, a coordinated application distributed through the Internet is obtained.

It should be noted that, if subsequently active trigger information is extracted from the caption stream (S15), the reception apparatus 20 references the TPT and the AMT to identify an action specified by an event corresponding to appID and eventId included in this trigger information (S16). Then, the reception apparatus 20 controls the operation of the coordinated application in accordance with the identified action.

Also, when the time indicated by the media clock has entered the valid period of an event, for example, the reception apparatus 20 controls an operation such as event fire, suspension, restart, or termination of each coordinated application in accordance with an action specified by a valid event.

Thus, coordinated applications that are distributed through the Internet are captured as described so far. This method provides hybrid services with broadcasting and communication combined, through which coordinated applications that are distributed via the Internet can be obtained.

FIG. 14 shows a method of capturing coordinated applications that are distributed by broadcasting.

As shown in FIG. 14, a broadcast stream is multiplexed with PSI/PSIP, SSC, and FLUTE in addition to a video stream (Video ES) and an audio stream (Audio ES). Further, trigger information is inserted in a caption stream (DTV CC Caption Stream) included in the video stream.

PSI/PSIP (Program Specific Information/Program and System Information Protocol) includes information such as control information and program information necessary for selecting and receiving broadcast content of a particular channel.

SSC (Service Signaling Channel) and FLUTE (File Delivery over Unidirectional Transport) session are transmitted by IP (Internet Protocol) communication.

To be more specific, SSC is transmitted by a fixed IP address and UDP port in a transport stream; for example, 224.0.23.60 is used for IP address and 4937 is used for port number. SMT, PTP, and AMT are transmitted by SSC.

SMT (Service Map Table) provides information indicative of the attribute information of the service level of NRT service included in each transport stream.

FLUTE is a protocol for executing session management of files that are transmitted by broadcasting. To be more specific, FLUTE is positioned in a layer above the physical layer at the bottom, and TS (Transport Stream), IP (Internet Protocol), and UDP (User Datagram Protocol) layers. Above FLUTE, various files such as NRT content are positioned.

Namely, in NRT broadcasting, an IP packet specified with a UDP port in IP communication is transmitted to establish a FLUTE session. By this FLUTE session, a file making up NRT content for example is identified.

It should be noted that, in FLUTE, each file to be transmitted is managed as one object by TOI (Transport Object Identifier). In addition, a set of two or more objects is managed by TSI (Transport Session Identifier) as one session.

Each object that is transmitted from the transmission apparatus 10 is transmitted as stored in an IP packet. The header of this IP packet has the identification information of each session as TSI (Transport Session Identifier). In addition, this header has, as TOI (Transport Object Identifier), the identification information of two or more objects to be transmitted in each session. Namely, in a FLUTE session, two types of identification information, TSI and TOI, allow the specification of a particular file.

In addition, in a FLUTE session, an FDT (File Delivery Table) for transmitting various types of attribute information of NRT service files is periodically transmitted. An FDT is transmitted as a file with TOI=0 for every TSI. Index information for every TSI is written to the FDT concerned. It should be noted however that an FDT is transmitted by an FDT instance that is an object for transmitting FDTs.

As described above, NRT content is often made up of two or more files, so that the reception apparatus 20 restores NRT content from two or more files by use of index information written to an FDT.

Namely, by use of a FLUTE session, the reception apparatus 20 is capable of downloading NRT content in IP packets included in a broadcast stream. In FIG. 14, a coordinated application is transmitted by use of a FLUTE session as with the method in which NRT content is transmitted.

To be more specific, in the reception apparatus 20, the following operation is executed to capture a coordinated application that is distributed by broadcasting.

First, the reception apparatus 20 obtains an SMT that is transmitted by SSC (S31). In the SMT, service id, IP Addr/Port, FLUTE TSI, and so on are written as the attribute information in units of NRT services.

In this example, the ID of the NRT service concerned is specified in service id. In IP Addr/Port, the IP addresses and port numbers of transmission source and transmission destination are specified. In FLUTE TSI, the TSI of the NRT service concerned is specified.

Namely, a FLUTE session is executed by the transmission of a sequence of IP packets that are distinguished by a combination of transmission source IP address and destination IP address of each IP packet and destination port number that are used for the transmission of NRT content, so that the reception apparatus 20 identifies an NRT service by a combination of these IP addresses and port number (S32).

Further, if time-base trigger information is extracted from a caption stream, the reception apparatus 20 sets media_time included in this trigger information to the media clock (S33). However, because the operation mode is the TPT mode in this example, so that "0" is specified in the type of trigger information.

Next, the reception apparatus 20 obtains the TPT and the AMT transmitted by SSC (S34). In addition, the reception apparatus 20 obtains the FDT with TOI=0 from the FLUTE session identified in S32 (S35). Content-Loc, TOI, and so on are written to the FDT. In Content-Loc, file identification information is specified by URI (Uniform Resource Identifier). In TOI, the ID of a file object to be transmitted is specified.

The reception apparatus 20 references the obtained FDT to identify Content-Loc matching the URL of the TPT (S36) and then identify the TOI related with this Content-Loc. Consequently, the reception apparatus 20 can obtain a coordinated application (App) from the FLUTE session on the basis of the object identified by the identified TOI (S37, S38). Thus, a coordinated application distributed by broadcasting is captured.

It should be noted that, if active trigger information is subsequently extracted from the caption stream (S39), the reception apparatus 20 references the TPT and the AMT to identify an action specified by an event corresponding to appID and eventId included in this trigger information (S40). Next, in response to the identified action, the reception apparatus 20 controls the operation of the coordinated application.

In addition, if the time indicated by the media clock has entered the valid period of an event, for example, the reception apparatus 20 controls the an operation such as event fire, suspension or restart, or termination of the coordinated application in response to an action specified by the valid event.

Thus, coordinated applications that are distributed by broadcasting are captured as described so far. In this method, a TPT, an AMT, and a coordinated application are distributed by broadcasting, so that, even if the reception apparatus 20 is not connected to the Internet 90, the reception apparatus 20 is capable of capturing coordinated applications.

(Exemplary Operation of the TPT Mode)

Figure 15:
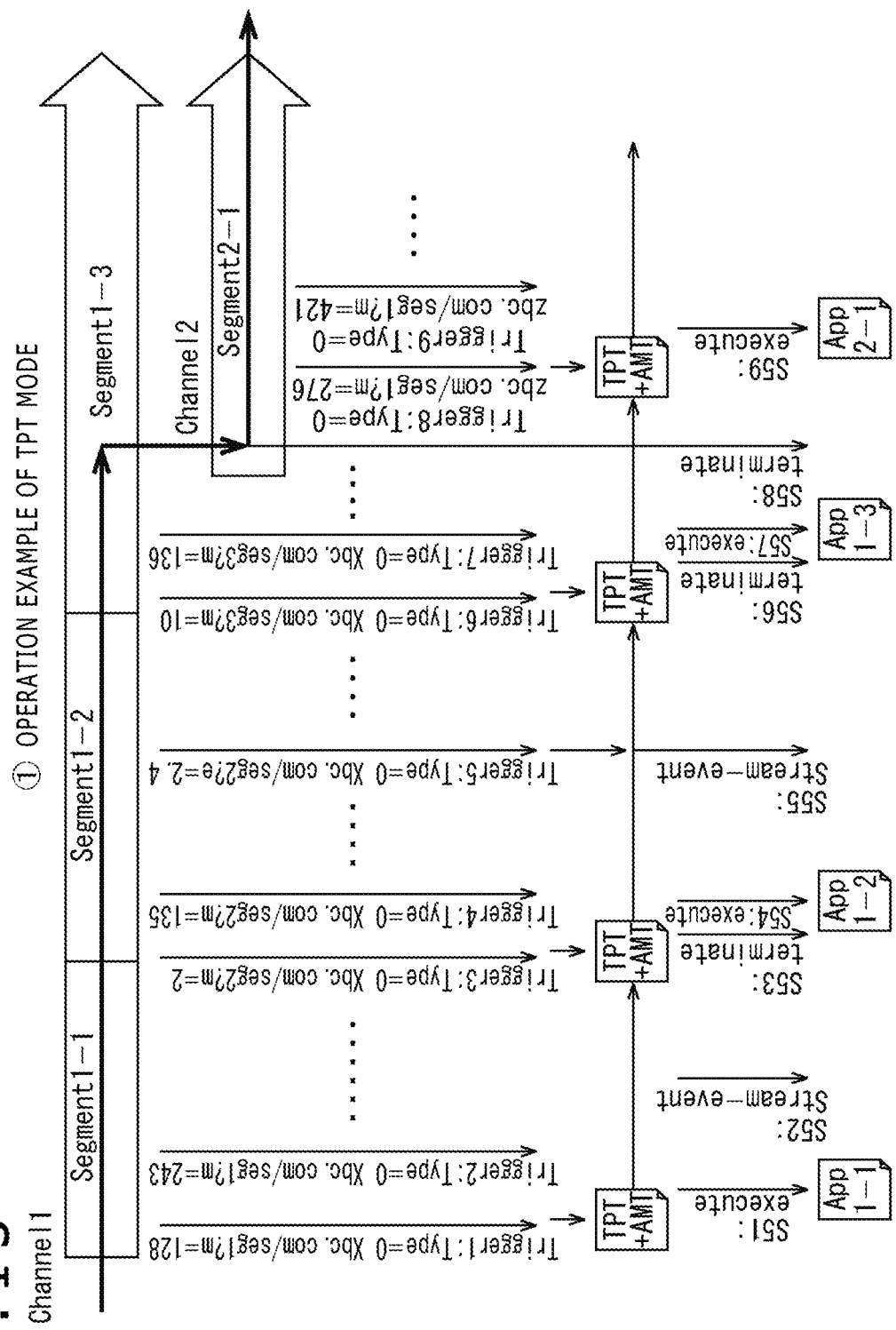
FIG. 15 is a diagram illustrating an exemplary operation in the TPT mode.

In the reception apparatus 20, an operation of a coordinated application as shown in FIG. 15 for example may be realized in the above-mentioned TPT mode. FIG. 15 shows an exemplary operation of the TPT mode.

As shown in FIG. 15, a television program of channel 1 (Channel1) is selected in the reception apparatus 20 and, as time passes, the segments of this television program change from Segment1-1, to Segment1-2, Segment1-3, and so on. Switching is done from channel 1 to channel 2 when the segment is Segment1-3 and the television program of channel 2 (Channel2) is selected in the reception apparatus 20.

In this case, in the reception apparatus 20, when the trigger information transmitted from the transmission apparatus 10 is extracted, the operation of the coordinated application is controlled in accordance with this trigger information.

Namely, in the reception apparatus 20, if trigger information (Trigger1) is extracted when the television program of Segment1-1 is being selected, the operation in the TPT begins because "0" is specified in the type of this trigger information.

In addition, the reception apparatus 20 sets the media clock to 128(s) on the basis of media_time (m=128) included in this trigger information (Trigger1). Consequently, the media clock counts time in units of seconds.

If the reception apparatus 20 determines to capture a TPT and an AMT on the basis of domain_name and segment_id included in this trigger information (Trigger1), then the reception apparatus 20 obtains the TPT and the AMT from the TPT/AMT server 30 and holds the captured TPT and AMT. In this example, the TPT and the AMT for a television program of Segment1-1 (segment_id="seg1") to be broadcast by xbc broadcasting station (domain_name="xbc.com") are captured.

Next, when the time indicated by the media clock has entered the valid period of an event, the reception apparatus 20 controls the operation of the coordinated application in accordance with an action specified by the valid event. In this example, because "execute" is identified as an action, the reception apparatus 20 obtains coordinated application App1-1 from the application server 40 and activates this coordinated application (S51).

Then, if trigger information (Trigger2) is extracted when the television program of Segment1-1 is being selected, the reception apparatus 20 resets the media clock to 243(s) on the basis of media_time (m=243) included in this trigger information (Trigger2).

However, in this trigger information (Trigger2), as compared with the trigger information (Trigger1) mentioned above, domain_name and segment_id included in the trigger information have not changed, so that new TPT and AMT are not captured here.

When a stream event is identified as an action specified by the valid event, the event for the active coordinated application App1-1 is fired in the reception apparatus 20 (S52).

Subsequently, trigger information extraction is continuously executed, in which the segment of channel 1 (Channel1) to be broadcast by xbc broadcasting station changes from Segment1-1 to Segment1-2 due to program switching, for example.

If trigger information (Trigger3) is extracted when the television program of Segment1-2 is being selected, the reception apparatus 20 resets the media clock to 2(s) on the basis of media_time (m=2) included in this trigger information (Trigger3).

Because segment_id has changed from seg1 to seg2, the reception apparatus 20 captures a TPT and an AMT from the TPT/AMT server 30 and holds the captured TPT and AMT. In this example, the TPT and the AMT of the television program of Segment1-2 (segment_id="seg2") to be broadcast by xbc broadcasting station (domain_name="xbc.com") are captured.

Then, when "terminate" is identified as an action specified by the valid event, the reception apparatus 20 terminates active coordinated application App1-1 (S53). Further, when "execute" is identified as an action specified by the value event, the reception apparatus 20 obtains coordinated application App1-2 from the application server 40 and activates the captured coordinated application (S54).

Next, if trigger information (Trigger4) is extracted when the television program of Segment1-2 is being selected, the reception apparatus 20 resets the media clock to 135(s) on the basis of media_time (m=135) included in this trigger information (Trigger4). However, because domain_name for example has not changed in this trigger information (Trigger4), no TPT and so on are captured anew.

Subsequently, trigger information extraction is continuously executed. If trigger information (Trigger 5) is extracted when the television program of Segment1-2 is being selected, the reception apparatus 20 identifies appID=2 and eventID=4 on the basis of event_id (e=2.4) included in this trigger information (Trigger5). If appID of active coordinated application App1-2 is "2" and eventId of the stream event identified by the TPT and the AMT is "4," for example, the event for active coordinated application App1-2 is fired (S55).

Subsequently, trigger information extraction is continuously executed, in which the segment of channel 1 (Channel1) to be broadcast by xbc broadcasting station changes from Segment1-2 to Segment1-3 due to program switching for example.

If trigger information (Trigger6) is extracted when the television program of Segment1-3 is being selected, the reception apparatus 20 resets the media clock to 10(s) on the basis of media_time (m=10) included in this trigger information (Trigger6).

In addition, because segment_id has changed from seg2 to seg3, the reception apparatus 20 captures a TPT and an AMT from the TPT/AMT server 30 and holds the captured TPT and AMT. Here, the TPT and the AMT for the television program of Segment1-3 (segment_id="Seg3") to be broadcast by xbc broadcasting station (domain_name="xbc.com") are captured, for example.

Next, when "terminate" is identified as an action specified by the valid event, the reception apparatus 20 terminates the active coordinated application App1-2 (S56). Further, when "execute" is identified as an action specified by the valid event, the reception apparatus 20 obtains coordinated application App1-3 from the application server 40 and activates the captured coordinated application (S57).

Next, if trigger information (Trigger7) is extracted when the television program of Segment1-3 is being selected, the reception apparatus 20 resets the media clock to 136(s) on the basis of media_time (m=136). However, because domain_name and so on have not changed in this trigger information (Trigger7), a new TPT and so on are not captured here.

Subsequently, trigger information extraction is continuously executed. If the channel is switched from channel 1 of xbc broadcasting station to channel 2 of zbc broadcasting station in response to a user channel switching operation, for example, the television program (Segment2-1) of channel 2 (Channel2) is selected in the reception apparatus 20. At this moment, in response to the channel switching, active coordinated application App1-3 is terminated in the reception apparatus 20 (S58).

Next, if trigger information (Trigger8) is extracted when the television program of Segment1-3 is being selected, the reception apparatus 20 resets the media clock to 276(s) on the basis of media_time (m=276) included in this trigger information (Trigger8).

Because domain_name and segment_id have both changed, the reception apparatus 20 captures a TPT and an AMT from the TPT/AMT server 30 and holds the captured TPT and AMT. Here, the TPT and the AMT for the television program of Segment2-1 (segment_id="seg1") to be broadcast by zbc broadcasting station (domain_name="zbc.com") are captured.

Then, when "execute" is identified as an action specified by the valid event, the reception apparatus 20 captures coordinated application App2-1 from the application server 40 and activates the captured coordinated application (S59).

Next, if trigger information (Trigger9) is extracted when the television program of Segment2-1 is being selected, the reception apparatus 20 resets the media clock to 421(s) on the basis of media_time (m=421) included in this trigger information (Trigger9). However, because domain_name and so on have not changed in this trigger information (Trigger9), a new TPT and so on are not captured.

The subsequent processing is not shown in FIG. 15. If domain_name and so on have changed in the trigger information due to channel switching for example, the reception apparatus 20 captures a new TPT and a new AMT. At the same time, the reception apparatus 20 resets the media clock on the basis of media_time included in the extracted trigger information. Then, when the time indicated by the media clock has entered the event valid period, the reception apparatus 20 controls the operation of a coordinated application in response to an action specified by the valid event.

It should be noted that, in the exemplary operation shown in FIG. 15, a TPT, an AMT, and a coordinated application are distributed through the Internet; it is also practicable to distribute a TPT, an AMT, and a coordinated application through broadcasting as described so far.

Although not shown in the exemplary operation shown in FIG. 15 for the brevity of description, of the trigger information extracted in the reception apparatus 20, the trigger information that is Trigger5 is active trigger information and the other trigger information is time-base trigger information.

Thus, the reception apparatus 20 operates in the TPT mode as described so far.

[2. Operation Mode: The First Direct Mode]

The following describes the case in which the reception apparatus 20 operates in the first direct mode with reference to FIG. 16 through FIG. 19.

(Operations of Component Apparatuses of the Broadcasting-Communication System)

Figure 16:
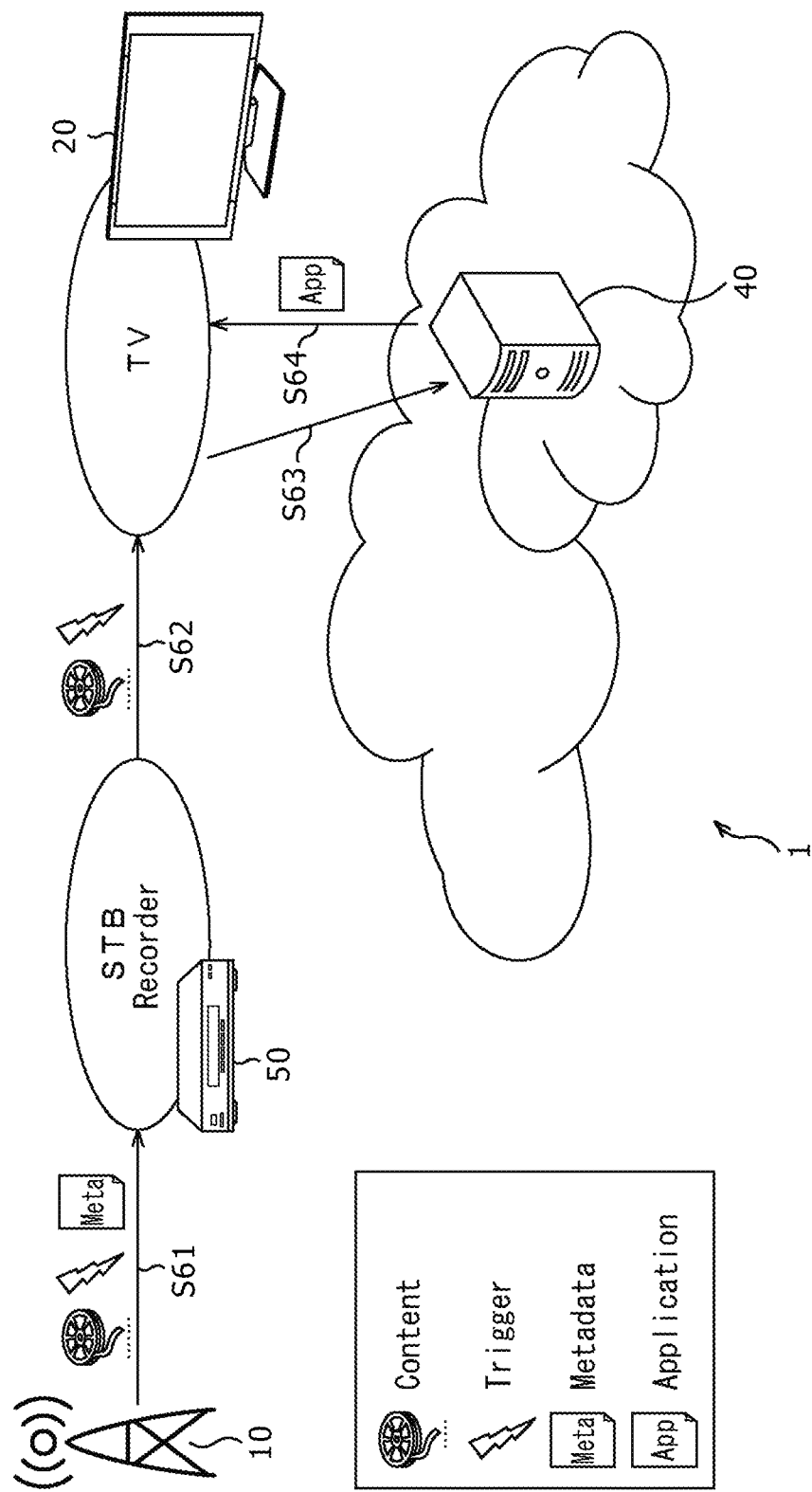
FIG. 16 is a diagram illustrating outlines of operations of apparatuses in a first direct mode.

Referring to FIG. 16, there is shown an outline of operations of apparatuses making up the broadcasting-communication coordinated system 1 when the reception apparatus 20 operates in the first direct mode.

At S61 and S62 shown in FIG. 16, as with S1 and S2 shown in FIG. 8, metadata and trigger information are transmitted along with broadcast content from the transmission apparatus 10 and only the trigger information is received by the reception apparatus 20. If trigger information is extracted, then the reception apparatus 20 operates in the first direct mode in accordance with the operation mode specified in this trigger information.

At the same time, the reception apparatus 20 accesses the application server 40 via the Internet 90 in accordance with this trigger information to request for a coordinated application that is executed in coordination with the broadcast content being selected (S63).

In response to the inquiry from the reception apparatus 20, the application server 40 transmits a requested coordinated application to the reception apparatus 20 via the Internet 90 (S64). The reception apparatus 20 captures the coordinated application transmitted from the application server 40 and activates the captured coordinated application immediately.

Further, if trigger information is extracted, the reception apparatus 20 controls the operation of the coordinated application in accordance with additional_information included in the extracted trigger information.

As described above, in the broadcasting-communication coordinated system 1 shown in FIG. 16, the reception apparatus 20 operates in the first direct mode specified in the trigger information transmitted from the transmission apparatus 10, thereby providing a coordinated operation with the application server 40. Consequently, in the reception apparatus 20, a coordinated application for the broadcast content being selected is captured and executed.

In addition, the trigger information transmitted from the transmission apparatus 10 is transmitted to the reception apparatus 20 also through a dedicated terminal such as the set-top box 50, so that, in the broadcasting-communication coordinated system 1, coordinated applications may be provided without involving such jobs as remodeling CATV network transmission path facilities and terminals and obtaining a license from a relay broadcaster, for example.

It should be noted that, with reference to FIG. 16, coordinated applications are distributed through the Internet; it is also practicable to distribute coordinated applications by broadcasting, which will be described later.

(Method of Capturing Coordinated Applications)

Figure 17:
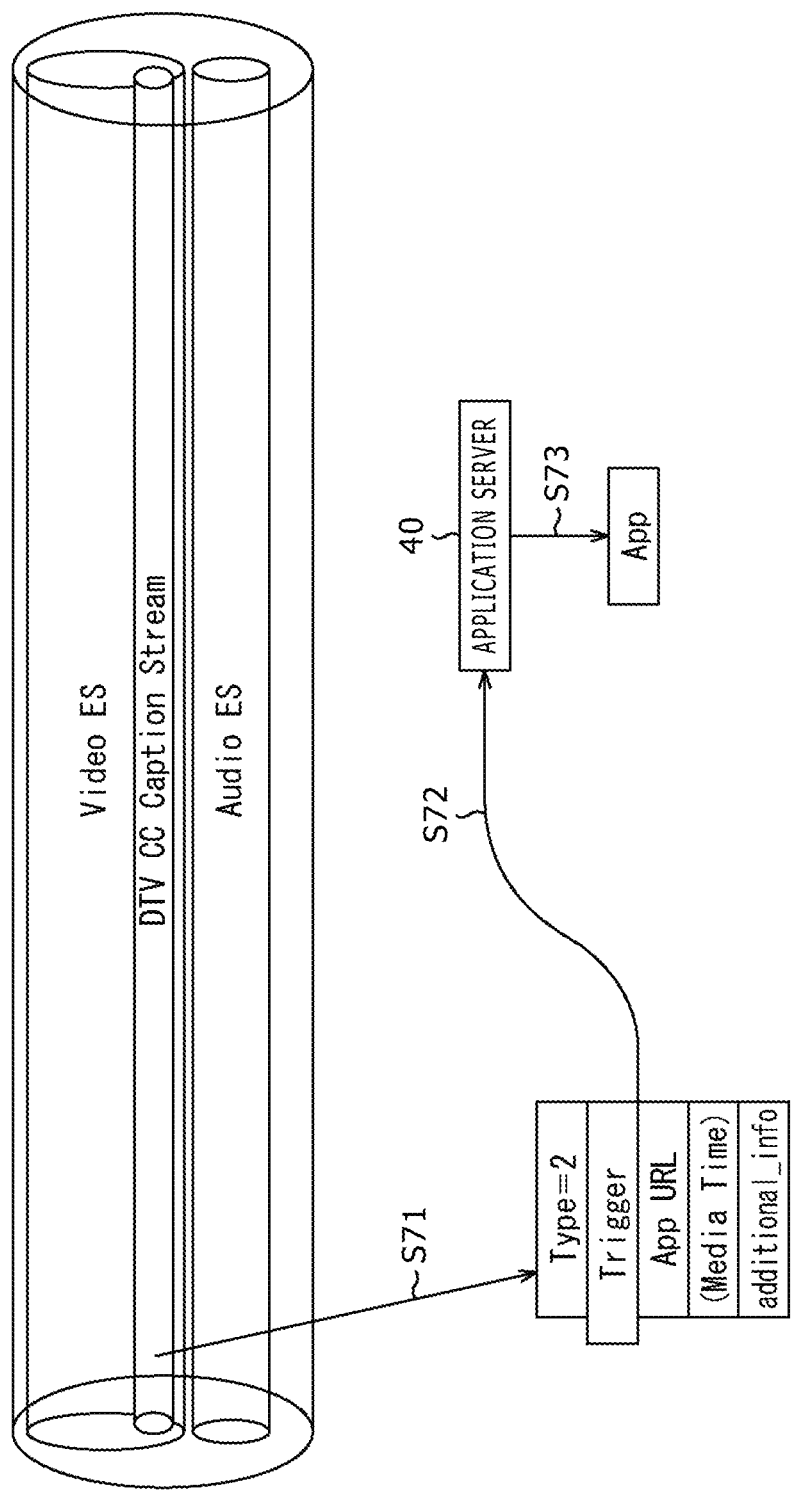
FIG. 17 is a diagram illustrating a method of capturing an Internet-distributed coordinated application in the first direct mode.
Figure 18:
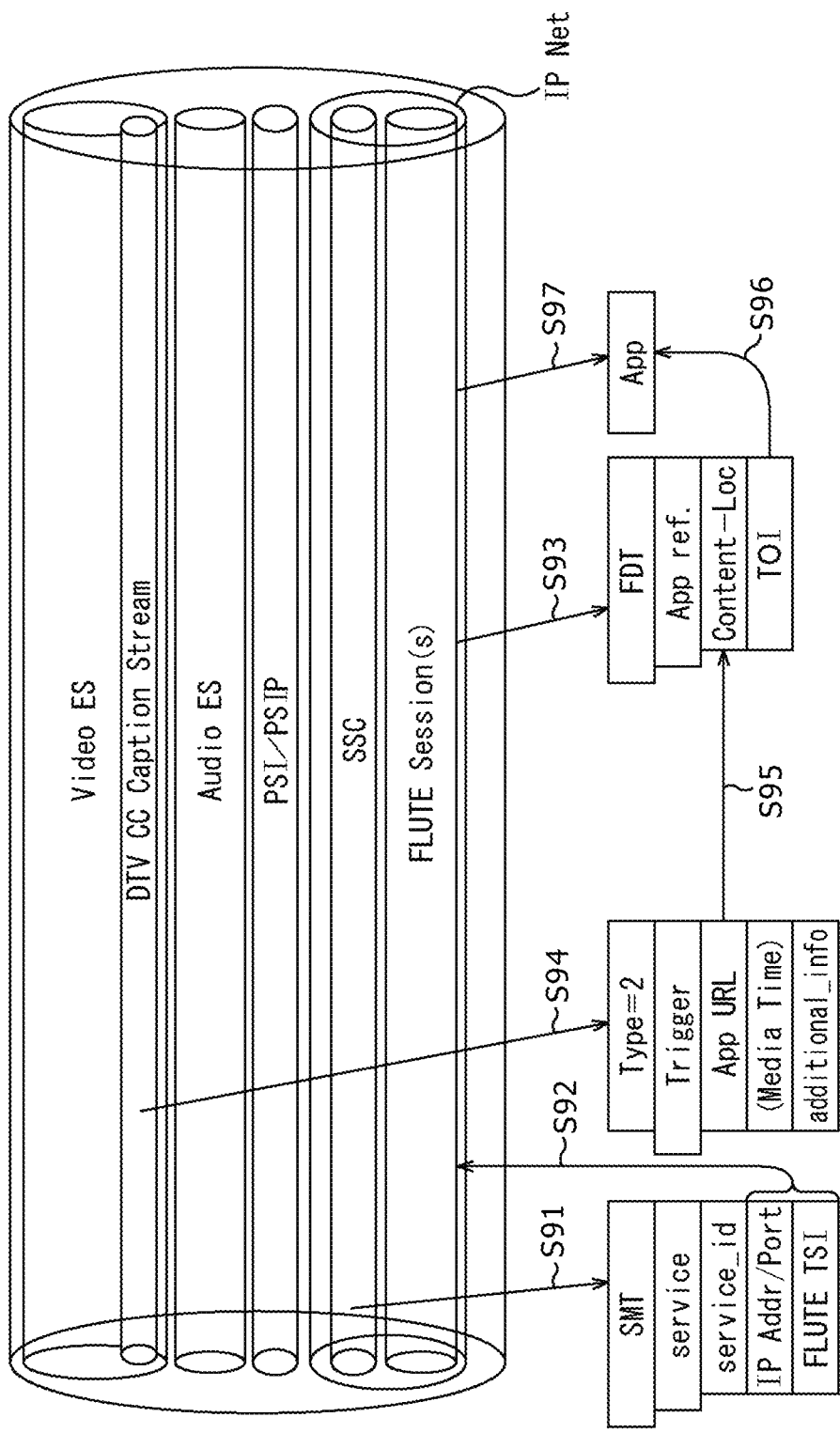
FIG. 18 is a diagram illustrating a method of capturing a broadcasting-distributed coordinated application in the first direct mode.

The following describes a coordinated application capturing method in the case where the reception apparatus 20 operates in the first direct mode with reference to FIG. 17 and FIG. 18.

Referring to FIG. 17, there is shown a method of capturing coordinated applications that are distributed through the Internet.

Internet distribution does not require to use SSC and FLUTE, so that a broadcast stream with a video stream (Video ES) and an audio stream (Audio ES) multiplexed is shown in FIG. 17. It should be noted that, in a caption stream (DTV CC caption stream) included in the video stream, trigger information is inserted with a given timing.

In this case, the following operation is executed in the reception apparatus 20 in order to capture a coordinated application distributed through the Internet.

To be specific, if trigger information is extracted from a caption stream (S71), the reception apparatus 20 obtains a URL ("App URL" in the figure) made up of a character string obtained by linking domain_name, segment_id, and the like included in the extracted trigger information. However, because the operation mode is the first direct mode here, "2" is specified in the type of the trigger information.

Then, in accordance with the obtained URL, the reception apparatus 20 accesses the application server 40 through the Internet 90 (S72). Consequently, the reception apparatus 20 may capture a coordinated application (App) from the application server 40 (S73).

Coordinated applications are captured through the Internet as described above. This method does not use a FLUTE session and so on, so that even reception apparatuses not compatible with NRT services may capture coordinated applications distributed through the Internet.

Referring to FIG. 18, there is shown a method of capturing coordinated applications distributed by broadcasting.

As shown in FIG. 18, a broadcast stream is multiplexed with a video stream (Video ES), an audio stream (Audio ES), PSI/PSIP, SSC, and FLUTE. In a caption stream (DTV CC Caption Stream) included in the video stream, trigger information is inserted with a given timing.

In this case, in the reception apparatus 20, the following operation is executed in order to capture a coordinated application distributed by broadcasting.

To be more specific, the reception apparatus 20 obtains an SMT transmitted by SSC (S91) and identifies the NRT service in a FLUTE session by a combination of IP address and port number (S92).

In addition, the reception apparatus 20 obtains an FDT with TOI=0 from the FLUTE session identified in S92 (S93).

If trigger information is extracted from a caption stream (S94), then the reception apparatus 20 obtains a URL ("App URL" in the figure) made up of a character string obtained by linking domain_name, segment_id, and the like included in the extracted trigger information. It should be noted that, because the operation mode is the first direct mode here, "2" is specified in the type of trigger information.

Next, the reception apparatus 20 identifies Content-Loc that matches the captured URL (S95) and then identifies a TOI related with this Content-Loc. Consequently, the reception apparatus 20 may capture a coordinated application (App) on the basis of an object identified by the identified TOI in a FLUTE session (S96, S97).

Thus, coordinated applications distributed by broadcasting are captured as described so far. This method allows the reception apparatus 20 to capture coordinated applications even if the reception apparatus 20 is not connected to the Internet 90.

(Exemplary Operation in the First Direct Mode)

Figure 19:
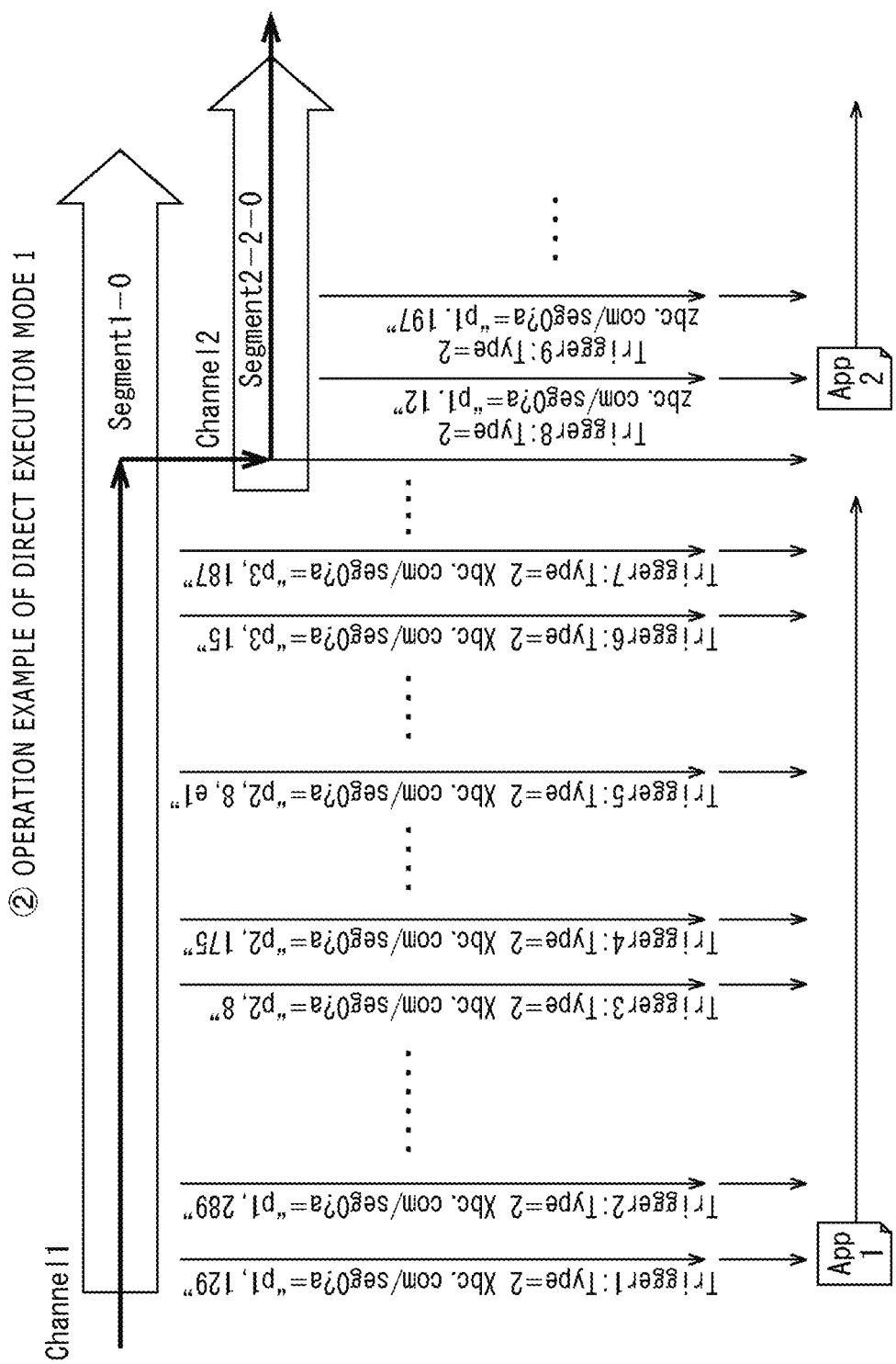
FIG. 19 is a diagram illustrating an exemplary operation in the first direct mode.

When the reception apparatus 20 operates in the first direct mode described above, a coordinated application operation as described with reference to FIG. 19 may be realized. FIG. 19 shows an exemplary operation in the first direct mode.

As shown in FIG. 19, in the reception apparatus 20, a television program of channel 1 (Channel1) with segment being Segment1-0 is being selected and then the channel is switched from channel 1 to channel 2 (Channel2) to select a television program with segment being Segment2-0-0.

In this case, in the reception apparatus 20, when trigger information transmitted from the transmission apparatus 10 is exacted, an operation of the coordinated application is controlled in accordance with this trigger information.

To be more specific, in the reception apparatus 20, if trigger information (Trigger1) is extracted when the television program of Segment1-0 is being selected, "2" is specified in the type of this trigger information (Trigger1), so that an operation in the first direct mode begins.

The reception apparatus 20 accesses the application server 40-1 of xbc broadcasting station in accordance with a URL (http://xbc.com/seg0, for example) made up of a character string obtained by linking domain_name, segment_id, and the like included in this trigger information (Trigger1) and captures coordinated application App1, immediately activating the captured coordinated application.

In accordance with additional_information (a="p1,129") included in this trigger information (Trigger1), the reception apparatus 20 controls the operation of the coordinated application. In this example, "p1" indicative of the ID of the television program being selected and "129" indicative of media_time are specified as additional_information, so that coordinated application App1 operates in accordance with these specifications.

To be more specific, unlike the TPT mode described above, the coordinated application cannot execute an operation based on TPT and AMT in the first direct mode. Hence, in the first direct mode, additional_information is attached to trigger information by the business operator side and transmits given additional_information to each coordinated application, thereby allowing each coordinated application to execute an operation based on this additional information.

Subsequently, in the reception apparatus 20, Trigger2, . . . , Trigger3, Trigger4, . . . , Trigger5, . . . , Trigger6, Trigger 7 are sequentially extracted as trigger information when the television program of Segment1-0 is being selected.

In the reception apparatus 20 in the first direct mode, the execution of coordinated application App1 is continued until channel switching occurs and domain_name changes. In this case, the values of additional_information included in the trigger information changes, so that coordinated application App1 executes processing in accordance with these values. This processing includes the firing of an event for coordinated application App1 or the capturing of data by accessing a predetermined server, for example.

If channel 1 is switched to channel 2, the reception apparatus 20 accesses the application server 40-2 of zbc broadcasting station in accordance with a URL (http://zbc.com/seg0, for example) made up of a character string obtained by linking domain_name, segment_id and the like included in this trigger information (Trigger8), thereby capturing coordinated application App2 and activating this coordinated application immediately.

Also, in accordance with additional_information (a="p1, 12") included in this trigger information (Trigger8), the reception apparatus 20 controls the operation of coordinated application App2.

Subsequently, in the reception apparatus 20, Trigger9, . . . are sequentially extracted as trigger information when the television program of Segment2-2-0 is being selected and coordinated application App2 executes operations on the basis of additional_information included in the trigger information.

It should be noted that, in the exemplary operation shown in FIG. 19, coordinated applications are distributed through the Internet; it is also practicable to distribute coordinated applications by broadcasting as described above.

Thus, the reception apparatus 20 operates in the first direct mode as described so far.

[3. The Operation Mode: The Second Direct Mode]

The following describes an example in which the reception apparatus 20 operates in the second direct mode with reference to FIG. 20 through FIG. 24.

(Operations of Component Apparatuses of the Broadcasting-Communication Coordinated System)

Figure 20:
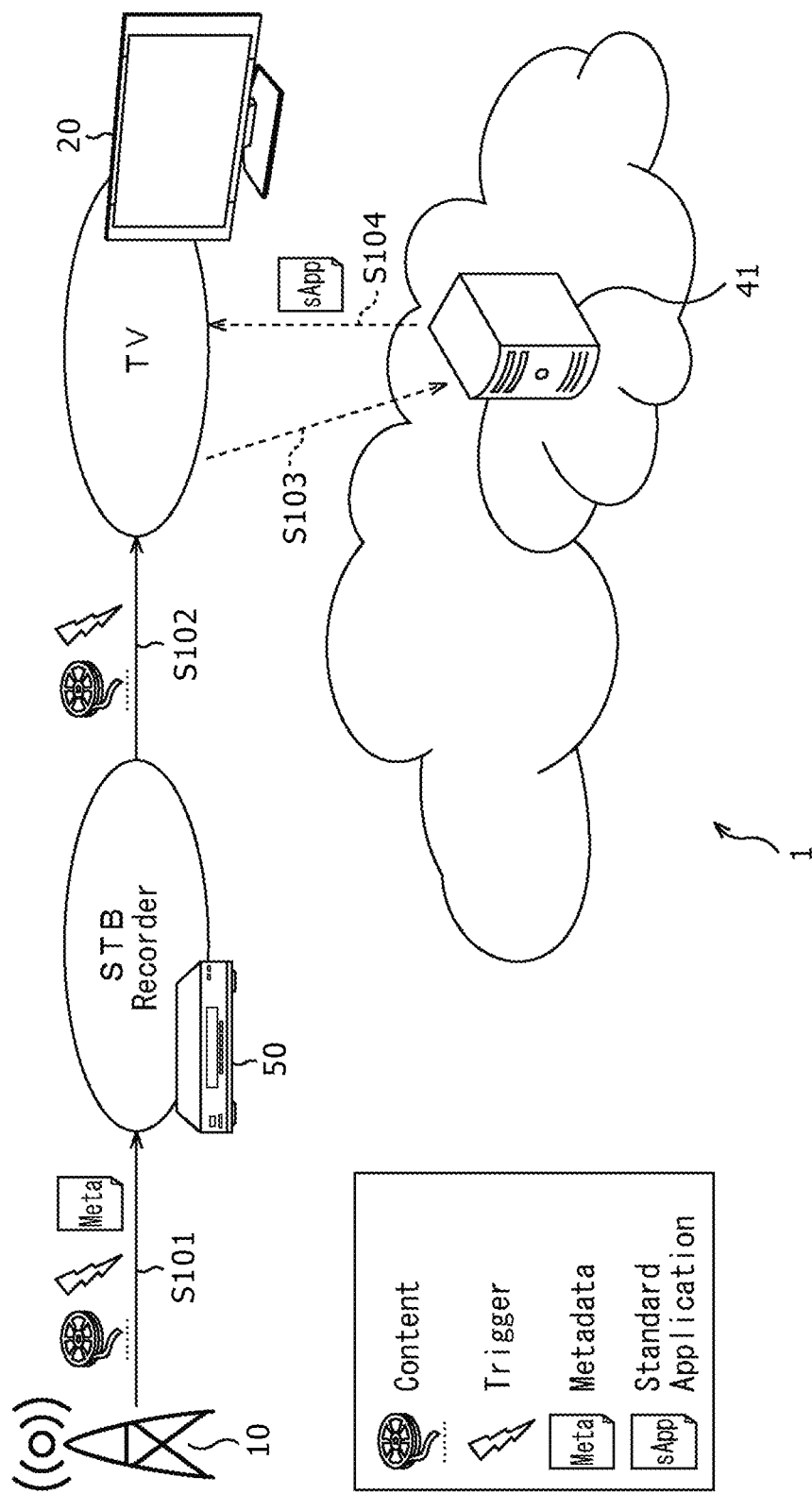
FIG. 20 is a diagram illustrating outlines of operations of apparatuses in a second direct mode.

Referring to FIG. 20, there is shown an outline of operations of apparatuses making up the broadcasting-communication coordinated system 1 when the reception apparatus 20 operates in the second direct mode.

As with S1 and S2 shown in FIG. 8, metadata and trigger information are transmitted along with broadcast content by the transmission apparatus 10 at S101 and S102 shown in FIG. 20 and only the trigger information is received by the reception apparatus 20. Then, if the trigger information is extracted, the reception apparatus 20 operates in the second direct mode in accordance with the operation mode specified in this trigger information.

In addition, in accordance with this trigger information, the reception apparatus 20 accesses the standard application server 41 through the Internet 90 to request for a standard coordinated application that is executed in coordination with the broadcast content being selected (S103).

In response to the inquiry from the reception apparatus 20, the standard application server 41 transmits the standard coordinated application to the reception apparatus 20 through the Internet 90 (S104). The reception apparatus 20 captures the standard coordinated application from the standard application server 41 and activates the captured standard coordinated application immediately.

If trigger information is extracted, the reception apparatus 20 controls the operation of the standard coordinated application in accordance with additional_information included in this trigger information.

As described above, in the broadcasting-communication coordinated system 1, the reception apparatus 20 operates in the second direct mode specified in the trigger information transmitted from the transmission apparatus 10, thereby providing a coordinated operation with the standard application server 41. Consequently, in the reception apparatus 20, a standard coordinated application that is executable in coordination with the broadcast content being selected is captured and executed.

In addition, the trigger information transmitted from the transmission apparatus 10 is transmitted to the reception apparatus 20 also through a dedicated terminal such as the set-top box 50 for example, so that a standard coordinated application may be provided without involving such jobs as remodeling CATV network transmission path facilities and terminals and obtaining a license from a relay broadcaster, for example.

It should be noted that, with reference to FIG. 20, an example in which a standard coordinated application is distributed through the Internet was described; it is also practicable to hold a standard coordinated application in the reception apparatus 20 in advance and read the standard coordinated application therefrom for execution, which will be described later.

(A Method of Capturing a Standard Coordinated Application)

Figure 21:
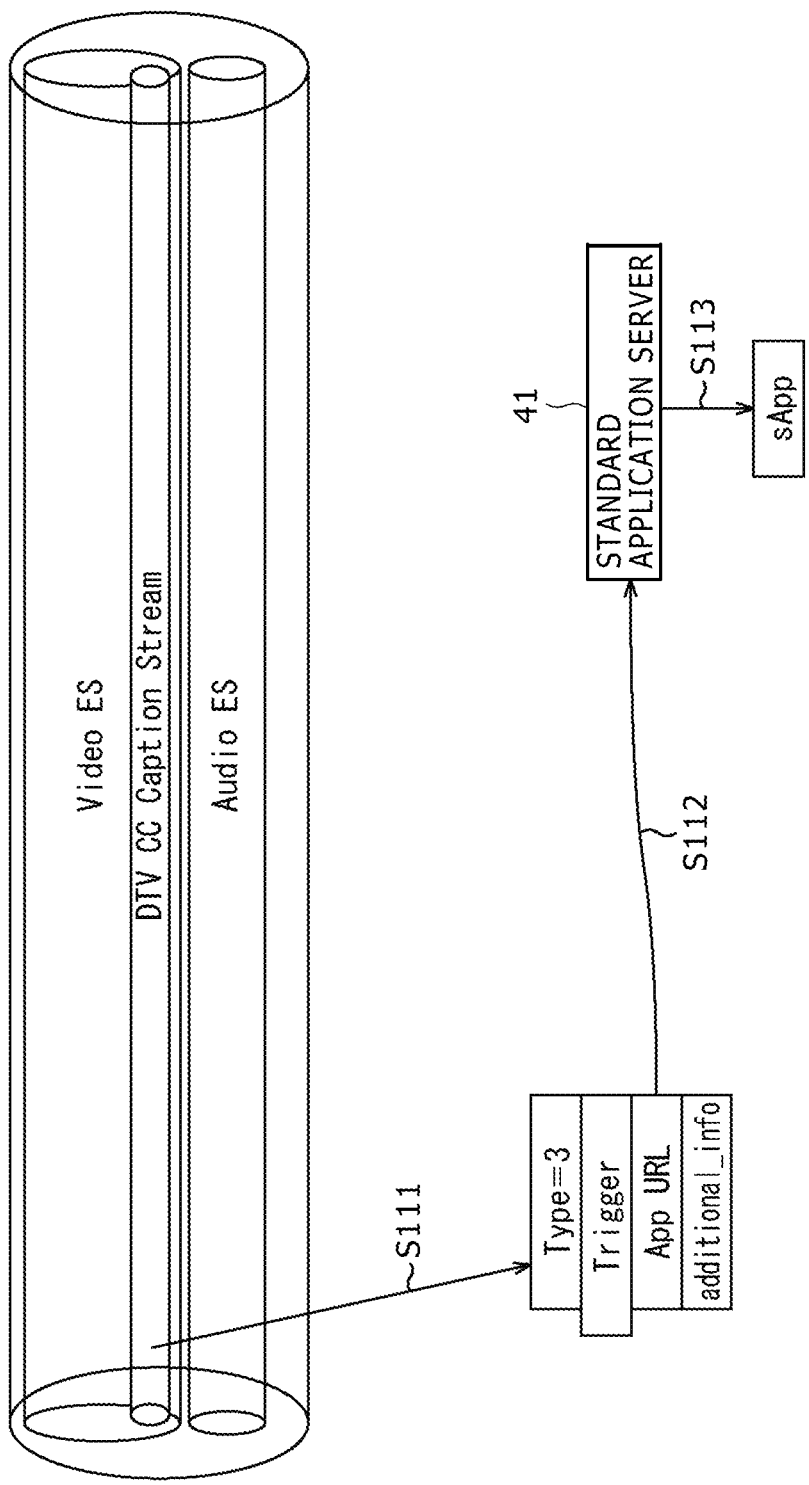
FIG. 21 is a diagram illustrating a method of capturing an Internet-distributed coordinated application in the second direct mode.
Figure 22:
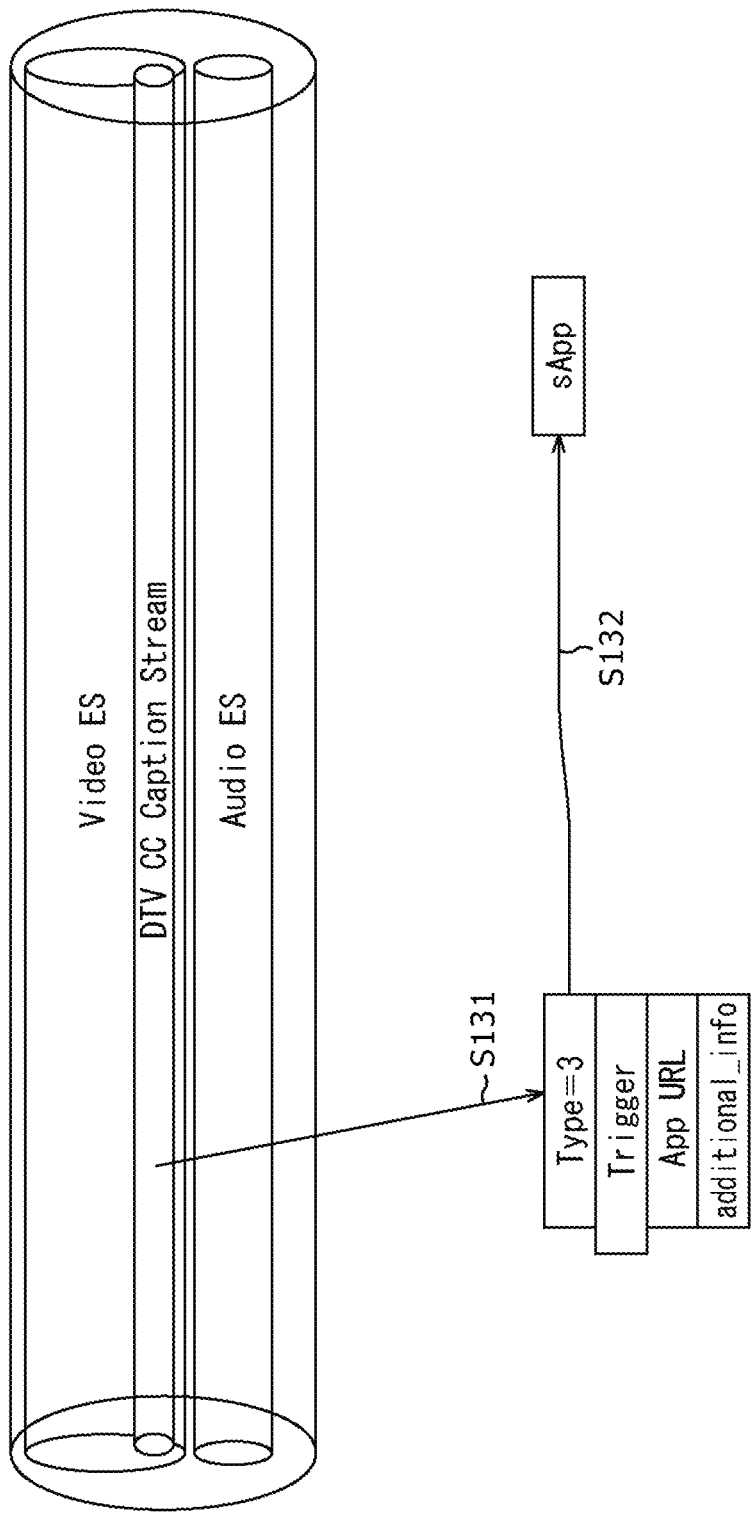
FIG. 22 is a diagram illustrating a method of capturing a standard coordinated application held in advance in the second direct mode.

The following describes a method of capturing a standard coordinated application when the reception apparatus 20 operates in the second direct mode with reference to FIG. 21 and FIG. 22.

Referring to FIG. 21, there is shown a method of capturing a standard coordinated application that is distributed through the Internet.

Internet distribution does not require the use of SSC and FLUTE, so that FIG. 21 shows a broadcast stream multiplexed with a video stream (Video ES) and an audio stream (Audio ES). In a caption stream (DTV CC Caption Stream) included in the video stream, trigger information is inserted.

In this example, the following operation is executed in the reception apparatus 20 in order to capture a coordinated application distributed through the Internet.

To be more specific, if trigger information is extracted from the caption stream (Sill), then the reception apparatus 20 obtains a URL ("App URL" in the figure) made up of a character string obtained by linking domain_name, segment_id and the like included in the extracted trigger information. It should be noted that, in this example, the operation mode is the second direct mode, so that "3" is specified in the type of the trigger information.

Then, in accordance with the obtained URL, the reception apparatus 20 accesses the standard application server 41 through the Internet 90 (S112). Consequently, the reception apparatus 20 may capture a standard coordinated application (sApp) from the standard application server 41 (S113).

Coordinated applications distributed through the Internet are captured as described above. This method allows an reception machine not compatible with NRT services to capture a standard coordinated application distributed through the Internet because a FLUTE session and so on are not used.

Referring to FIG. 22, there is shown a method of capturing a standard coordinated application that is held in the reception apparatus 20 in advance.

If a standard coordinated application is held in advance, SSC and FLUTE need not be used, so that a broadcast stream multiplexed with a video stream (Video ES) and an audio stream (Audio ES) is shown in FIG. 22. In a caption stream (DTV CC Caption Stream) included in the video stream, trigger information is inserted with a given timing.

In this case, the following operation is executed in the reception apparatus 20 in order to capture a standard coordinated application held in the reception apparatus 20 in advance.

To be more specific, if trigger information is extracted from a caption stream (S131), the reception apparatus 20 reads and captures the standard coordinated application (sApp) held in the standard coordinated application storage block 229 (S132). It should be noted that "3" is specified in the type of the trigger information because the operation mode is the second direct mode here.

Consequently, the reception apparatus 20 may capture the standard coordinated application.

Thus, the standard coordinated application held in advance is captured as described so far. This method allows the capturing the standard coordinated application held in advance without resorting to the Internet or broadcasting.

It should be noted that, in the above description, both cases were explained in which a standard coordinated application is distributed through the Internet and held in the reception apparatus 20 in advance; however, it is also practicable for a standard coordinated application to be distributed by broadcasting.

(Exemplary Operation in the Second Direct Mode)

Figure 23:
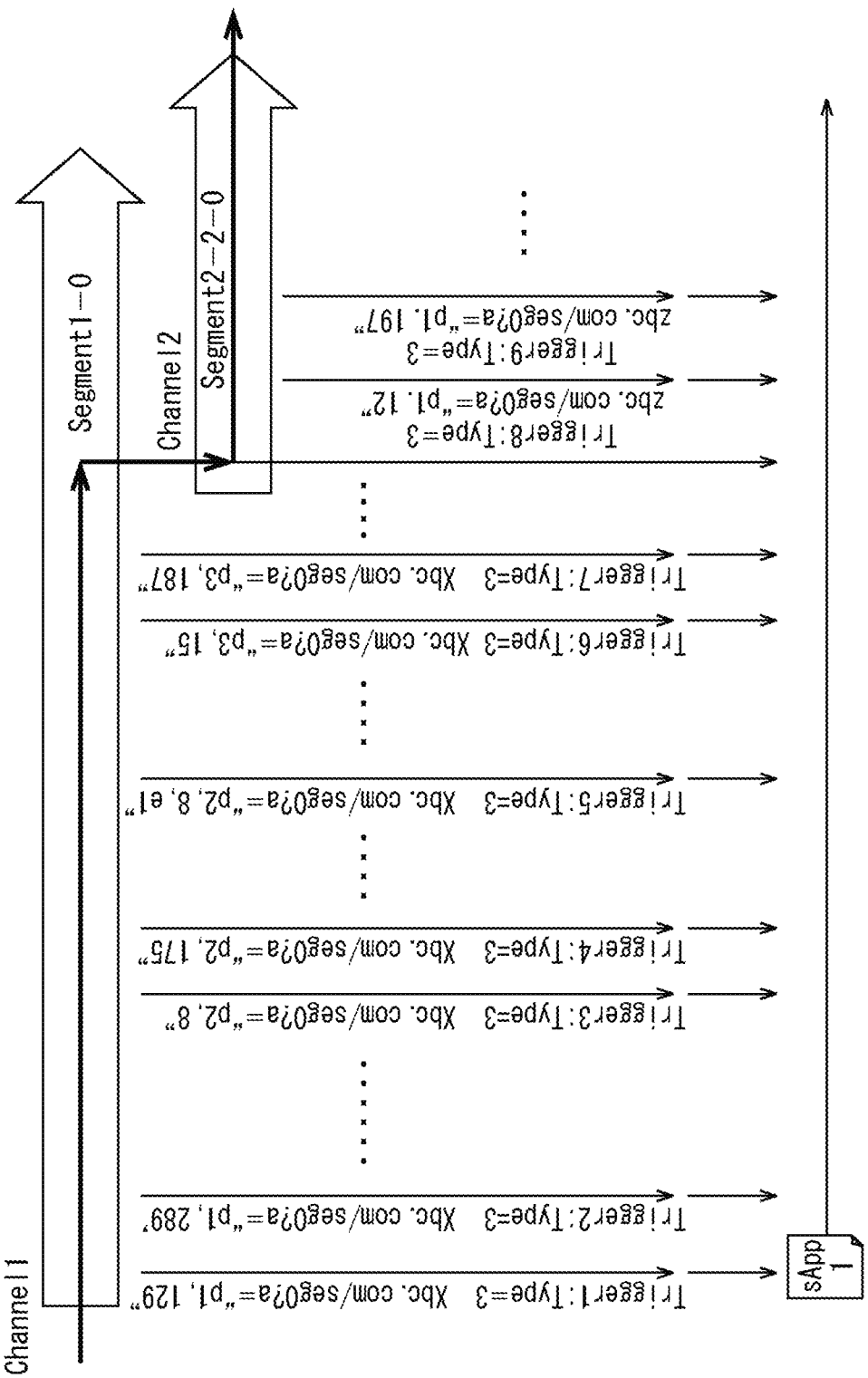
FIG. 23 is a diagram illustrating exemplary operation 1 in the second direct mode.
Figure 24:
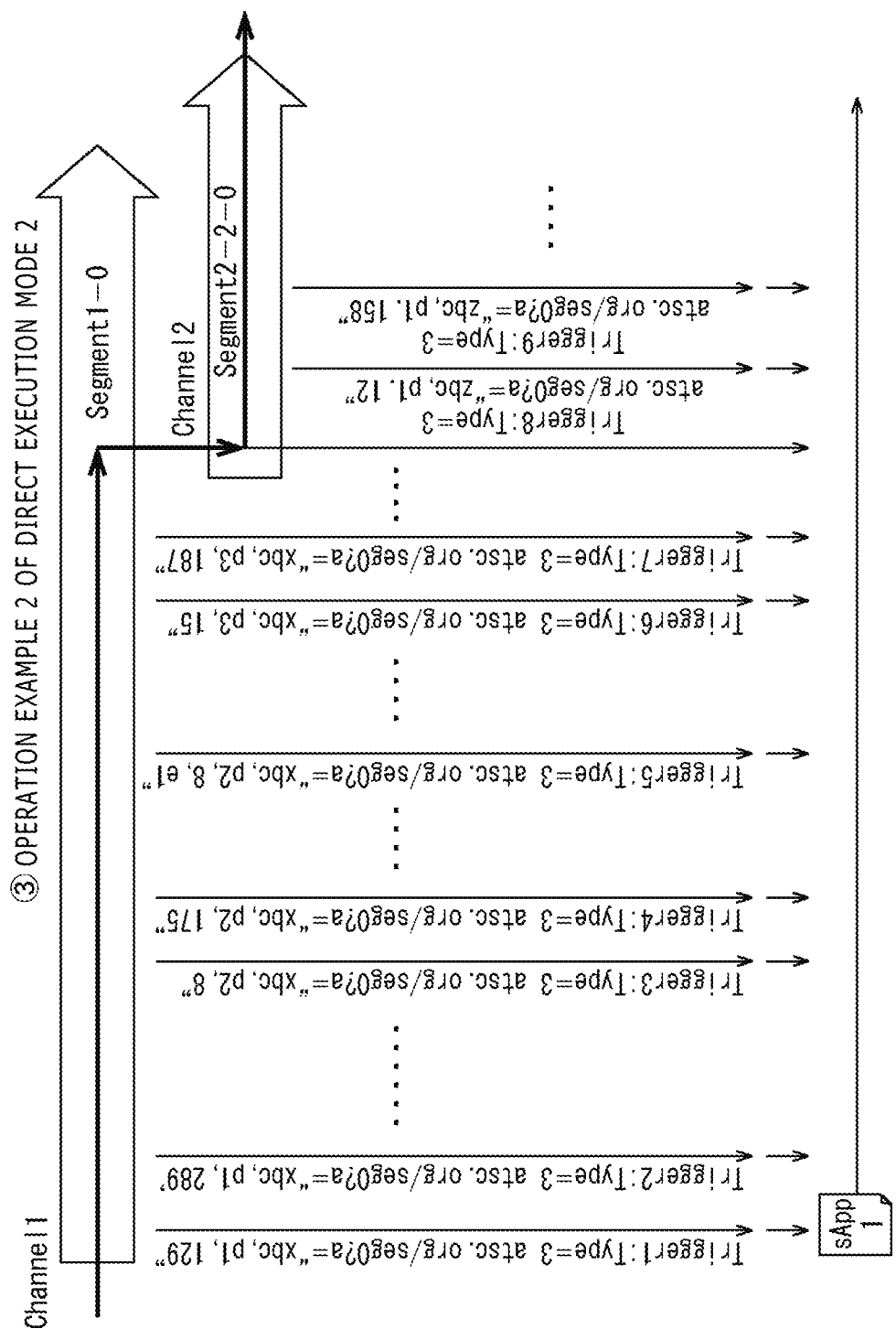
FIG. 24 is a diagram illustrating exemplary operation 2 in the second direct mode.

The reception apparatus 20 operating in the second direct mode described above allows the operation of a coordinated application as shown in FIG. 23 and FIG. 24, for example.

(Exemplary Operation 1 in the Second Direct Mode)

Referring to FIG. 23, there is shown exemplary operation 1 of the second direct mode.

As shown in FIG. 23, the reception apparatus 20 is selecting a television program of channel 1 (Channel1) with the segment being Segment1-0. When channel 1 is switched to channel 2 with a given timing and a television program with the segment being Segment2-0-0 is selected.

In this case, when the trigger information transmitted from the transmission apparatus 10 is extracted, the reception apparatus 20 controls the operation of the coordinated application in accordance with this trigger information.

To be more specific, if trigger information (Trigger1) is extracted when the television program of Segment1-0 is being selected, the reception apparatus 20 starts an operation in the second direct mode because "3" is specified in the type of this trigger information (Trigger1).

In response to the this trigger information (Trigger1), the reception apparatus 20 reads standard coordinated application sApp1 stored in the standard coordinated application storage block 229 in advance and activates this standard coordinated application immediately.

It is also practicable to capture standard coordinated application sApp1 that is distributed through the Internet. In this case, however, a URL (http://xbc.com/seg0, for example) made up of a character string obtained by linking domain_name, segment_id and the like included in this trigger information (Trigger1) identifies the application server 40-1, not the standard application server 41 that provides standard coordinated application sApp1.

Therefore, the reception apparatus 20 may store the URL (http://atsc.org) of the standard application server 41 in advance and, if trigger information with the type being "3" is extracted, access the standard application server 41 in accordance with this URL, thereby capturing standard coordinated application sApp1.

At the same time, the reception apparatus 20 controls the operation of standard coordinated application sApp1 in accordance with additional_information (a="p1, 129") included in this trigger information (Trigger1). In this example, "p1" indicative of the ID of a television program being selected and "129" indicative of media_time are specified as additional_information and domain_name is "xbc.com," so that xbc broadcasting station may be identified.

To more specific, a particular time in a particular program to be broadcast by a particular broadcasting station, for example, may be specified by this trigger information. By use of the information thus specified, standard coordinated application sApp1 may execute various processing operations such as event firing or capturing of data by accessing a predetermined server.

Subsequently, the reception apparatus 20 sequentially extracts Trigger2, . . . , Trigger3, Trigger4, . . . , Trigger5, . . . , Trigger6, Trigger7, . . . as trigger information when the television program of Segment1-0 is being selected. At this moment, the execution of standard coordinated application sApp1 is continued and the value of additional_information included in the trigger information changes, so that standard coordinated application sApp1 executes various processing operations in accordance with the value of additional_information.

Next, if channel 1 is switched to channel 2, the execution of standard coordinated application sApp1 is continued because the standard coordinated application is standardized to be compatible with television programs broadcast from given broadcasting stations.

In addition, the reception apparatus 20 controls the operation of standard coordinated application sApp1 in accordance with information such as "p1" indicative of the ID of a television program, "12" indicative of media_time, and "zbc.com" indicative of domain_name obtained from this trigger information (Trigger8).

Then, the reception apparatus 20 sequentially extracts Trigger9, . . . as trigger information when the television program of Segment2-2-0 is being selected, so that standard coordinated application sApp1 executes various processing operations on the basis of additional_information and so on included in the trigger information.

Exemplary operation 1 in the second direct mode is executed as described above.

(Exemplary Operation 2 in the Second Direct Mode)

Referring to FIG. 24, there is shown exemplary operation 2 in the second direct mode.

As with FIG. 23, FIG. 24 shows an exemplary operation of the second direct mode; however, FIG. 24 differs from FIG. 23 in that domain_name included in each trigger information does not correspond to a given broadcasting station such as xbc broadcasting station for example but corresponds to a standardization organization for formulating the standardization of standard coordinated applications, for example.

Therefore, the reception apparatus 20 may access the standard application server 41 in accordance with a URL (http://atsc.org, for example) made up of a character string obtained by linking domain_name and so on included in this trigger information, thereby capturing standard coordinated application sApp1.

It should be noted however that, because a broadcasting station cannot be specified by domain_name in this case, standard coordinated application sApp1 cannot identify the broadcasting station of the channel being selection from domain_name. So, in this exemplary operation 2, the information indicative of the channel being selected is included in additional_information to allow standard coordinated application sApp1 to recognize a broadcasting station of the channel being selected.

To be more specific, in the reception apparatus 20, if trigger information is extracted when xbc broadcasting station of channel 1 is being selected, a character string "xbc" is included as additional_information in this trigger information in addition to the ID of the television program being selected and media_time. Consequently, standard coordinated application sApp1 recognizes that the broadcasting station broadcasting channel 1 being selected is xbc broadcasting station.

If trigger information is extracted when zbc broadcasting station of channel 2 is being selected, character string "zbc" is included in this trigger information as additional_information in the reception apparatus 20. Consequently, standard coordinated application sApp1 references the character string "zbc" to recognize that the broadcasting station broadcasting channel 2 being selection is zbc broadcasting station.

To be more specific, this trigger information allows the specification of a particular time in a particular program that is broadcast by a particular broadcasting station, for example. Using the information thus specified, the standard coordinated application sApp1 may execute various processing operations such as event firing or capturing data by accessing a predetermined server.

Subsequently, the reception apparatus 20 sequentially extracts Trigger2, . . . , Trigger3, Trigger4, . . . , Trigger5, . . . , Trigger6, Trigger7, . . . as trigger information when the television program of Segment1-0 is being selected. At this time, standard coordinated application sApp1-1 is continuously executed, and in addition thereto, the value of additional_information included in the trigger information is changed, so that standard coordinated application sApp1-1 executes various processing operations corresponding to additional_information.

It should be noted that, if channel 1 is switched to channel 2 as with exemplary operation 1 described above, the execution of standard coordinated application sApp1 is continued because standard coordinated application is standardized to be compatible with television programs broadcast by given broadcasting stations.

Thus, Exemplary operation 2 in the second direct mode is executed as described so far.

It should be noted that, in the exemplary operations shown in FIG. 23 and FIG. 24, a standard coordinated application is internally held in advance and distributed through the Internet; it is also practicable to distribute a standard coordinated application by broadcasting as described above.

Thus, the reception apparatus 20 operates in the second direct mode.

[Contents of Specific Processing to be Executed in Component Apparatuses]

The following describes the contents of specific processing to be executed in apparatuses making up the broadcasting-communication coordinated system 1 shown in FIG. 1 with reference to the flowcharts shown in FIG. 25 through FIG. 33.

(Transmission Processing)

First, transmission processing to be executed by the transmission apparatus 10 is described with reference to the flowchart shown in FIG. 25.

In step S211, the audio capture block 111 captures an audio signal corresponding to the audio of broadcast content from an external server for example. In step S212, the video capture block 113 captures a video signal corresponding to the video of the broadcast content from the external server for example.

In step S213, the trigger information generation block 114 generates trigger information in match with the progression of the video of the broadcast content corresponding to the video signal captured by the video capture block 113.

In step S214, the audio encoder 112 encodes the audio signal captured by the audio capture block 111.

In step S215, the video encoder 115 encodes the video signal captured by the video capture block 113. In addition, the video encoder 115 arranges the trigger signal in a video stream obtained by the encoding.

In step S216, the multiplex block 116 multiplexes an audio stream encoded by the audio encoder 112 with a video stream encoded by the video encoder 115 to generate a transport stream.

In step S217, the transmission block 117 transmits the transport stream generated by the multiplex block 116 as a broadcast signal through the antenna 118. Subsequently, the procedure is returned to step S211 to repeat the above-mentioned processing operations therefrom.

Thus, the transmission processing is executed as described so far.

(Reception Processing)

Figure 26:
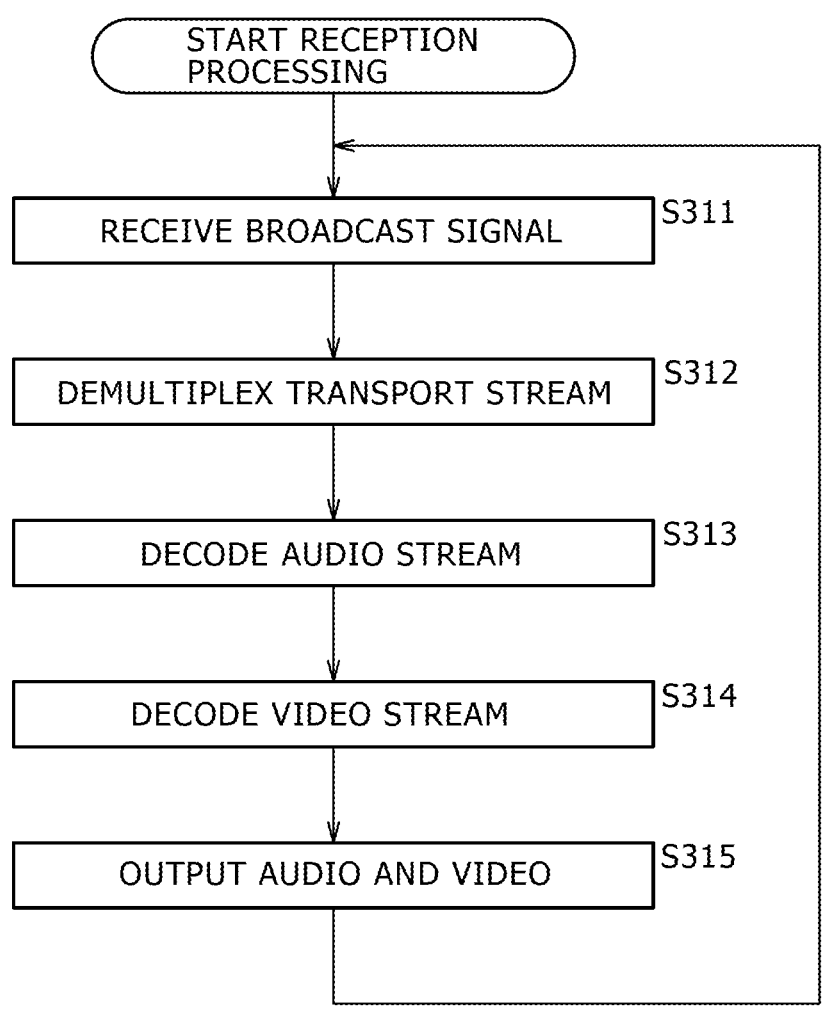
FIG. 26 is a flowchart indicative of reception processing.

The following describes reception processing to be executed by the reception apparatus 20 with reference to the flowchart shown in FIG. 26.

In step S311, the tuner 212 receives the broadcast signal through the antenna 211 and demodulates the received broadcast signal.

In step S312, the demultiplex block 213 separates the transport stream demodulated by the tuner 212 into an audio stream and a video stream.

In step S313, the audio decoder 214 decodes the audio stream separated by the demultiplex block 213 to generate an audio signal.

In step S314, the video decoder 217 decodes the video stream separated by the demultiplex block 213 to generate a video signal.

In step S315, the speaker 216 outputs the sound corresponding to the audio signal. The display 219 displays a video corresponding to the video signal.

Consequently, the video of the broadcast content such as a television program being selected is displayed on the display 219 and the audio corresponding to the video signal is sounded.

When the processing of step S315 is terminated, the procedure is returned to step S311 to repeat the above-mentioned processing operations therefrom.

Thus, the reception processing is executed as described so far.

(Trigger Information Corresponding Processing)

In the reception apparatus 20, trigger information corresponding processing is executed with a timing of the extraction of the trigger information from the video stream included in this broadcast signal concurrently with the above-mentioned reception processing (refer to FIG. 26) that is executed during the reception of the broadcast signal. So, with reference to the flowchart shown in FIG. 27, the following describes trigger information corresponding processing.

In step S331, the trigger information extraction block 220 determines whether trigger information has been extracted from the video stream separated by the demultiplex block 213. If trigger information is found to have been extracted by the trigger information extraction block 220, the procedure goes to step S332.

In step S332, the trigger information extraction block 220 captures the trigger information extracted from the video stream. In step S333, the control block 221 analyzes the trigger information captured in step S332 to determine whether the operation mode specified in the type of this trigger information is the TPT mode or not (S334).

If the operation mode is found to be the TPT mode in step S334, then the procedure goes to step S335. In step S335, the trigger information corresponding processing of the TPT mode is continuously executed. Details of the trigger information corresponding processing of the TPT mode will be described later with reference to the flowchart shown in FIG. 28.

If the operation is found to be not the TPT mode in step S334, then the procedure goes to step S336. In step S336, the control block 221 determines whether the operation mode specified in the type of the trigger information is the first direct mode or not.

If the operation mode is found to be the first direct mode in step S336, then the procedure goes to step S337. In step S337, the trigger information corresponding processing in the first direct mode is continuously executed. Details of the trigger information corresponding processing in the first direct mode will be described later with reference to the flowchart shown in FIG. 32.

On the other hand, in step S336, if the operation mode is found to be not the first direct mode, then the operation mode is the second direct mode, so that the procedure goes to step S338. Then, in step S338, the trigger information corresponding processing in the case of the second direct mode is continuously executed. Details of the trigger information corresponding processing in the second direct mode will be described later with reference to the flowchart shown in FIG. 33.

When the processing of step S335, step S337, or step S338 has terminated, the procedure is returned to step S331 to repeat the above-mentioned processing therefrom.

Trigger information corresponding processing is executed as described so far.

(Trigger Information Corresponding Processing in the TPT Mode)

Figure 27:
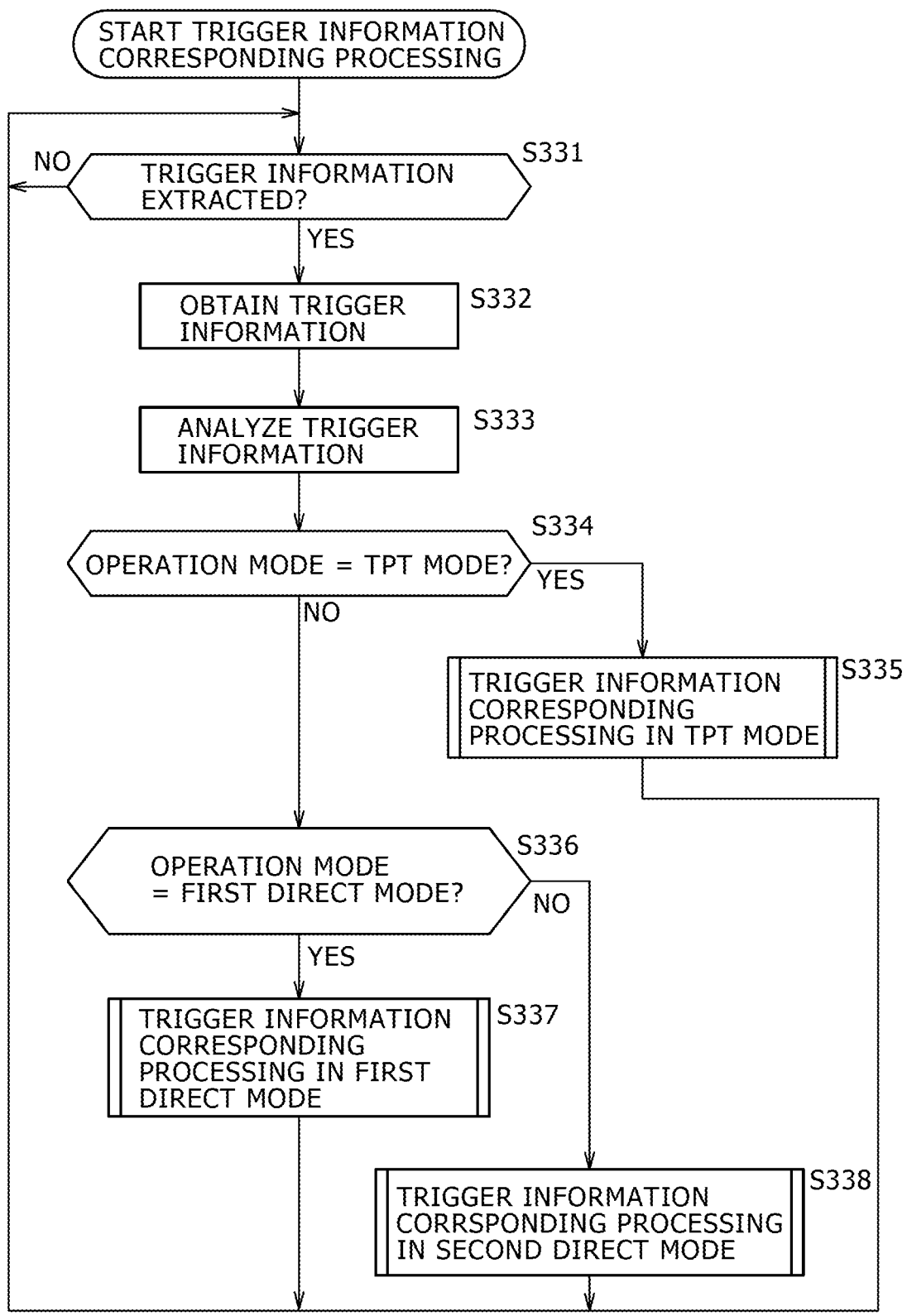
FIG. 27 is a flowchart indicative of trigger information corresponding processing.
Figure 28:
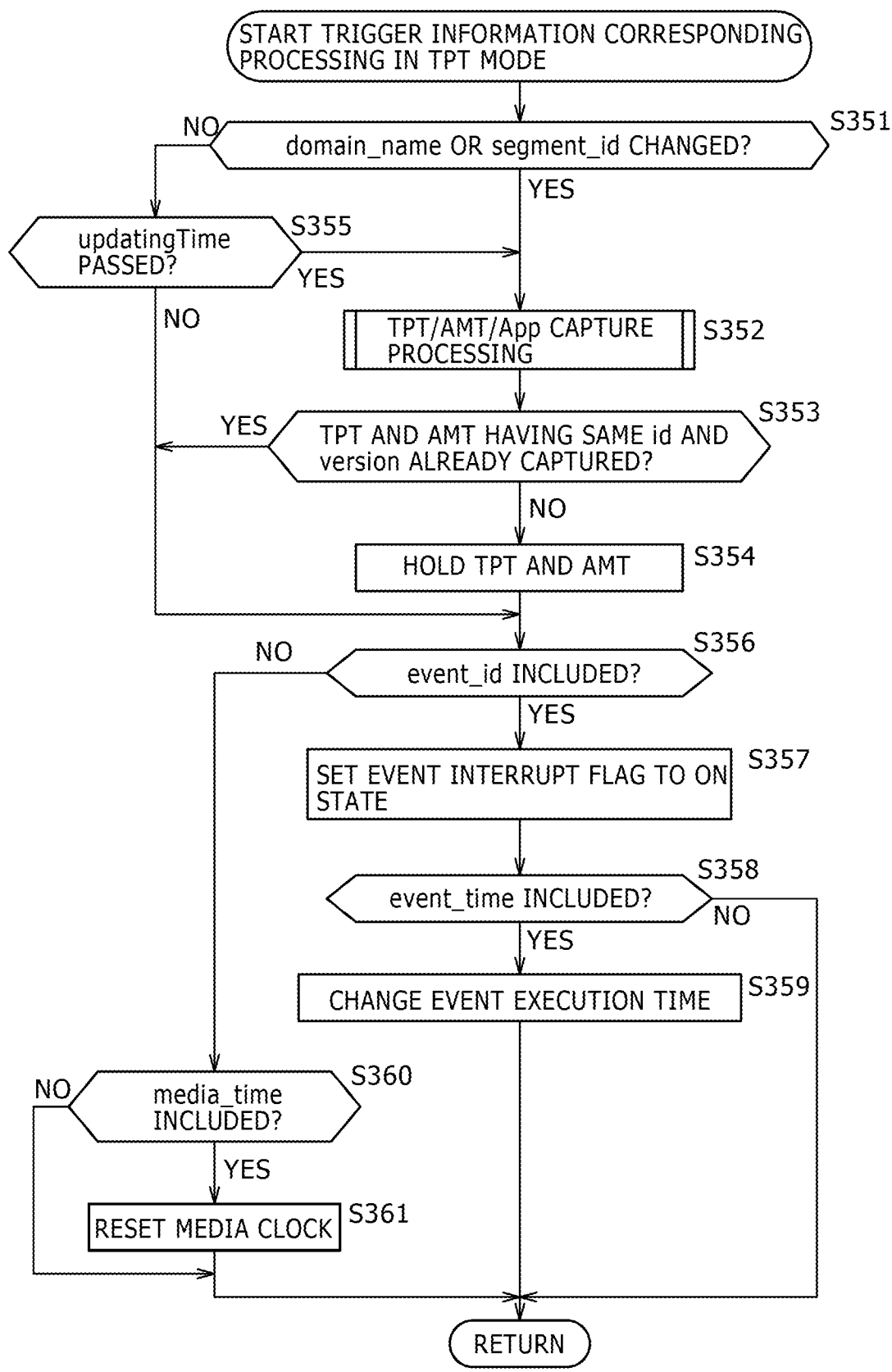
FIG. 28 is a flowchart indicative of trigger information corresponding processing in the TPT mode.

The following describes the trigger information corresponding processing in the TPT mode corresponding to step S335 shown in FIG. 27 with reference to the flowchart shown in FIG. 28.

In step S351, in accordance with a trigger information analysis result of step S333 (refer to FIG. 27), the control block 221 determines whether domain_name or segment_id included in this trigger information has changed or not. If domain_name or segment_id is found to have changed, then the procedure goes to step S352.

In step S352, TPT/AMT/App capture processing is executed. In TPT/AMT/App capture processing, App capture processing for capturing a coordinated application from the application server 40 is executed as required, in addition to TPT/AMT capture processing for capturing a TPT and an AMT from the TPT/AMT server 30.

It should be noted that details of TPT/AMT/App capture processing will be described later with reference to the flowchart shown in FIG. 29.

When TPT/AMT/App capture processing of step S352 has terminated, the procedure goes to step S353. In step S353, in accordance with an analysis result received from the TPT/AMT analysis block 225, the control block 221 determines whether the TPT and the AMT that have the same id and version have been captured or not. It should be noted that id and version are specified by id attribute and tptVersion attribute of the TPT element described earlier.

If the TPT and the AMT that have the same id and version are found not having been obtained in step S353, then the procedure goes to step S354. In step S354, the TPT/AMT analysis block 225 holds the newly obtained TPT and the AMT of new version instead of the TPT and the AMT of old version held so far. When the processing of step S354 has terminated, the procedure goes to step S356.

If domain_name or segment_id is found to have not changed in step S351, then the procedure goes to step S355. In step S355, in accordance with an analysis result received from the TPT/AMT analysis block 225, the control block 221 determines whether the update period indicated by updatingTime has passed or not. It should be noted that updatingTime is specified by updatingTime of the TPT element described earlier.

If the update period is found to have passed in step S355, then the procedure goes to step S352. In step S352, the TPT/AMT/App capture processing described above is executed and, if the newly obtained TPT and AMT are of the new version, then these TPT and AMT are held (S354).

It should be noted that, if the TPT of the same id and version is found to have been obtained in step S353 or the update period is found to have not passed in step S355, then the procedure goes to step S356.

In accordance with the trigger information analysis result of step S333 (refer to FIG. 27), the control block 221 determines in step S356 whether event_id is included in this trigger information or not. If event_id is found to be included in this trigger information in step S356, then the procedure goes to step S357. Namely, in this case, this trigger information is active trigger information.

In step S357, the control block 221 turns on an event interrupt flag.

The event interrupt flag herein denotes not a flag that specifies a valid event in accordance with a time indicated by the media clock, but a flag that is set when specifying an event in accordance with event_id transmitted as included in the trigger information with a given timing. Therefore, during an interrupt period from the specification of an event in accordance with event_id to the execution of an action corresponding to this event, the event interrupt flag is on; in other periods, the event interrupt flag is off.

It should be noted that, in coordinated application control processing (Yes in step S396 of FIG. 30 and step S395 thereof), if the event interrupt flag is on, an action corresponding to a specified coordinated application is executed, details of which will be described later.

When the processing of step S357 has terminated, the procedure goes to step S358. In step S358, in accordance with the trigger information analysis result obtained in step S333 (refer to FIG. 27), the control block 221 determines whether event_time is included in this trigger information or not. If event_time is found to be included in step S358, then the procedure goes to step S359.

In step S359, the control block 221 changes an event execution time specified by event_id to a time specified by event_time. On the other hand, if event_time is found to be not included in step S358, the processing of step S359 is skipped.

If event_id is found to be not included in the trigger information in step S356, the procedure goes to step S360. In step S360, the control block 221 determines in accordance with the trigger information analysis result of step S333 (refer to FIG. 27) whether media_time is included in this trigger information or not. If media_time is found to be included in this trigger information in step S360, then the procedure goes to step S361. Namely, in this case, this trigger information is time-base trigger information.

In step S361, the control block 221 resets the time specified in media_time to the media clock already set by coordinated application control processing (step S393 shown in FIG. 30) to be described later. Consequently, the media clock is calibrated to make an action corresponding to a specified event be executed at a more correct time.

On the other hand, if media_time is found not to be included in step S360, then the processing of step S361 is skipped.

If the processing of step S359 has terminated or has been skipped or the processing of step S361 has terminated or has been skipped, then the procedure is returned to step S335 shown in FIG. 27 to repeat the above-mentioned processing therefrom. Namely, subsequently, if the operation mode is the TPT mode when trigger information has been extracted, then the trigger information corresponding processing in the TPT mode is executed again.

Thus, the trigger information corresponding processing in the TPT is executed as described so far.

(TPT/AMT/App Capture Processing)

Figure 29:
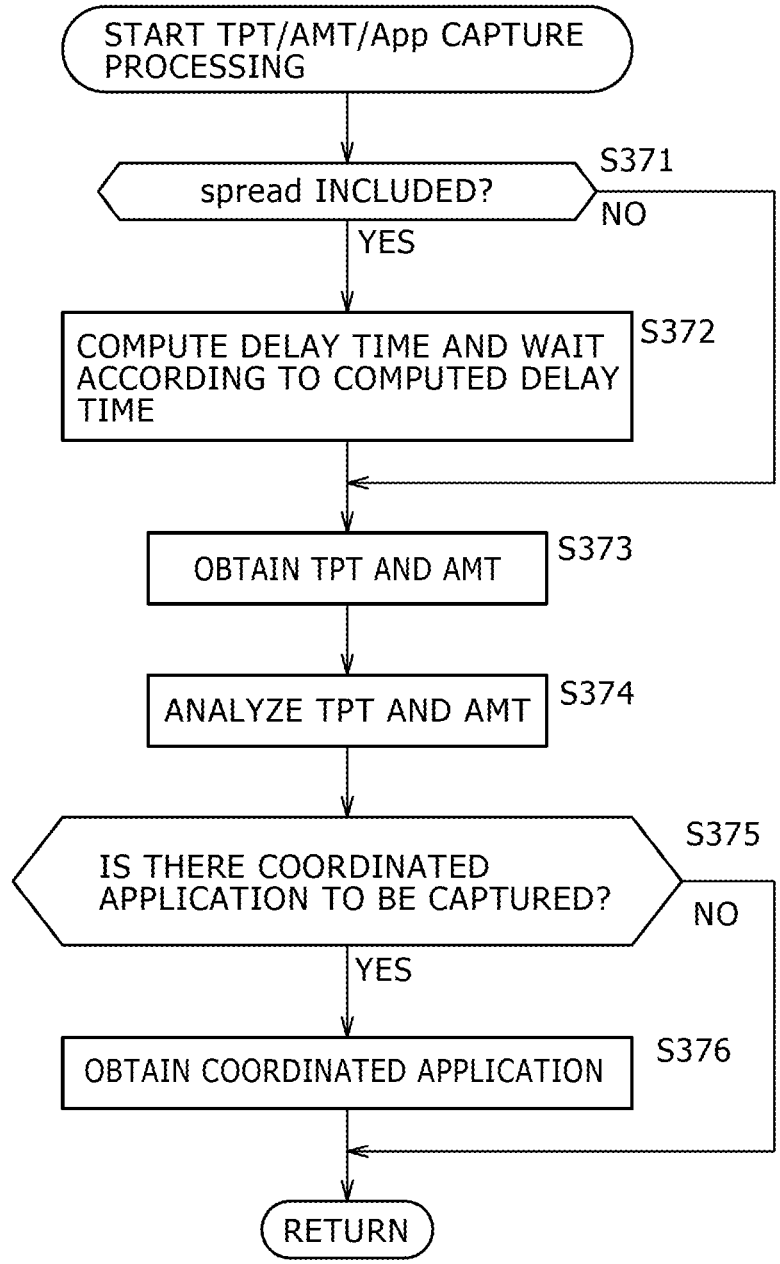
FIG. 29 is a flowchart indicative of TPT/AMT/App capture processing.

The following describes TPT/AMT/App capture processing corresponding to step S352 shown in FIG. 28 with reference to the flowchart shown in FIG. 29.

In step S371, in accordance with the trigger information analysis result of step S333 (refer to FIG. 27), the control block 221 determines whether spread is included in this trigger information or not. If spread is found to be included in step S371, then the procedure goes to step S372.

In step S372, on the basis of information for stochastically spreading a timing to which trigger information is applied, the control block 221 computes a delay time for accessing a predetermined server such as the TPT/AMT server 30 or the application server 40 and waits until this delay time passes.

Namely, if broadcast content transmitted from the transmission apparatus 10 is being received by two or more reception apparatuses 20 and the TPT/AMT server 30 is accessed by these reception apparatuses 20 all at once in accordance with the trigger information, for example, the load of the TPT/AMT server 30 increases and the traffic of the Internet at peak time increases. In order to mitigate the load of the TPT/AMT server 30 and the traffic of the Internet at peak time, the timing of accessing the TPT/AMT server 30 may be shifted in accordance with spread included in the trigger information.

When the delay time computed in step S372 has passed, the procedure goes to step S373. In step S373, the TPT/AMT analysis block 225 obtains the TPT and the AMT provided by the TPT/AMT server 30.

To be more specific, the control block 221 accesses the TPT/AMT server 30 identified by a URL (http://xbc.com/seg_A, for example) obtained by adding "http://" to the beginning of trigger information by controlling the communication I/F 224 and requests for a TPT and an AMT. The TPT/AMT server 30 manages the TPT and the AMT for each piece of broadcast content and identifies the TPT and the AMT for the broadcast content identified by segment_id and so on included in the request for TPT and AMT from the reception apparatus 20, thereby providing the identified TPT and AMT to the reception apparatus 20.

The communication I/F 224 receives the TPT and the AMT provided by the TPT/AMT server 30 under the control of the control block 221. Consequently, the TPT/AMT analysis block 225 may capture the TPT and the AMT received by the communication I/F 224.

In step S374, the TPT/AMT analysis block 225 analyzes the TPT and the AMT. A TPT and AMT analysis result is supplied to the control block 221.

It should be noted that, if spread is found to be not included in step S371, then the processing of step S372 is skipped and the procedure goes to step S373. In this case, the reception apparatus 20 immediately accesses the TPT/AMT server 30 without waiting for the delay time, thereby obtaining and analyzing a TPT and an AMT.

When the processing of step S374 has terminated, the procedure goes to step S357. In step S357, in accordance with the trigger information analysis result of step S333 (refer to FIG. 27), the control block 221 determines whether a coordinated application to be captured is present or not. For example, if segment_id has changed to change the segment of broadcast content, a coordinated application to be captured is found to be present and the procedure goes to step S376.

In step S376, under the control of the control block 221, the communication I/F 224 captures a coordinated application provided by the application server 40 and holds the captured coordinated application in the cache memory 227.

To be more specific, if the delay time computed in step S372 has passed, for example, the control block 221 controls the communication I/F 224 to access the application server 40 identified by a URL obtained from the trigger information and request for a coordinated application. Under the control of the control block 221, the communication I/F 224 receives the coordinated application provided from the application server 40. Consequently, the coordinated application captured by the communication I/F 224 is held in the cache memory 227.

If the coordinated application to be captured is found to be not present in step S375, then the processing of step S376 is skipped. Next, when the processing of step S376 has terminated or has been skipped, the TPT/AMT/App processing is terminated and the procedure is returned to step S352 shown in FIG. 28 to repeat the above-mentioned processing therefrom.

Thus, the TPT/AMT/App capture processing is executed as described so far.

(Coordinated Application Control Processing)

In the reception apparatus 20, coordinated application control processing is executed in media clock time sequence concurrently with the above-mentioned trigger information corresponding processing (refer to FIG. 27) that is executed with a timing of trigger information extraction. So, the following describes coordinated application control processing with reference to the flowchart shown in FIG. 30.

In step S391, the control block 221 waits until a TPT and an AMT are obtained by the TPT/AMT analysis block 225 from the TPT/AMT server 30. This TPT/AMT capture processing corresponds to step S371 through step S374 shown in FIG. 29. If the TPT/AMT capture processing shown in FIG. 29 is executed and a TPT and an AMT supplied from the TPT/AMT server 30 are obtained, the procedure goes to step S392.

In step S392, the control block 221 waits until the trigger information including media_time is first extracted. Then, if the trigger information is extracted in step S331 shown in FIG. 27 and media_time is included in this trigger information, then the procedure goes to step S393.

In step S393, the control block 221 sets a time specified in media_clock included in the trigger information to the media clock. Consequently, the media clock starts counting. It should be noted that, in this case, this trigger information is a time-base trigger information.

To be more specific, in the reception apparatus 20, the TPT and the AMT have been captured and the counting by the media clock has been started, so that coordinated application control is executed in the time sequence of the media clock.

In step S394, the control block 221 determines whether the time indicated by the media clock is within the valid time of the event specified by the TPT and the AMT. If the time is found to be within the valid period of the event in step S394, then the procedure goes to step S395.

If the time is found to be not within the valid period in step S394, the procedure goes to step S396. In step S396, the control block 221 determines whether the event interrupt flag is set to the on state or not. This event interrupt flag is set to the on state if event_id is included in the trigger signal in step S357 shown in FIG. 28 described before.

If the event interrupt flag is found to be set to the on state in step S396, then the procedure goes to step S395.

In step S395, action execution processing is executed. In action execution processing, an action specified by the valid event is identified and the operation of the coordinated application is controlled in accordance with the identified action. Here, coordinated application capture or registration, capture or activation, event firing, suspension or restart, or termination, for example is controlled.

It should be noted that details of the action execution processing will be described later with reference to the flowchart shown in FIG. 31.

When the processing of step S395 has terminated or if the event interrupt flag is found to be set to the off state in step S396, then the procedure goes to step S397.

In step S397, the control block 221 determines whether the last event specified by the TPT and the AMT has been completed or not. If the last event is found in step S397 to have been not completed, then the procedure is returned to step S394 to repeat the above-mentioned processing therefrom. Namely, the repetitive execution of the processing operations of step S394 through step S397 sequentially puts the events specified by the TPT and the AMT into the valid period, thereby controlling the operation of the coordinated application in accordance with the actions specified by these valid events.

Then, if the last event is found in step S397 to have been completed, the procedure is returned to step S391 to repeat the above-mentioned processing therefrom.

Thus, the coordinated application control processing is executed as described so far.

(Action Execution Processing)

Figure 30:
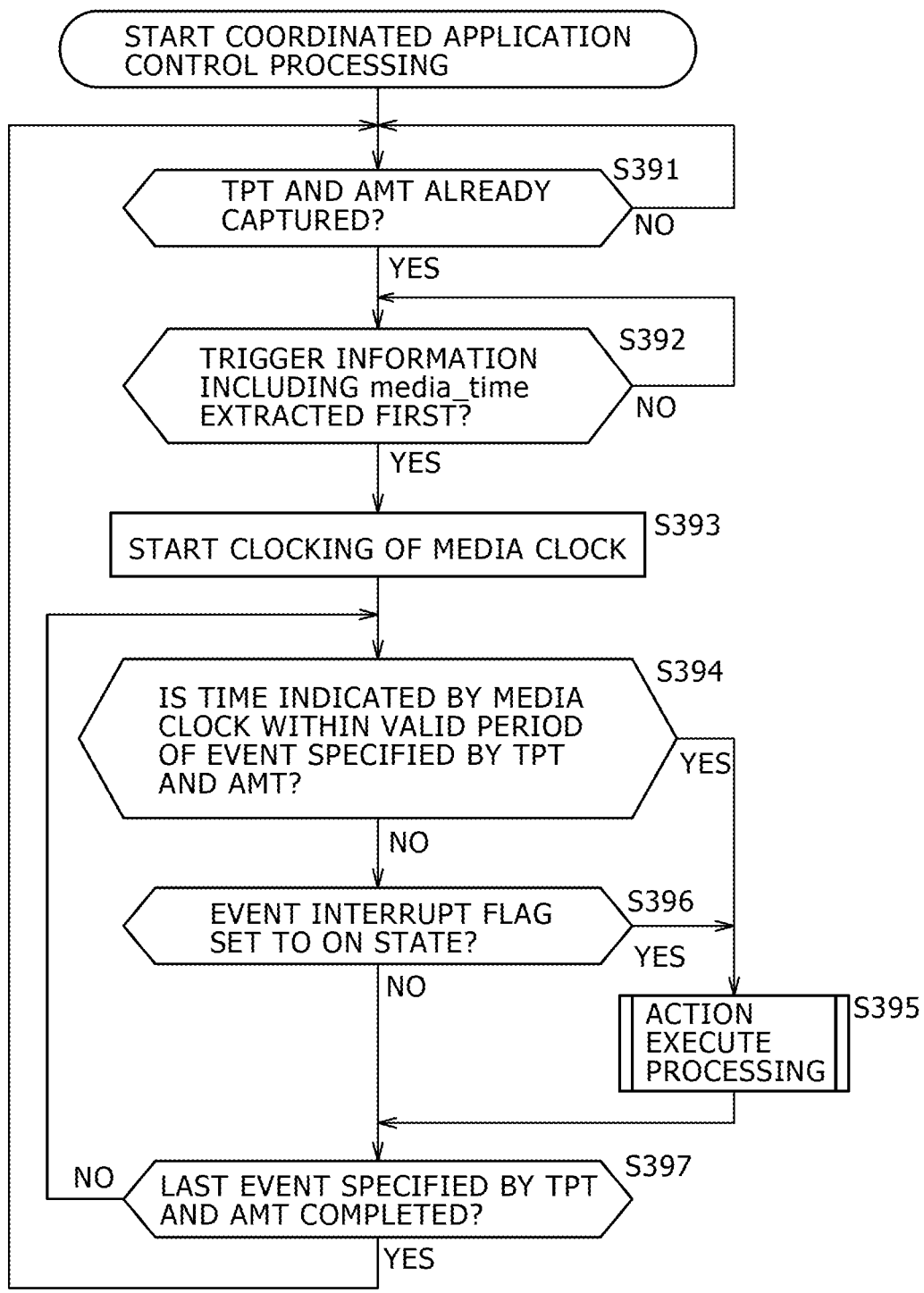
FIG. 30 is a flowchart indicative of coordinated application control processing.
Figure 31:
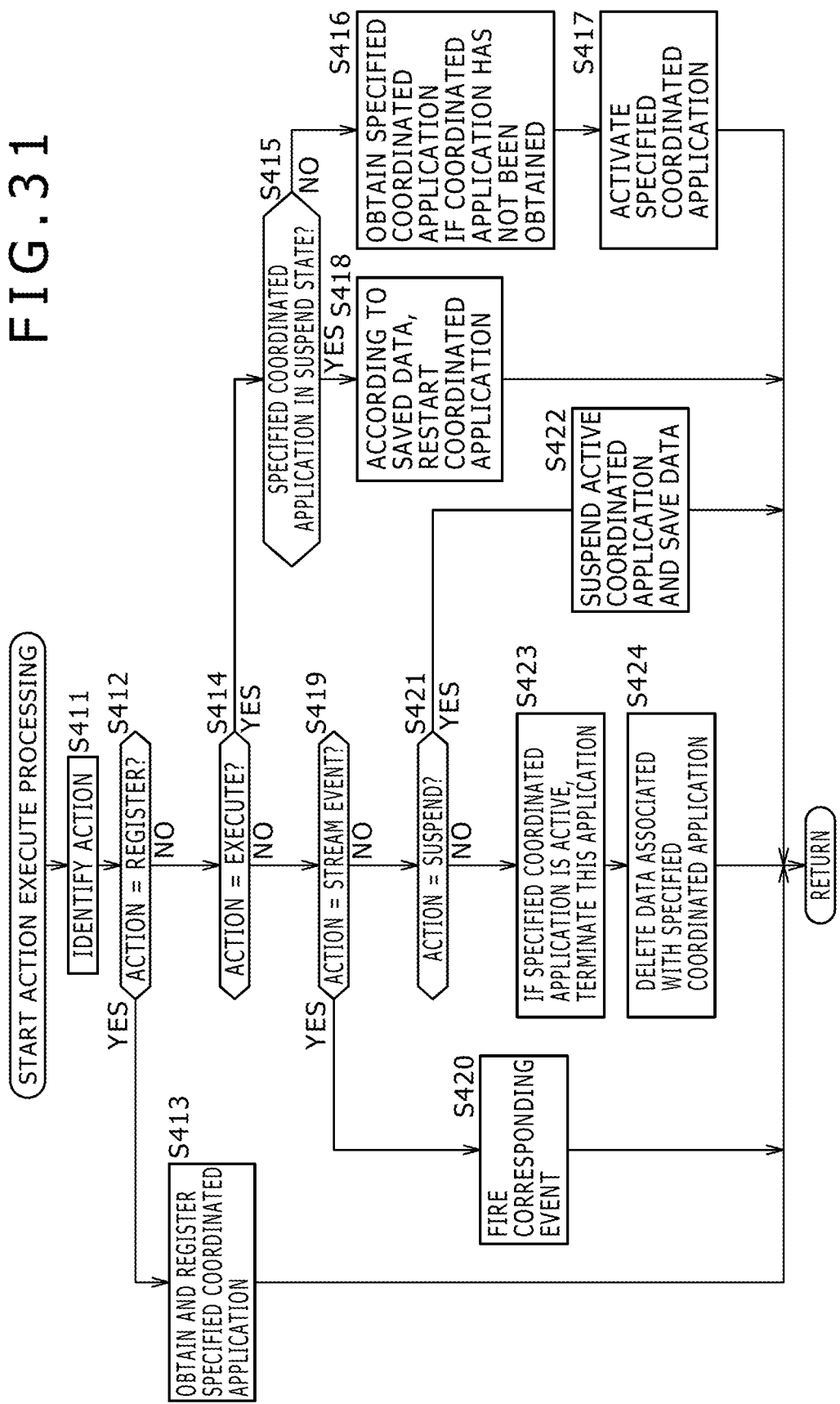
FIG. 31 is a flowchart indicative of action execution processing.

The following describes action execution processing corresponding to step S395 shown in FIG. 30 with reference to the flowchart shown in FIG. 31.

In step S411, the control block 221 identifies an action specified by the valid event. It should be noted however that, if the event interrupt flag is in the on state, an action corresponding to an event specified by event_id is identified.

In step S412, the control block 221 determines whether an identification result of step S411 is "register" or not. If the identification result is found to be "register," then the procedure goes to step S413.

In step S413, the control block 221 controls the communication I/F 224 to access the application server 40 corresponding to the URL identified by the TPT and the AMT, thereby capturing the specified coordinated application. The captured coordinated application is held in the cache memory 227.

In addition, the control block 221 stores the valid period and usage frequency of the captured coordinated application into the memory 222 by relating these valid period and usage frequency with the captured coordinated application. Consequently, the coordinated application held in the cache memory 227 is managed in accordance with the holding priority obtained from these valid period and usage frequency by the control block 221. Subsequently, the procedure is returned to step S395 shown in FIG. 30 to repeat the processing thereafter.

If the identification result of step S411 is found in step S412 to be not "register," then the procedure goes to step S414. In step S414, the control block 221 determines whether the identification result of step S411 is "execute" or not. If the identification result is found to be "execute," then the procedure goes to step S415.

In step S415, the control block 221 controls the application engine 226 to determine whether the coordinated application specified by appID is in the suspended state or not. To be more specific, if the data indicative of the suspended state of the coordinated application is saved in the save memory 228B, then it is determined that the coordinated application is in the suspended state.

If the specified coordinated application is found in step S415 to be not in the suspended state, then the procedure goes to step S416. In step S416, under the control of the control block 221, the application engine 226 captures a specified coordinated application if this coordinated application has not been captured (namely, not held in the cache memory 227).

In step S417, under the control of the control block 221, the application engine 226 activates the specified coordinated application. Subsequently, the procedure is returned to step S395 to repeat the above-mentioned processing therefrom.

If the specified coordinated application is found in step S415 to be in the suspended state, the procedure goes to step S418. In step S418, under the control of the control block 221, the application engine 226 restarts the specified coordinated application.

To be more specific, if the specified coordinated application is in the suspended state, the data is moved from the save memory 228B to the work memory 228A to restart the specified coordinated application. Consequently, the suspended coordinated application is restarted. Subsequently, the procedure is returned to step S395 shown in FIG. 30 to repeat the above-mentioned processing therefrom.

If the identification result of step S411 is found in step S414 to be not "execute," then the procedure goes to step S419. In step S419, the control block 221 determines whether the identification result of step S411 is "stream event" or not. If the identification result is "stream even," then the procedure goes to step S420.

In step S420, under the control of the control block 221, the application engine 226 fires an event for the specified coordinated application. Subsequently, the procedure is returned to step S395 shown in FIG. 30 to repeat the above-mentioned processing therefrom.

If the identification result of step S411 is found in step S419 to be not "stream event," then the procedure goes to step S421. In step S421, the control block 221 determines whether the identification result of step S411 is "suspend" or not. If the identification result is found to be "suspend," then the procedure goes to step S422.

In step S422, under the control of the control block 221, the application engine 226 saves the data indicative of the state of the active coordinated application into the save memory 228B. Subsequently, the procedure is returned to step S395 shown in FIG. 30 to repeat the above-mentioned processing therefrom.

If the identification result of step S411 is found in step S421 to be not "suspend," then the identification result of step S411 is "terminate," so that the procedure goes to step S423.

In step S423, under the control of the control block 221, the application engine 226 terminates the specified coordinated application if the specified coordinated application is active.

In step S424, under the control of the control block 221, the application engine 226 deletes the data related with the specified coordinated application from the work memory 228A and the save memory 228B and, at the same time, deletes the coordinated application from the cache memory 227. Subsequently, the procedure is returned to step S395 shown in FIG. 30 to repeat the above-mentioned processing therefrom.

Thus, the action execution processing is executed as described so far.

(Trigger Information Corresponding Processing in the First Direct Mode)

Figure 32:
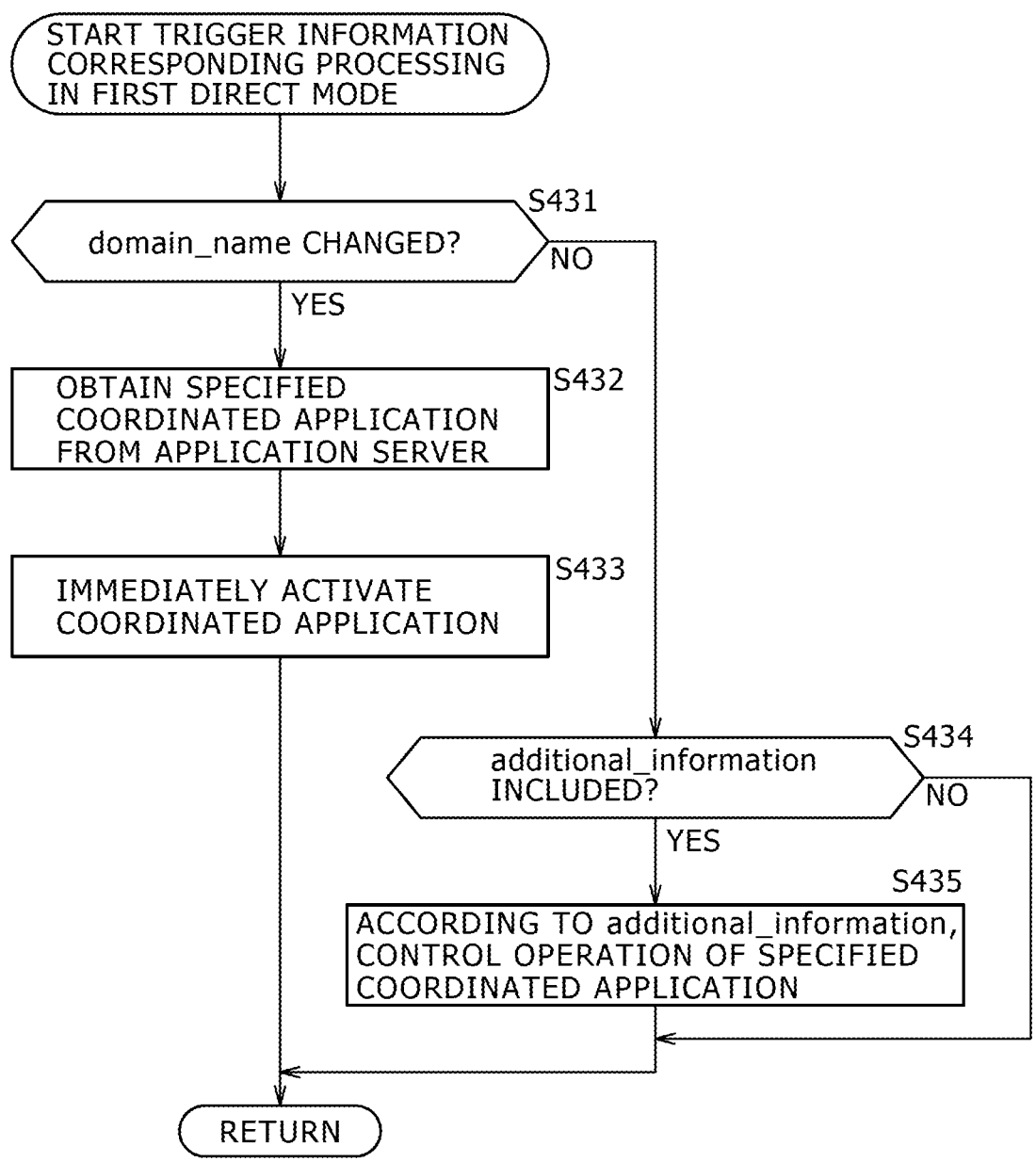
FIG. 32 is a flowchart indicative of trigger information corresponding processing in the first direct mode.

The following describes trigger information corresponding processing in the first direct mode corresponding to step S337 shown in FIG. 27 with reference to the flowchart shown in FIG. 32.

In step S431, in accordance with the analysis result of the trigger information of step S333 (refer to FIG. 27), the control block 221 determines whether domain_name included in this trigger information has changed or not. If domain_name is found in step S431 to have changed, it indicates channel switching has taken place, so that the procedure goes to step S432.

In step S432, under the control of the control block 221, the application engine 226 captures the specified coordinated application from the application server 40.

To be more specific, the control block 221 controls the communication I/F 224 to access the application server 40 identified by a URL (http://xbc.come/seg0, for example) obtained by adding "http://" to the beginning of the trigger information, thereby requesting for a coordinated application. Then, the coordinated application provided by the application server 40 is held in the cache memory 227, so that the application engine 226 captures this coordinated application.

In step S433, under the control of the control block 221, the application engine 226 immediately activates the coordinated application obtained from the application server 40.

When the coordinated application is activated by the processing of step S433, the procedure is returned to step S337 shown in FIG. 27 to repeat the above-mentioned processing therefrom. Namely, subsequently, if the trigger information is extracted and the operation mode is the first direct mode, then the trigger information corresponding processing of the first direct mode is executed again.

If domain_name is found in step S431 to have not changed, then the procedure goes to step S434. In this case, the channel is the same as before, so that the active coordinated application is executed without change.

In step S434, in accordance with the trigger information analysis result in step S333 (refer to FIG. 27), the control block 221 determines whether additional_information is included in this trigger information or not. If additional_information is found to be included in step S434, then the procedure goes to step S435.

In step S435, in accordance with additional_information included in this trigger information, the control block 221 controls the operation of the specified coordinated application. For example, the coordinated application fires an event or accesses a predetermined server to obtain data in accordance with additional_information.

On the other hand, if additional_information is found in step S434 to be not included, then the processing of step S435 is skipped.

Next, if the processing of step S435 has terminated or has been skipped, the procedure is returned to step S337 shown in FIG. 27 to repeat the above-mentioned processing therefrom. Namely, subsequently, if trigger information is extracted and the operation mode is the first direct mode, the trigger information corresponding processing of the first direct mode is executed again.

Thus, the trigger information corresponding processing in the first direct mode is executed as described so far.

(Trigger Information Corresponding Processing in the Second Direct Mode)

Figure 33:
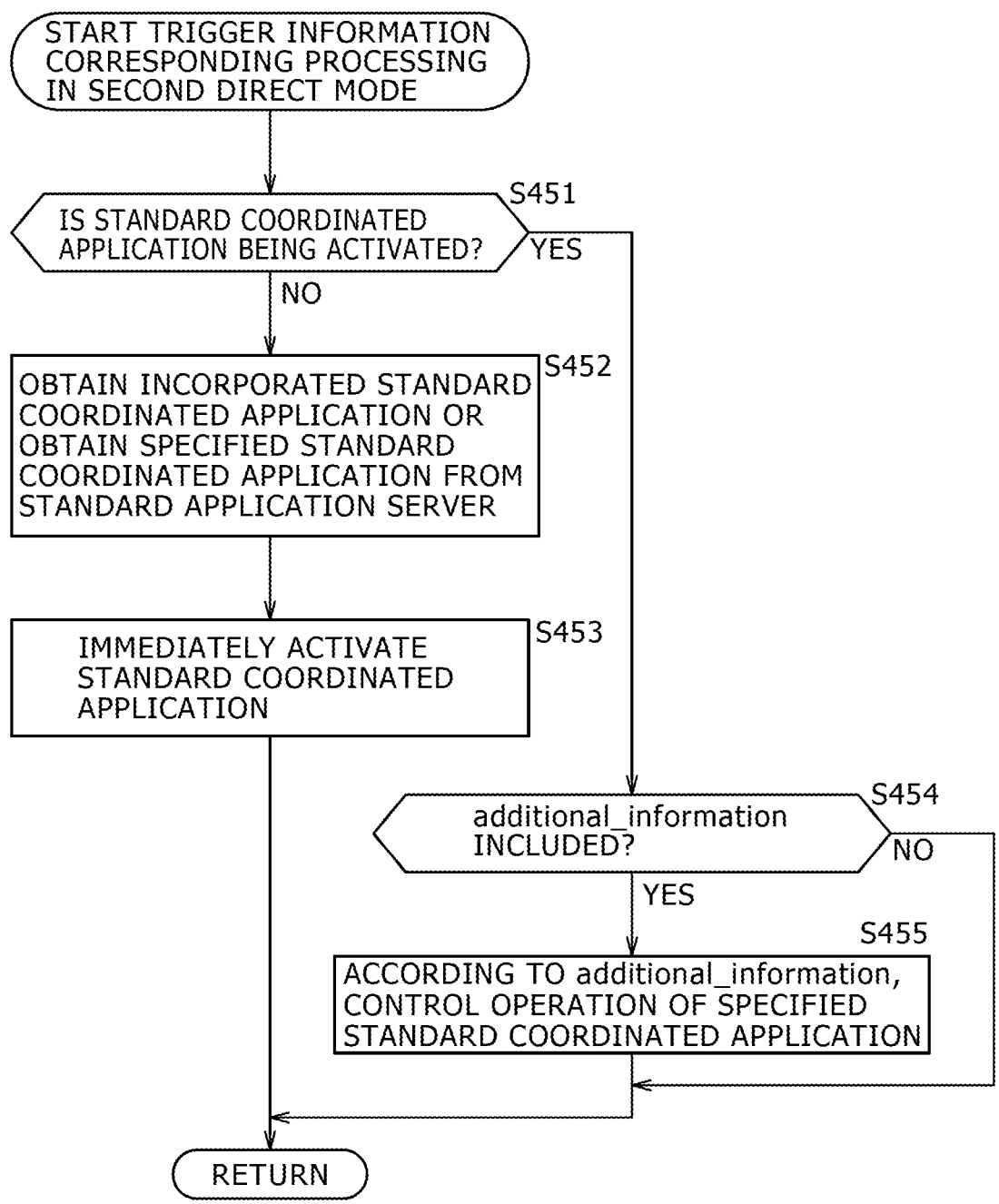
FIG. 33 is a flowchart indicative of trigger information corresponding processing in the second direct mode.

The following describes trigger information corresponding processing in the second direct mode corresponding to step S338 shown in FIG. 27 with reference to the flowchart shown in FIG. 33.

In step S451, the control block 221 controls the application engine 226 to determine whether a standard coordinated application has already been activated or not. If a standard coordinated application is found in step S451 to have not been activated, then the procedure goes to step S452.

Under the control of the control block 221, the application engine 226 reads a standard coordinated application from the standard coordinated application storage block 229 and captures the standard coordinated application in step S452.

It is also practicable to capture a standard coordinated application from the standard application server 41 rather than reading from the standard coordinated application storage block 229.

To be more specific, the control block 221 controls the communication I/F 224 to access the standard application server 41 identified by a URL (http://atsc.org, for example) obtained by adding "http://" to the beginning of the trigger information, thereby requesting for a standard coordinated application. It is also practicable to obtain this URL from the memory 222 if this URL is stored in advance, rather than obtaining from the trigger information. The standard coordinated application provided by the standard application server 41 is held in the cache memory 227, so that the application engine 226 captures this standard coordinated application.

In step S453, under the control of the control block 221, the application engine 226 immediately activates the standard coordinated application captured from the standard application server 41.

When the standard coordinated application is activated by the processing of step S453, then the procedure is returned to step S338 shown in FIG. 27 to repeat the above-mentioned processing therefrom. Subsequently, if the trigger information is extracted and the operation mode is the second direct mode, the trigger information corresponding processing of the second direct mode is executed again.

If the standard coordinated application is found in step S451 to have been activated, the procedure goes to step S454.

To be more specific, because a standard coordinated application is standardized for the broadcast content that is broadcast by a given broadcaster, the standard coordinated application may operate in coordination with the broadcast content after channel switching if any. Namely, even if domain_name or segment_id included in the trigger information has changed, the reception apparatus 20 need not capture a standard coordinated application again.

In step S454, in accordance with the trigger information analysis result of step S333 (refer to FIG. 27), the control block 221 determines whether additional_information is included in this trigger information or not. If additional_information is found in step S454 to be included, then the procedure goes to step S455.

In step S455, in accordance with additional_information included in this trigger information, the control block 221 controls the operation of the specified standard coordinated application. For example, the standard coordinated application fires an event or accesses a predetermined server to obtain data in accordance with additional_information, for example.

On the other hand, if additional_information is found in step S454 to be not included, then the processing of step S455 is skipped.

Next, if the processing of step S455 has terminated or has been skipped, then the procedure is returned to step S338 shown in FIG. 27 to repeat the above-mentioned processing therefrom. Namely, subsequently, if the trigger information is extracted and the operation mode is the second direct mode, the trigger information corresponding processing of the second direct mode is executed again.

Thus, the trigger information corresponding processing in the second direct mode is executed as described so far.

As described above and according to the first embodiment of the technology disclosed herein, the reception apparatus 20 controls the operation of a coordinated application in accordance with any one of the TPT mode, the first direct mode, and the second direct mode specified in the trigger information supplied from the transmission apparatus 10. Consequently, each coordinated application may be operated in accordance with a specified operation mode, thereby making each coordinated application be compatible with various types of operational forms.

Second Embodiment

[Exemplary Configuration of a Broadcasting-Communication Coordinated System]

Figure 34:
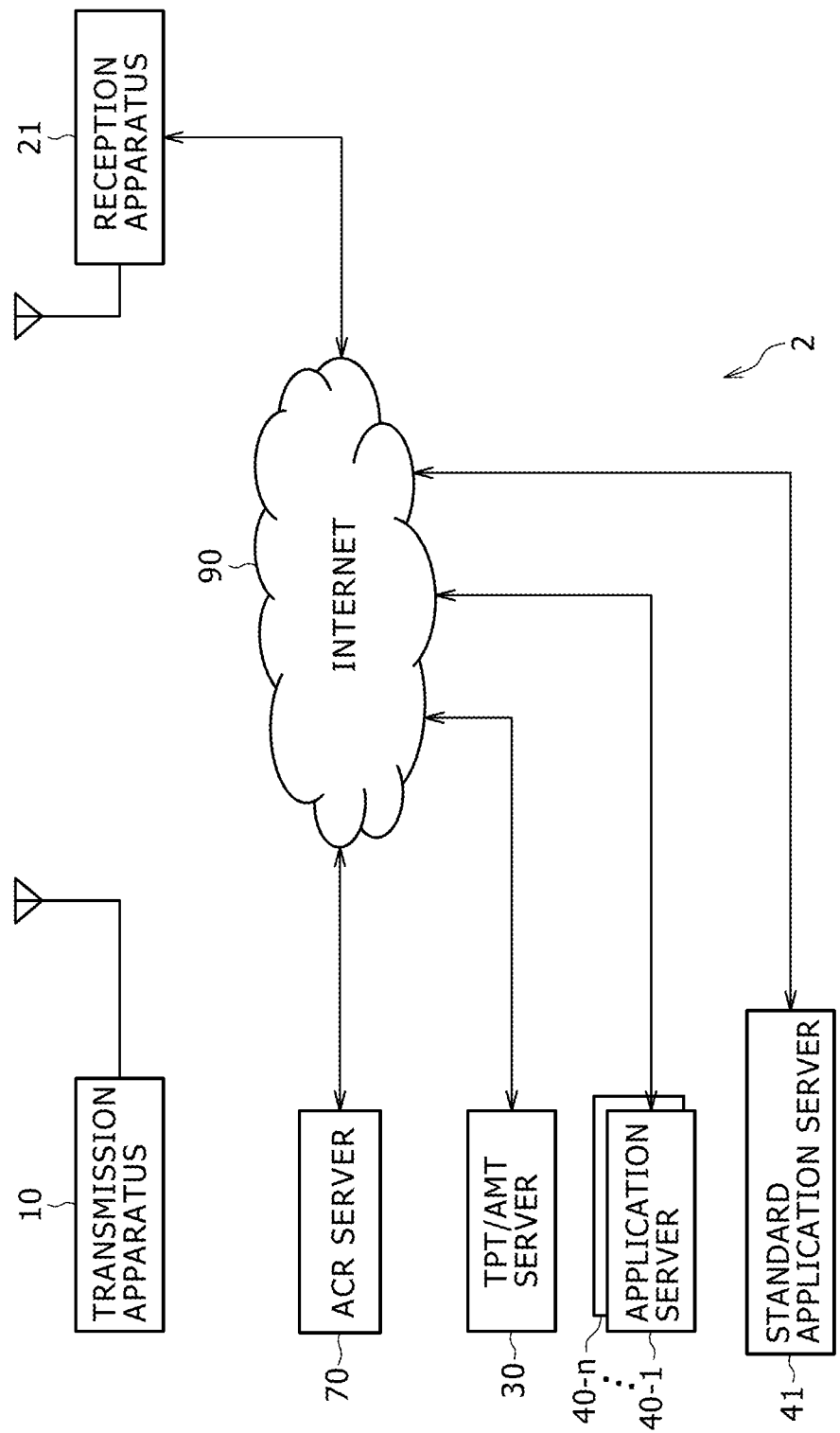
FIG. 34 is a diagram illustrating a broadcasting-communication coordinated system.

Now referring to FIG. 34, there is shown a broadcasting-communication coordinated system 2. The broadcasting-communication coordinated system 2 has a transmission apparatus 10, a reception apparatus 21, a TPT/AMT server 30, an application servers 40-1 through 40-n, a standard application server 41, and an ACR server 70.

The reception apparatus 21, the TPT/AMT server 30, the application servers 40-1 through 40-n, the standard application server 41, and the ACR server 70 are interconnected through the Internet 90.

To be more specific, unlike the broadcasting-communication coordinated system 1 shown in FIG. 1, the broadcasting-communication coordinated system 2 has the ACR server 70 and the reception apparatus 21 instead of the reception apparatus 20 shown in FIG. 1. The remaining configuration is substantially the same as shown in FIG. 1, so that the explanation of the remaining configuration is skipped as appropriate.

The reception apparatus 21 periodically accesses the ACR server 70 through the Internet 90 to request for trigger information. In this processing, a feature quantity (hereinafter also referred to as finger print information) that is extracted from one or both of a video signal and an audio signal of broadcast content such as a television program is transmitted to the ACR server 70.

The ACR server 70 is provided by a broadcaster that broadcasts broadcast content through the transmission apparatus 10 or other business operators. The ACR server 70 has a database having feature quantities extracted from the video and audio signals of given broadcast content and identifies the broadcast content based on ACR (Automatic Content Recognition) technique upon request from a given reception apparatus 21 connected to the Internet 90.

To be more specific, the ACR server 70 matches the finger print information from the reception apparatus 21 with this database to identify broadcast content, thereby generating trigger information in accordance with an identification result. The ACR server 70 transmits the generated trigger information to the reception apparatus 21 through the Internet 90.

On the basis of time information (media_time) included in the trigger information received from the ACR server 70, the reception apparatus 21 sets or resets (or calibrates) the media clock.

In addition, in accordance with this trigger information, the reception apparatus 21 accesses the TPT/AMT server 30 through the Internet 90 to obtain a TPT and an AMT. On the basis of the trigger information from the ACR server 70 or the time counted by the media clock, the reception apparatus 21 references the TPT and the AMT to identify an action for a specified coordinated application. Then, the reception apparatus 21 controls the operation of the specified coordinated application in accordance with the identified action.

It should be noted that, in the broadcasting-communication coordinated system 2, trigger information is generated by the ACR server 70, so that the electric power management apparatus 100 need not transmit trigger information.

Thus, the broadcasting-communication coordinated system 2 is configured as described so far.

[Exemplary Configuration of the Reception Apparatus]

Figure 35:
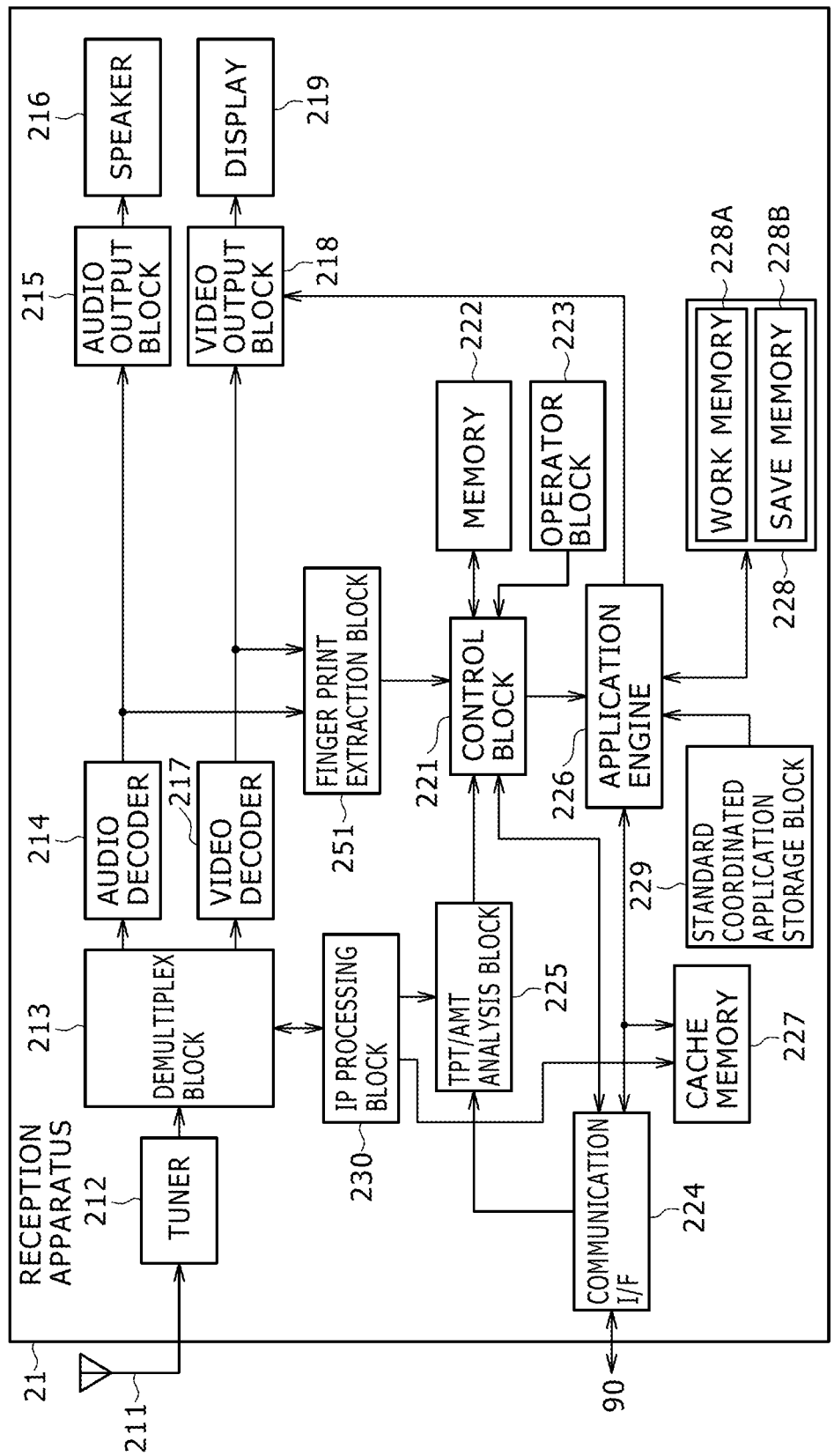
FIG. 35 is a diagram illustrating an exemplary configuration of a reception apparatus.

Referring to FIG. 35, there is shown an exemplary configuration of the reception apparatus 21.

Like the reception apparatus 20 shown in FIG. 3, the reception apparatus 21 has component blocks, the tuner 212 through the IP processing block 230; but, unlike the reception apparatus 20 shown in FIG. 3, the reception apparatus 21 has a finger print extraction block 251 instead of the trigger information extraction block 220. With reference to the reception apparatus 21, component blocks similar to those of the reception apparatus 20 shown in FIG. 3 are denoted by the same reference numerals and the description of these similar component blocks is skipped as appropriate.

To the finger print extraction block 251, an audio signal from the audio decoder 214 and a video signal from the video decoder 217 are outputted. The finger print extraction block 251 extracts a feature quantity from one or both of the audio signal and the video signal and supplies the extracted feature quantity to the control block 221 as finger print information.

Under the control of the control block 221, the communication I/F 224 transmits the finger print information to the ACR server 70 through the Internet 90. In addition, the communication I/F 224 receives the trigger information transmitted from the ACR server 70 and supplies the received trigger information to the control block 221.

In accordance with the trigger information supplied from the communication I/F 224, the control block 221 controls the communication I/F 224 to access the TPT/AMT server 30 through the Internet 90, thereby requesting for a TPT and an AMT. The communication I/F 224 receives the TPT and the AMT transmitted from the TPT/AMT server 30 through the Internet 90 and supplies the received TPT and AMT to the TPT/AMT analysis block 225.

The TPT/AMT analysis block 225 captures the TPT and the AMT supplied from the communication I/F 224 and holds the captured TPT and AMT in a memory (not shown) arranged in the TPT/AMT analysis block 225. The TPT/AMT analysis block 225 analyzes the TPT and AMT and supplies an analysis result to the control block 221.

In addition, on the basis of time information (media_time) included in the trigger information supplied from the communication I/F 224, the control block 221 sets or resets the media clock.

Further, on the basis of a time indicated by the media clock, the control block 221 references the analysis result of TPT and AMT supplied from the TPT/AMT analysis block 225 to identify an action for a specified coordinated application. For example, if a predetermined validity condition is satisfied as when a time indicated by the media clock has entered the valid period of an event, the control block 221 identifies an action specified by this valid event.

Thus, the reception apparatus 21 is configured as described so far.

[Operation to be Executed in Accordance with an Operation Mode of the Reception Apparatus]

Even if trigger information corresponding to an ACR identification result is captured, the reception apparatus 21 controls the operation of a coordinated application in accordance with an operation mode specified by this trigger information in the same way as with the first embodiment described before. Like the first embodiment, there are three operation modes; the TPT mode, the first direct mode, and the second direct mode. In what follows, each of these operation modes in which the reception apparatus 21 operates will be described.

[1. The Operation Mode: The TPT Mode]

Figure 36:
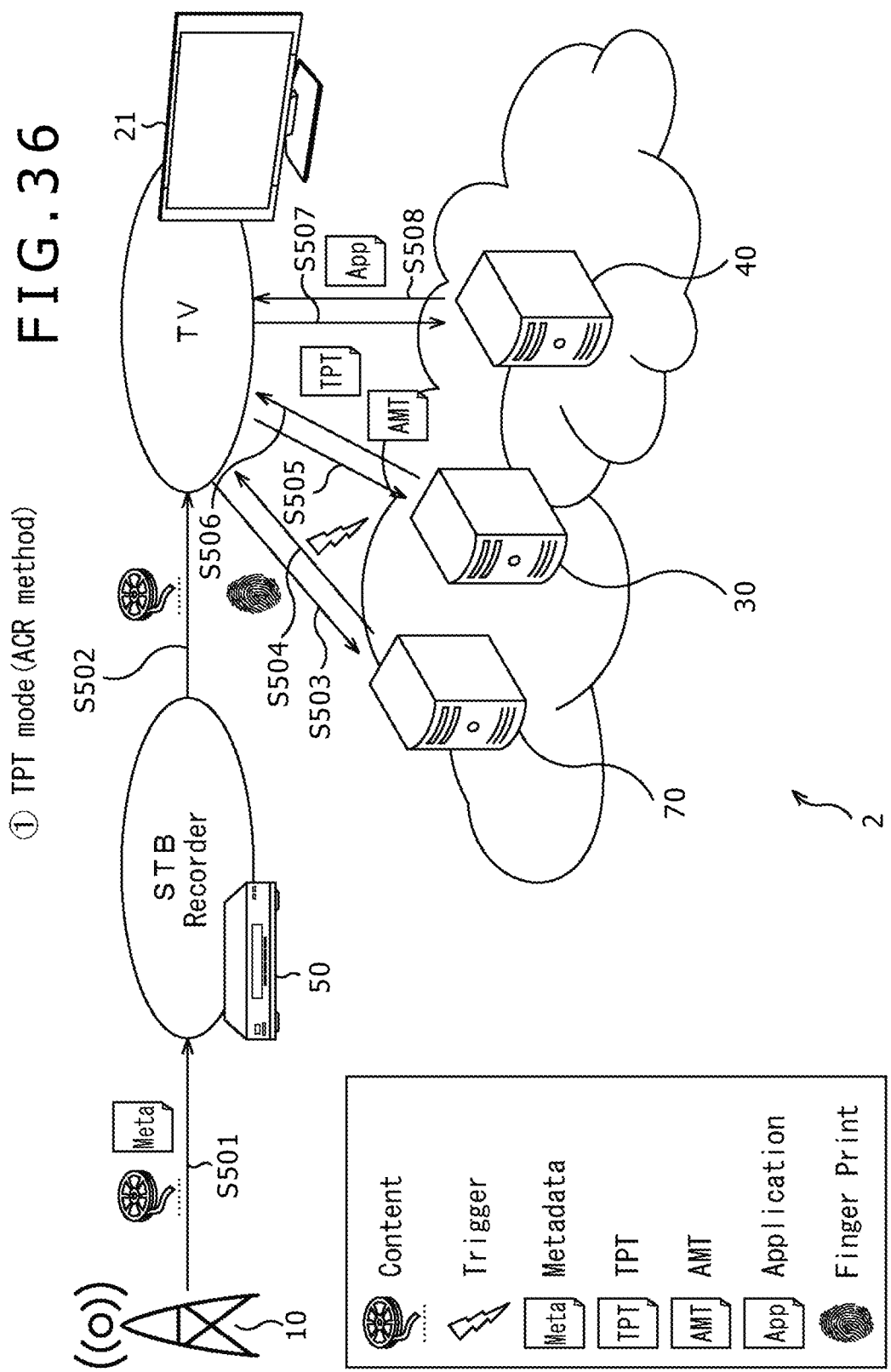
FIG. 36 is a diagram illustrating outlines of operations of apparatuses in the TPT mode.
Figure 37:
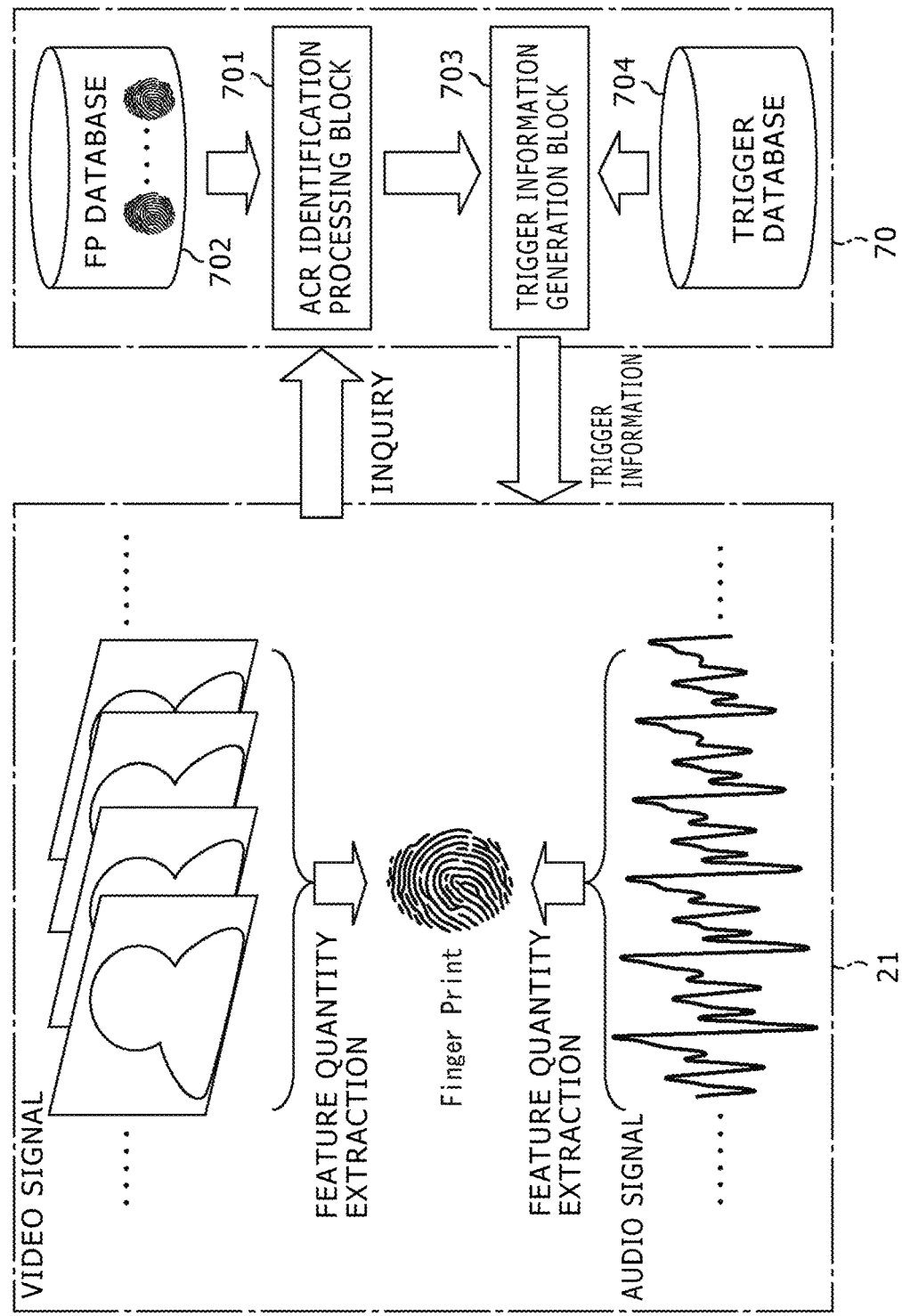
FIG. 37 is a diagram illustrating a concept of an ACR technology.
Figure 38:
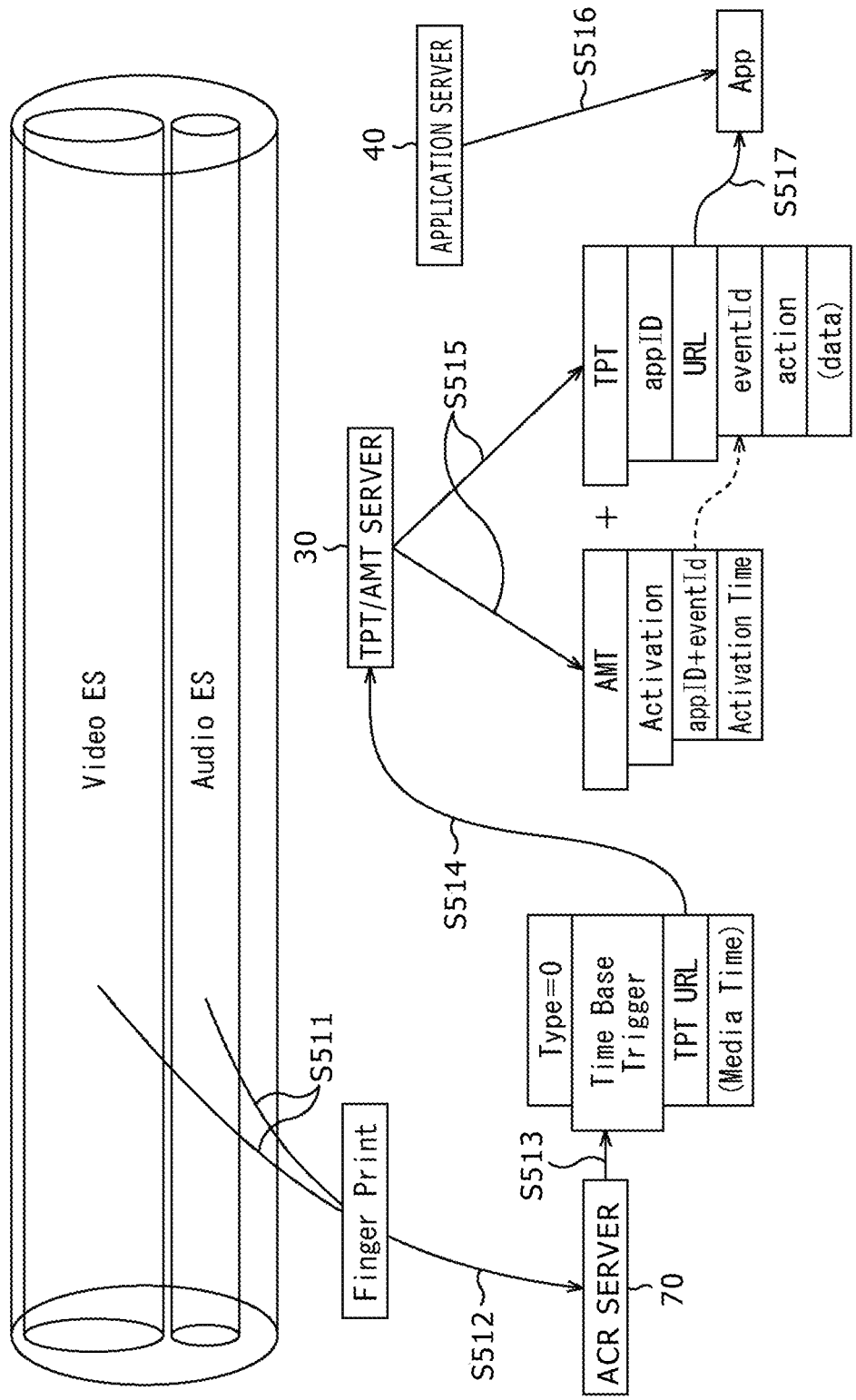
FIG. 38 is a diagram illustrating a method of capturing an Internet-distributed coordinated application in the TPT mode.

First, with reference to FIG. 36 through FIG. 38, an example in which the reception apparatus 21 operates in the TPT mode is described.

(Operation of Each Component Block of the Broadcasting-Communication Coordinated System)

Referring to FIG. 36, there is shown an outline of operations of component blocks of the broadcasting-communication coordinated system 2 when the reception apparatus 21 operates in the TPT mode.

In the broadcasting-communication coordinated system 2, a broadcast signal of broadcast content is transmitted by the transmission apparatus 10 (S501). This broadcast signal is added with metadata associated with this broadcast content.

If the reception apparatus 21 receives a broadcast signal from the transmission apparatus 10 via a CATV network or a satellite communication network, the reception apparatus 21 receives a signal obtained by conversion by a dedicated terminal such as a set-top box 50 through HDMI (S502). In this case, the output from the set-top box 50 is only broadcast content, so that the reception apparatus 21 cannot use metadata.

In receiving a broadcast signal through the set-top box 50 (S502) in addition to the direct receiving of a broadcast signal (S501), the reception apparatus 21 transmits a feature quantity extracted from a video signal and an audio signal of broadcast content to the ACR server 70 as finger print information, thereby requesting for trigger information (S503).

The ACR server 70 executes ACR identification processing to match the finger print information from the reception apparatus 21 with the database, thereby identifying a program being selected in the reception apparatus 21. To be more specific, as shown in FIG. 37, in the ACR server 70, finger print information is matched with a prepared FP database 702 by an ACR identification processing block 701 upon request from the reception apparatus 21 for finger print information, thereby identifying broadcast content being selected by the reception apparatus 21.

It should be noted that finger print information (or a feature quantity) is unique to all or a part of component elements of broadcast content and many pieces of broadcast content unique information are registered in the FP database 702 in advance, for example. In ACR identification processing, the degree of similarity or the degree of matching between these pieces of unique information is determined, for example. It should be noted that any of known techniques disclosed in various documents for example may be used for a method of determining the degree of similarity or the degree of matching. Use of the ACR technique allows the identification of broadcast content from the feature quantities of a video signal and an audio signal independently of broadcast content resolution, aspect ratio, bit rate, or format.

This ACR identification processing provides both channel identification information for identifying a channel number of broadcast content and time positional information indicative of a time position at which finger print information has been extracted when the time from the beginning of broadcast content to the end thereof is represented by time axis. These identification results are supplied to a trigger information generation block 703.

On the basis of the identification results from an ACR identification processing block 701 and various pieces of information registered in a trigger database 704, the trigger information generation block 703 generates trigger information. To be more specific, in the trigger database 704, server identification information, content identification information, and operation modes are registered in advance as related with channel identification information, for example.

The trigger information generation block 703 references the trigger database 704 to obtain server identification information and content identification information corresponding to channel identification information supplied from the ACR identification processing block 701. Then, the trigger information generation block 703 generates trigger information with the server identification information obtained from the trigger database 704 being domain_name, content identification information being segment_id, operation mode being Type, and time positional information supplied from the ACR identification processing block 701 being media_time. It is assumed here that the TPT mode be specified as Type.

Referring to FIG. 36 again, the trigger information generation block 703 transmits the generated trigger information to the reception apparatus 21 that requested for the trigger information (S504). In accordance with the operation mode (Type) included in the trigger information received from the ACR server 70, the reception apparatus 21 operates in the TPT mode. In addition, if the reception apparatus 21 determines to obtain a TPT and an AMT in response to domain_name and segment_id included in this trigger information, them the reception apparatus 21 accesses the TPT/AMT server 30 through the Internet 90 to request for a TPT and an AMT (S505).

In response to the request from the reception apparatus 21, the TPT/AMT server 30 identifies the TPT and the AMT and transmits the identified TPT and AMT to the reception apparatus 21 via the Internet 90 (S506). The reception apparatus 21 receives the TPT and the AMT from the TPT/AMT server 30 via the Internet 90 and holds the received TPT and AMT.

If the reception apparatus 21 obtains trigger information from the ACR server 70 in response to the periodically extracted finger print information, the reception apparatus 21 sets or resets the media clock on the basis of media_time included in the trigger information.

In addition, if a time indicated by the media clock has entered the valid period of an event, the reception apparatus 21 identifies an action specified by the valid event. In response to the identified action, the reception apparatus 21 accesses the application server 40 through the Internet 90 to request for a coordinated application to be executed in coordination with the broadcast content being selected (S507).

In response to the request from the reception apparatus 21, the application server 40 transmits the coordinated application to the reception apparatus 21 through the Internet 90 (S508). The reception apparatus 21 obtains the coordinated application supplied from the application server 40 and activates the obtained coordinated application.

Subsequently, if a time indicated by the media clock has entered the valid period f an event for example, the reception apparatus 21 identifies an action specified by the valid event. Then, in response to the identified action, the coordinated application executes operations such as event fire, suspend or restart, or terminate, for example.

As described above, in the broadcasting-communication coordinated system 2, the reception apparatus 21 operates in the TPT mode specified in the trigger information obtained by periodically transmitting finger print information from the reception apparatus 21 to the ACR server 70, thereby executing coordinated operations with the TPT/AMT server 30 and the application server 40. Consequently, a coordinated application for the broadcast content being selected is captured and executed in the reception apparatus 21.

In addition, the trigger information from the ACR server 70 is transmitted to the reception apparatus 21 independently of a dedicated terminal such as the set-top box 50, so that a coordinated application may be provided without involving such jobs as remodeling CATV network transmission path facilities and terminals and obtaining a license from a relay broadcaster, for example.

It should be noted that, in FIG. 36, a coordinated application and a TPT and an AMT are distributed through the Internet; it is also practicable to distribute a coordinated application and a TPT and an AMT by broadcasting.

(A Method of Capturing a Coordinated Application)

The following describes a method of capturing a coordinated application when the reception apparatus 21 operates in the TPT mode with reference to FIG. 38.

Referring to FIG. 38, there is shown a method of capturing a coordinated application that is distributed through the Internet.

In the case of Internet distribution, there is no need for using SSC and FLUTE described before, so that a broadcast stream multiplexed with a video stream (Video ES) and an audio stream (Audio ES) is shown in FIG. 38. Unlike the first embodiment, trigger information corresponding to ACR identification results is obtained in the second embodiment, so that there is no need for inserting trigger information in a caption stream.

In this case, the following operations are executed in order to capture a coordinated application distributed through the Internet in the reception apparatus 21.

To be more specific, the reception apparatus 21 extracts finger print information from the video signal and the audio signal (S511) and transmits the extracted finger print information to the ACR server 70 (S512). The ACR server 70 generates trigger signal on the basis of the finger print information and transmits the generated trigger information to the reception apparatus 21 that requested for the trigger information (S513).

If the reception apparatus 21 receives time-base trigger information from the ACR server 70, the reception apparatus 21 sets media_time included in this trigger signal to the media clock. It should be noted here that, because the operation mode is the TPT mode, "0" is set to Type of the trigger signal.

In addition, in accordance with a URL made up of a character string obtained by linking domain_name and segment_id included in this trigger signal, the reception apparatus 21 accesses the TPT/AMT server 30 through the Internet 90 (S514). Consequently, the reception apparatus 21 obtains a TPT and an AMT from the TPT/AMT server 30 (S515).

Then, in accordance with the URL specified in the obtained TPT, the reception apparatus 21 accesses the application server 40 through the Internet 90 to obtain a coordinated application (S516, S517). As described above, a coordinated application distributed through the Internet is captured.

Thus, a method of capturing a coordinated application distributed through the Internet has been described. This method does not use a FLUTE session and so on, so that this method allows even a receiving device not compatible with NRT services to capture a coordinated application distributed through the Internet.

It should be noted that, in the capturing method shown in FIG. 38, coordinated application is distributed through the Internet; it is also practicable to distribute a coordinated application by broadcasting.

(Exemplary Operation in the TPT Mode)

This exemplary operation is basically the same as that of the exemplary operation (refer to FIG. 15) in which the reception apparatus 20 operates in the TPT mode except trigger information is transmitted from the ACR server 70 rather than from the transmission apparatus 10. Therefore, the description of this exemplary operation is skipped for the brevity of description.

Thus, the reception apparatus 21 operates in the TPT mode as described so far.

[2. The Operation Mode: The First Direct Mode]

Figure 39:
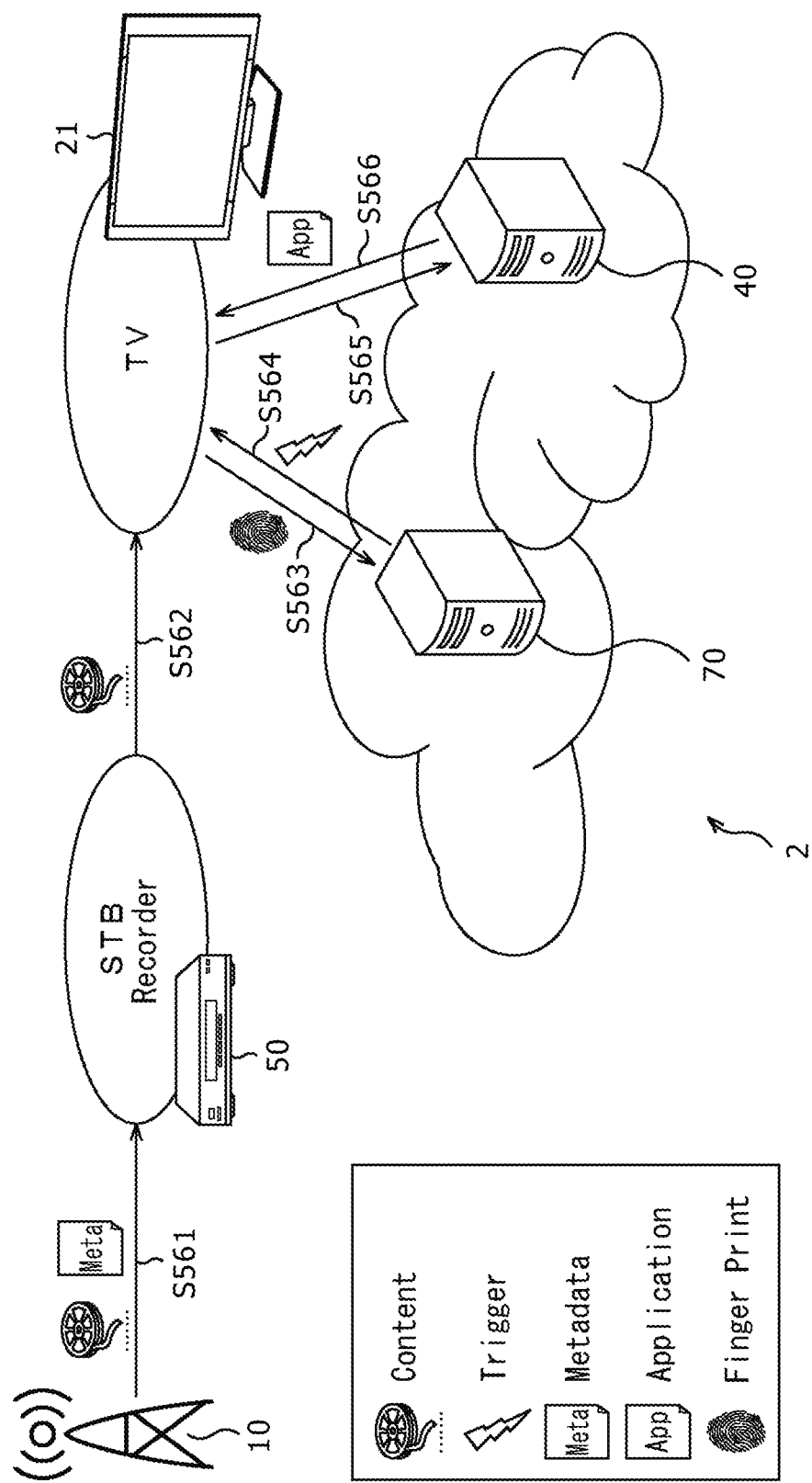
FIG. 39 is a diagram illustrating outlines of operations of apparatuses in the first direct mode.
Figure 40:
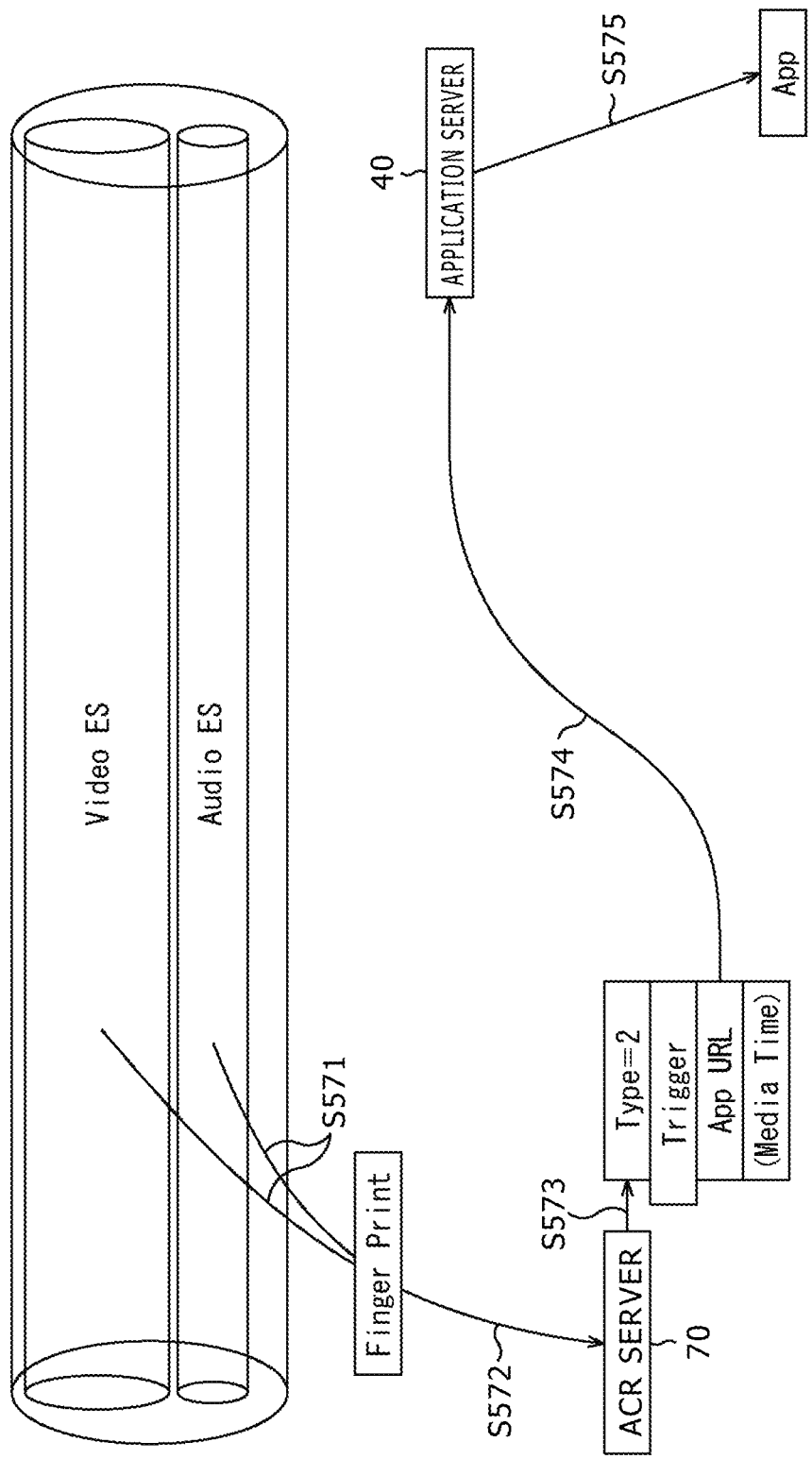
FIG. 40 is a diagram illustrating a method of capturing an Internet-distributed coordinated application in the first direct mode.

The following describes an example in which the reception apparatus 21 operates in the first direct mode with reference to FIG. 39 and FIG. 40.

(Operations of Component Apparatuses of the Broadcasting-Communication Coordinated System)

Referring to FIG. 39, there is shown an outline of operations of component apparatuses of the broadcasting-communication coordinated system 2 to be executed when the reception apparatus 21 operates in the first direct mode.

At S561 through S564 shown in FIG. 39, a broadcast signal of broadcast content is transmitted with metadata from the transmission apparatus 10 as with step S501 through S504 shown in FIG. 36 and the broadcast content is received by the reception apparatus 21. Then, if the reception apparatus 21 has received trigger information corresponding to finger print information from the ACR server 70, the reception apparatus 21 operates in the first direct mode in accordance with the operation mode specified in this trigger information.

At the same time, the reception apparatus 21 accesses the application server 40 through the Internet 90 to request for a coordinated application that is executed in coordination with the broadcast content being selected (S565).

In response to the request from the reception apparatus 21, the application server 40 transmits a coordinated application to the reception apparatus 21 through the Internet 90 (S566). The reception apparatus 21 captures the coordinated application transmitted from the application server 40 and immediately activates the captured coordinated application.

If trigger information is extracted in the reception apparatus 21, then the operation of the coordinated application is controlled in accordance with additional_information included in this trigger information.

As described above, in the broadcasting-communication coordinated system 2 shown in FIG. 39, the reception apparatus 21 operates in first direct mode specified in the trigger information supplied from the ACR server 70, thereby providing a coordinated operation with the application server 40. Consequently, in the reception apparatus 21, the coordinated application for the broadcast content being selected is captured and executed.

Further, the trigger information transmitted from the ACR server 70 is transmitted to the reception apparatus 21 independently of a dedicated terminal such as the set-top box 50, so that a coordinated application may be provided without involving such jobs as remodeling CATV network transmission path facilities and terminals and obtaining a license from a relay broadcaster, for example, in the broadcasting-communication coordinated system 2.

It should be noted that, in FIG. 39, an example is shown in which a coordinated application is distributed through the Internet; it is also practicable to distribute a coordinated application by broadcasting.

(A Method of Capturing a Coordinated Application)

The following describes a method of capturing a coordinated application in the case where the reception apparatus 21 operates in the first direct mode.

Referring to FIG. 40, there is shown a method of capturing a coordinated application that is distributed through the Internet.

In the case of Internet distribution, SSC and FLUTE described before need not be used, so that a broadcast stream multiplexed with a video stream (Stream ES) and an audio stream (Audio ES) is shown in FIG. 40. Unlike the first embodiment, trigger information is obtained in accordance with ACR identification results, so that there is no need for inserting a caption stream in the second embodiment.

In this case, the following operations are executed in the reception apparatus 21 in order to capture a coordinated application that is distributed through the Internet.

To be more specific, the reception apparatus 21 extracts finger print information from a video signal and an audio signal (S571) and transmits the extracted finger print information to the ACR server 70 (S572). On the basis of the finger print information received from the reception apparatus 21, the ACR server 70 generates trigger information and transmits the generated trigger information to the reception apparatus 21 from which the request has come (S573).

If the reception apparatus 21 receives the trigger information from the ACR server 70, the reception apparatus 21 obtains a URL ("App URL" in the figure) made up of a character string obtained by linking domain_name and segment_id included in this trigger information. It should be noted that the operation mode here is the first direct mode, so that "2" is specified in Type of the trigger information.

Then, in accordance with the obtained URL, the reception apparatus 21 accesses the application server 40 through the Internet 90 (S574). Consequently, the reception apparatus 21 is ready for capturing a coordinated application from the application server 40 (S575).

Thus, a method of capturing a coordinated application that is distributed through the Internet has been described. Because no FLUTE session and so on are used, this method allows even a reception device not compatible with NRT services to capture a coordinated application that is distributed through the Internet.

It should be noted that, in the capturing method shown in FIG. 40, a coordinated application is distributed through the Internet; it is also practicable to distribute a coordinated application by broadcasting.

(Exemplary Operation in the First Direct Mode)

The exemplary operation in which the reception apparatus 21 operates in the first direct mode is basically the same as that in which the reception apparatus 20 operates in the first direct mode as describe before (refer to FIG. 19) except that trigger signal is transmitted from the ACR server 70 rather than the transmission apparatus 10. Therefore, the description of the exemplary operation in the first direct mode is skipped for the brevity of description.

Thus, an example in which the reception apparatus 21 operates in the first direct mode has been described.

[3. The Operation Mode: The Second Direct Mode]

Figure 41:
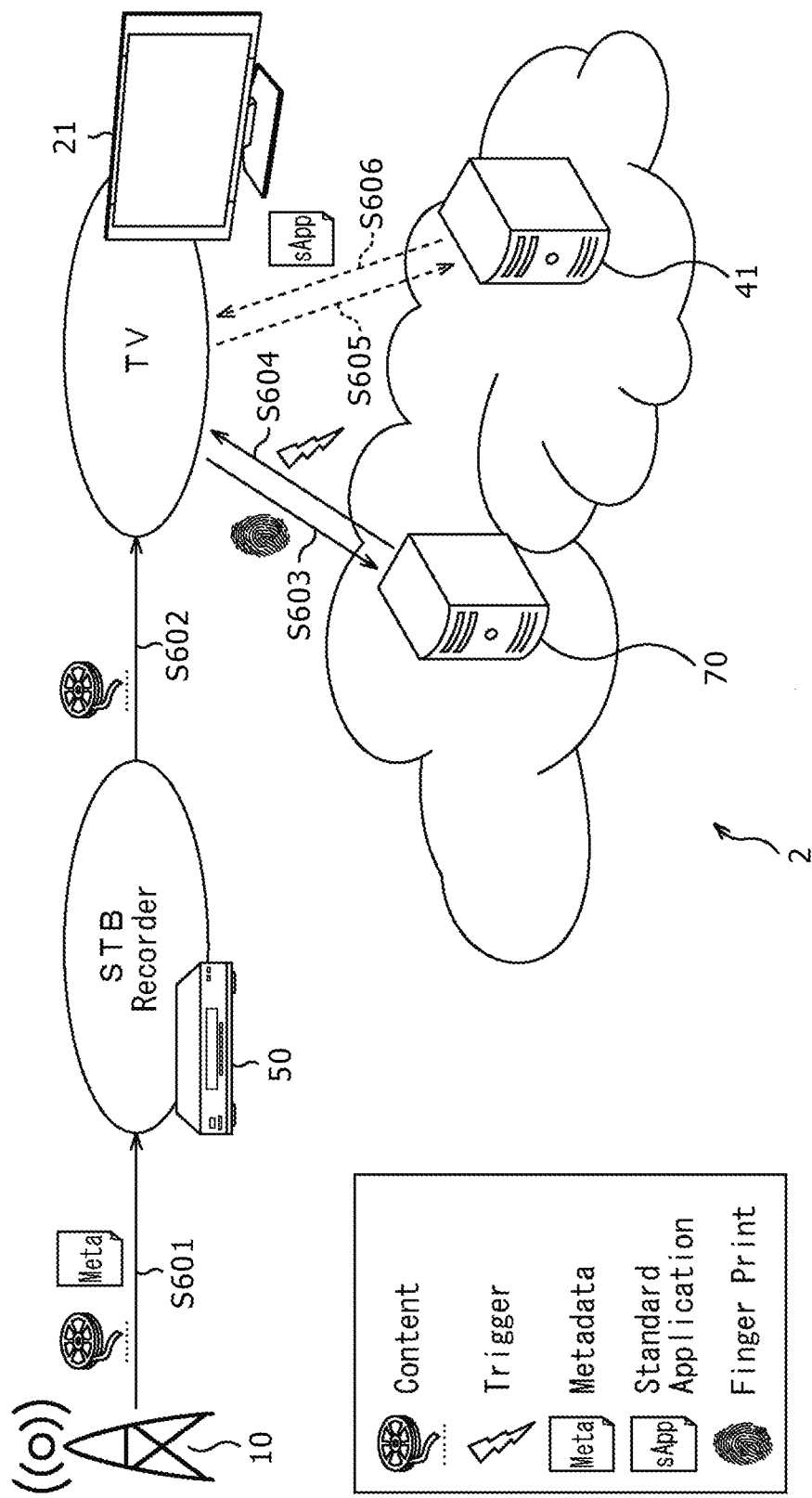
FIG. 41 is a diagram illustrating outlines of operations of apparatuses in the second direct mode.
Figure 42:
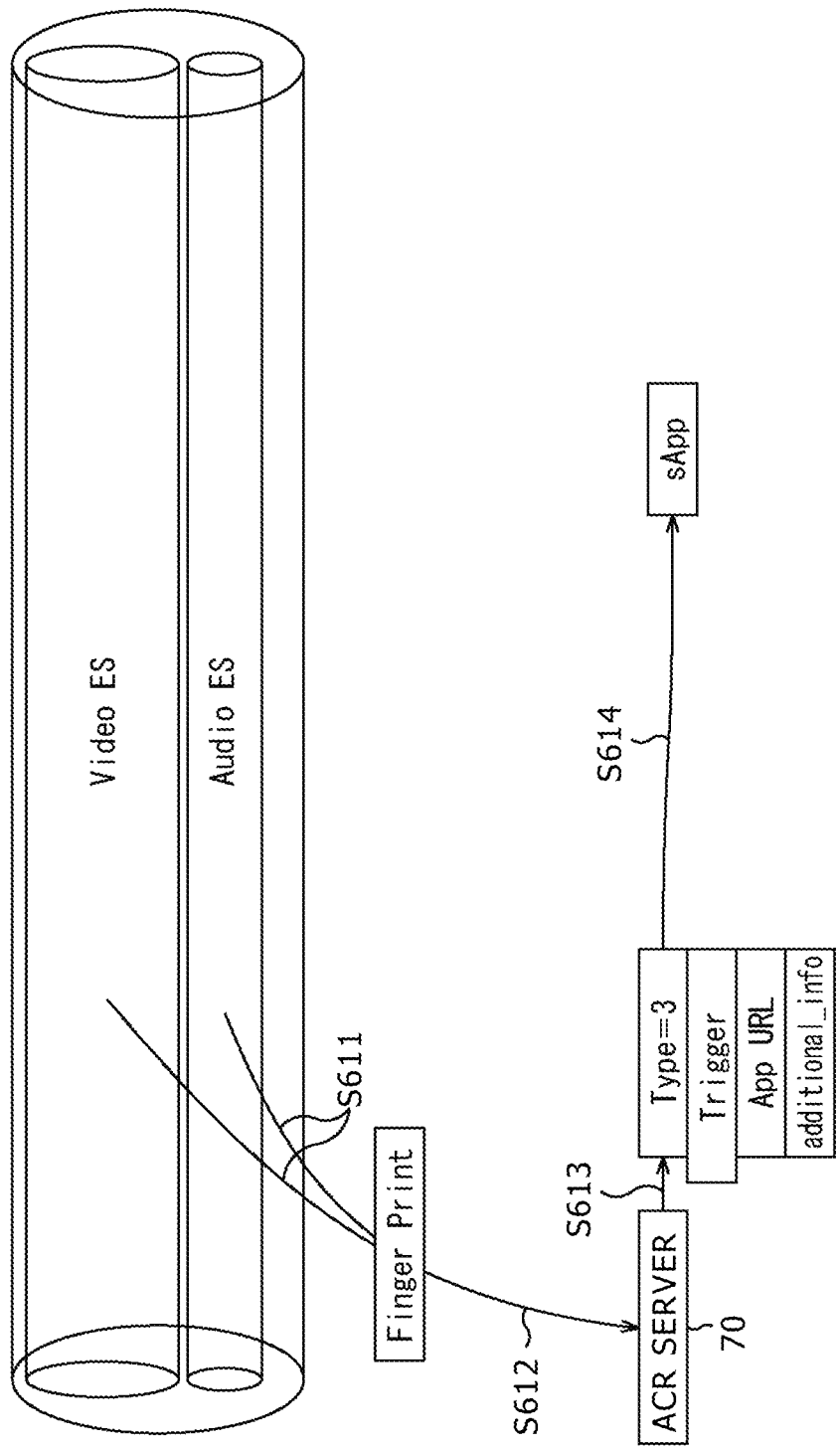
FIG. 42 is a diagram illustrating a method capturing an Internet-distributed coordinated application in the second direct mode.

The following describes an example in which the reception apparatus 21 operates in the second direct mode with reference to FIG. 41 and FIG. 42.

(Operations of Component Apparatuses of the Broadcasting-Communication Coordinated System)

Referring to FIG. 41, there is shown an outline of operations of component apparatuses of the broadcasting-communication coordinated system 2 when the reception apparatus 21 operates in the second direct mode.

Like step S501 through step S504 shown in FIG. 36, a broadcast signal of broadcast content is transmitted from the transmission apparatus 10 including metadata and the broadcast content is received by the reception apparatus 21 in step S601 through step S604 shown in FIG. 41. Then, if the reception apparatus 21 receives trigger information corresponding to finger print information from the ACR server 70, the reception apparatus 21 operates in the second direct mode in accordance with the operation mode specified in this trigger information.

In addition, the reception apparatus 21 accesses the standard application server 41 through the Internet 90 in response to this trigger information to request for a standard coordinated application that is executed in coordination with the broadcast content being selected (S605).

In response to the request from the reception apparatus 21, the standard application server 41 transmits a standard coordinated application to the reception apparatus 21 through the Internet 90 (S606). The reception apparatus 21 captures the standard coordinated application from the standard application server 41 and immediately activates the received standard coordinated application.

In addition, if trigger information is extracted, the operation of the standard coordinated application is controlled in accordance with additional_information included in this trigger information in the reception apparatus 21.

As described above, in the broadcasting-communication coordinated system 2, the reception apparatus 21 operates in the second direct mode specified in the trigger information transmitted from the transmission apparatus 10, thereby providing a coordinated operation with the standard application server 41. Consequently, the reception apparatus 21 captures a standard coordinated application that may be executed in coordination with broadcast content being selected and executes the captured standard coordinated application.

In addition, the trigger information from the ACR server 70 is transmitted to the reception apparatus 21 independently of a dedicated terminal such as the set-top box 50, so that a standard coordinated application may be provided without involving such jobs as remodeling CATV network transmission path facilities and terminals and obtaining a license from a relay broadcaster, for example, in the broadcasting-communication coordinated system 2.

It should be noted that, in FIG. 41, a standard coordinated application is distributed through the Internet; it is also practicable to hold a standard coordinated application in the reception apparatus 21 in advance and read this standard coordinated application for capturing. In addition, it is practicable to distribute a standard coordinated application by broadcasting.

(A Method of Capturing a Standard Coordinated Application)

The following describes a method of capturing a standard coordinated application when the reception apparatus 21 operates in the second direct mode with reference to FIG. 42.

Referring to FIG. 42, there is shown a method of capturing a standard coordinated application that is held in the reception apparatus 21 in advance.

If s coordinated application is held in advance, there is no need to use SSC and FLUTE, so that a broadcast stream multiplexed with a video stream (Video ES) and an audio stream (Audio ES) is shown in FIG. 42. Unlike the first embodiment, trigger information corresponding to ACR identification results is captured in the second embodiment, so that there is no need for inserting trigger information in a caption stream.

In this case, the following operations are executed in the reception apparatus 21 in order to capture the standard coordinated application held in the reception apparatus 21 in advance.

Namely, the reception apparatus 21 extracts finger print information from a video signal and an audio signal (S611) and transmits the extracted finger print information to the ACR server 70 (S612).

On the basis of the finger print information supplied from the reception apparatus 21, the ACR server 70 generates trigger information and transmits the generated trigger information to the requesting reception apparatus 21 that (S613). If the reception apparatus 21 receives the trigger signal from the ACR server 70, the reception apparatus 21 reads the standard coordinated application from the standard coordinated application storage block 229 and captures the standard coordinated application (S614). It should be noted that, because the operation mode is the second direct mode here, "3" is specified in Type of the trigger information.

Consequently, the reception apparatus 21 is ready for capturing a standard coordinated application.

Thus, a standard coordinated application held in advance is captured as described so far. This method allows the capturing of a standard coordinated application held in advance independently of Internet distribution or broadcasting distribution.

It should be noted that, in the above-mentioned example, a standard coordinated application is internally held in advance; it is also practicable to distribute a standard coordinated application by Internet or broadcasting.

(Exemplary Operation in the Second Direct Mode)

This exemplary operation in which the reception apparatus 21 operates in the second direct mode is basically the same as the above-mentioned example (refer to FIG. 23 and FIG. 24) in which the reception apparatus 20 operates in the second direct mode except that trigger information is transmitted from the ACR server 70 rather than the transmission apparatus 10. Therefore, the description of an exemplary operation of the reception apparatus 21 in the second direct mode is skipped.

Thus, an example in which the reception apparatus 21 operates in the second direct mode has been described.

[Specific Contents of Processing Executed in Component Apparatuses]

Figure 43:
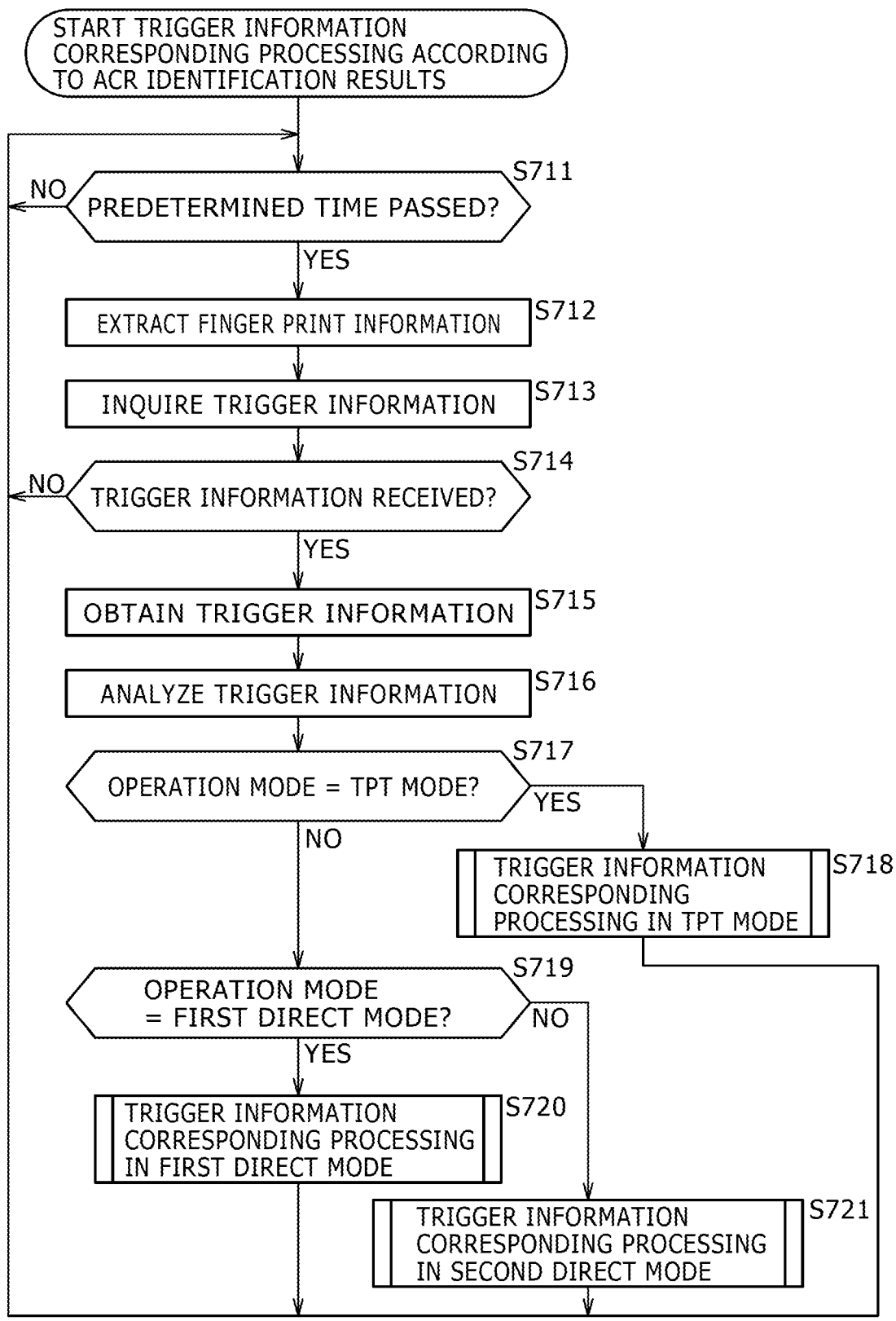
FIG. 43 is a flowchart indicative of trigger information corresponding processing to be executed in accordance with ACR identification results.

The following describes specific processing operations that are executed in the component apparatuses of the broadcasting-communication coordinated system 2 shown in FIG. 34 with reference to the flowchart shown in FIG. 43.

Figure 25:
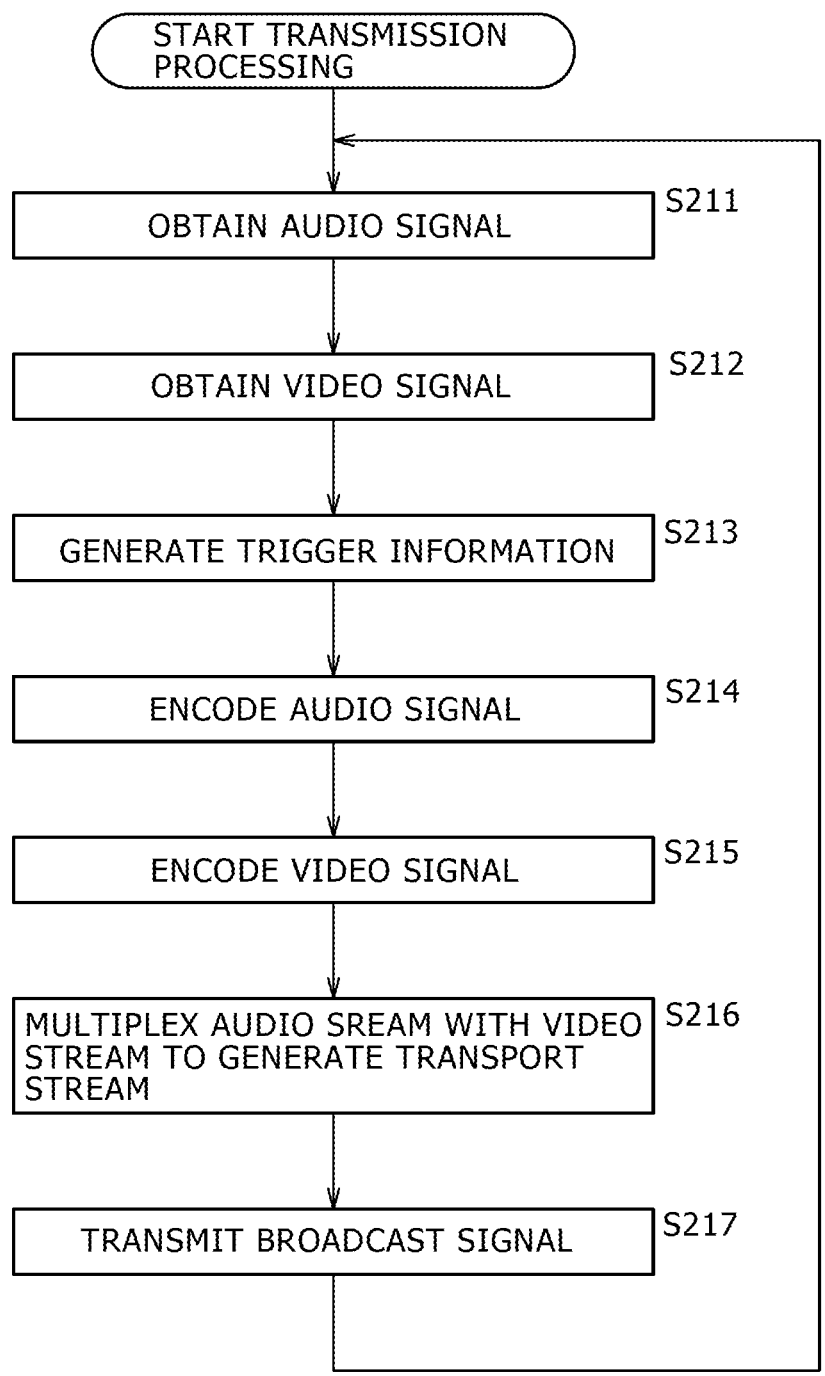
FIG. 25 is a flowchart indicative of transmission processing.

It should be noted that, in the broadcasting-communication coordinated system 2 shown in FIG. 34, the transmission processing executed by the transmission apparatus 10 is substantially the same as that shown in FIG. 25 and the reception processing executed by the reception apparatus 21 is substantially the same as that shown in FIG. 26, so that the description of the transmission processing in the broadcasting-communication coordinated system 2 is skipped.

(Trigger Information Corresponding Processing in Accordance with ACR Identification Results)

The following describes trigger information corresponding processing in accordance with ACR identification results with reference to the flowchart shown in FIG. 41. Namely, this trigger information corresponding processing is executed instead of the trigger information corresponding processing (refer to FIG. 27) in the first embodiment.

In step S711, the finger print extraction block 251 waits until a predetermined time passes as a finger print information extraction interval. Then, when the predetermined time has passed, the procedure goes to step S712.

In step S712, the finger print extraction block 251 extracts a feature quantity (or finger print information) from one or both of an audio signal and a video signal.

In step S713, the control block 221 controls the communication I/F 224 to transmit the finger print information obtained by the finger print extraction block 251 to the ACR server 70 through the Internet 90, thereby requesting for trigger information.

In step S714, the control block 221 controls the communication I/F 224 to determine whether trigger information has been received from the ACR server 70 or not. If trigger information is found in step S714 to have not been received, then the procedure is returned to step S711 to repeat the above-mentioned processing therefrom.

On the other hand, if trigger information is found in step S714 to have been received, then processing goes to step S715. In step S715 and step S716, the obtained trigger information is analyzed as with step S332 and step S333 shown in FIG. 27.

When the analysis of the trigger information has terminated in step S716, then the procedure goes to step S717. In step S717 through step S721, trigger information corresponding processing corresponding to the operation mode is executed in accordance with the trigger information analysis results obtained in step S716 like step S334 through step S338 shown in FIG. 27.

If the operation mode specified in the trigger information is the TPT mode, the trigger information corresponding processing of the TPT mode of step S718 is executed. This trigger information corresponding processing is executed in substantially the same manner as that of the trigger information corresponding processing of the TPT mode shown in FIG. 28, so that the description thereof is skipped.

If the operation mode is the TPT mode, coordinated application control processing is executed in a time sequence of the media clock concurrently with this trigger information corresponding processing. This coordinated application control processing is executed in substantially the same manner as that of the coordinated application control processing shown in FIG. 30, so that the description thereof is skipped.

As described above, if the reception apparatus 21 operates in the TPT mode, the reception apparatus 21 references the TPT and the AMT on the basis of the trigger information from the ACR server 70 or a time counted by the media clock, thereby identifying an action for a specified coordinated application to control the operation of the specified coordinated application.

If the operation mode specified in the trigger information is the first direct mode, the trigger information corresponding processing of the first direct mode of step S720 is executed. This trigger information corresponding processing is executed in substantially the same manner as that of the trigger information corresponding processing of the first direct mode shown in FIG. 32, so that the description thereof is skipped.

Namely, if the reception apparatus 21 operates in the first direct mode, the reception apparatus 21 controls the operation of the specified coordinated application on the basis of the trigger information supplied from the ACR server 70.

Further, if the operation mode specified in the trigger information is the second direct mode, the trigger information corresponding processing of the second direct mode of step S721 is executed. This trigger information corresponding processing is executed in substantially the same manner as that of the trigger information corresponding processing of the second direct mode shown in FIG. 33, so that the description thereof is skipped.

Namely, if the reception apparatus 21 operates in the second direct mode, the reception apparatus 21 controls the operation of the specified standard coordinated application on the basis of the trigger information supplied from the ACR server 70.

When the processing of step S718, step S720, or step S721 has terminated, the procedure is returned to step S711 to repeat the above-mentioned processing therefrom.

Thus, the trigger information corresponding processing in accordance with ACR identification results is executed.

As described above, in the second embodiment, the reception apparatus 20 controls the operation of a coordinated application in accordance with any one of the operations modes, the TPT mode, the first direct mode, and the second direct mode specified in the trigger information supplied from the ACR server 70. Consequently, a coordinated application becomes ready for operation in accordance with a specified operation mode, so that the coordinated application is made compatible with various operation forms.

It should be noted that, if the ACR server 70 is provided by a general business operator having no relation with broadcasters of broadcast content and trigger information is provided only by the ACR server 70 provided by such a general business operator, broadcasters cannot sometimes control trigger information.

Figure 44:
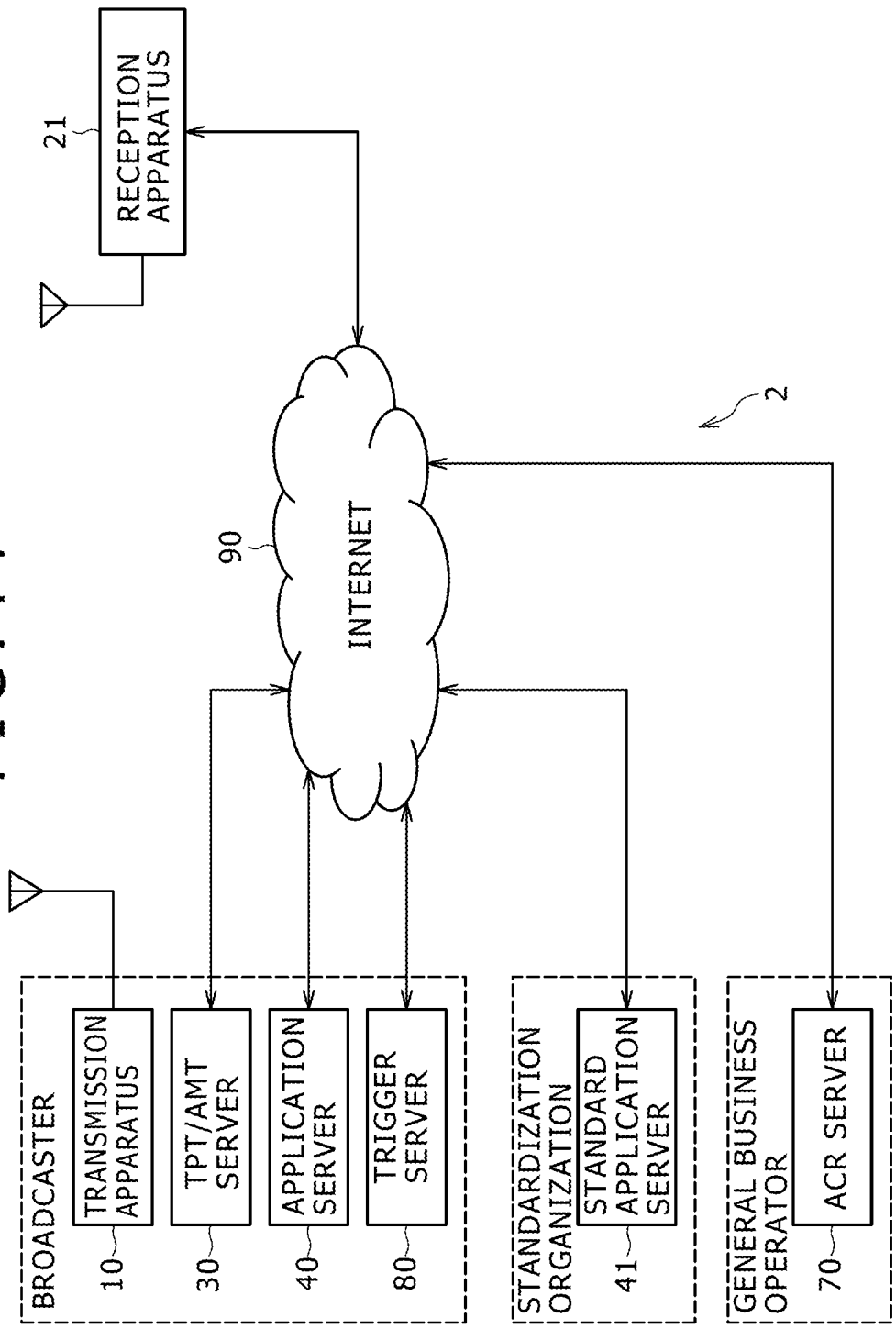
FIG. 44 is a diagram illustrating another exemplary configuration of the broadcasting-communication coordinated system.

In order to overcome this problem, broadcasters require to control the operation of a coordinated application by transmitting trigger information to the reception apparatus 21 with a desired timing. To meet this requirement, a trigger server 80 is newly arranged as shown in FIG. 44. By this trigger server 80, active trigger information controlled by a broadcaster is provided to the reception apparatus 21, thereby operating a coordinated application in proper coordination with broadcast content.

Referring to FIG. 44, there is shown another exemplary configuration of the broadcasting-communication coordinated system 2 of the second embodiment. This broadcasting-communication coordinated system 2 has a transmission apparatus 10, a reception apparatus 21, a TPT/AMT server 30, an application server 40, a standard application server 41, an ACR server 70, and a trigger server 80.

The reception apparatus 21, the TPT/AMT server 30, the application server 40, the standard application server 41, the ACR server 70, and the trigger server 80 are interconnected through the Internet 90.

To be more specific, as compared with the broadcasting-communication coordinated system 2 shown in FIG. 34, the broadcasting-communication coordinated system 2 shown in FIG. 44 is newly arranged with the trigger server 80. The other configuration is substantially the same as that shown in FIG. 34, so that the description thereof is skipped.

It should be noted however that, in the broadcasting-communication coordinated system 2 shown in FIG. 44, the transmission apparatus 10, the TPT/AMT server 30, the application server 40, and the trigger server 80 are provided by a broadcaster but the ACR server 70 is provided by a general business operator other than broadcasters. The standard application server 41 is provided by a predetermined standardization organization.

The reception apparatus 21 periodically accesses the ACR server 70 through the Internet 90 to request for trigger information. In this processing, finger print information extracted from broadcast content is transmitted to the ACR server 70.

In response to the request from a given reception apparatus 21, the ACR server 70 identifies broadcast content based on the ACR technique to generate the trigger information corresponding to the identification results. The trigger information includes media_time in addition to domain_name and segment_id. The ACR server 70 transmits the generated trigger information to the reception apparatus 21 through the Internet 90. Namely, the trigger information provided by the ACR server 70 can be said to be time-base trigger information.

The reception apparatus 21 sets or resets a time specified in media_time included in the trigger information transmitted from the ACR server 70 to the media clock. In addition, the reception apparatus 21 accesses the TPT/AMT server 30 through the Internet 90 in accordance with the URL obtained from domain_name and segment_id included in the trigger information, thereby obtaining a TPT and an AMT.

The reception apparatus 21 references the obtained TPT and AMT on the basis of the media clock to identify an action for a specified coordinated application. Then, the reception apparatus 21 controls the operation of the coordinated application in accordance with the identified action.

In addition, the reception apparatus 21 accesses the trigger server 80 through the Internet 90 on the basis of liveTrigger element written in the TPT to obtain trigger information.

To be more specific, because the URL of the trigger server 80 is specified in liveTriggerURL attribute of liveTrigger element of TPT element, the reception apparatus 21 accesses the trigger server 80 in accordance with this URL. In addition, because information indicative of polling interval is specified in pollPeriod attribute of liveTrigger element, the reception apparatus 21 requests the trigger server 80 for trigger information in accordance with this polling interval.

The trigger server 80 manages trigger information. In response to a request from the reception apparatus 21, the trigger server 80 transmits the requested trigger information to the reception apparatus 21 through the Internet 90. This trigger information includes event_id and event_time in addition to domain_name and segment_id. Namely, the trigger information provided by the trigger server 80 can be said to be active trigger information.

If event_id and event_time are included in the trigger information supplied from the trigger server 80, the reception apparatus 21 references the TPT and the AMT to identify an action corresponding to this event_id. Then, the reception apparatus 21 executes the identified action at a time specified in event_time, thereby controlling the operation of a coordinated application.

As described above, in the broadcasting-communication coordinated system 2 shown in FIG. 44, the arrangement of the trigger server 80 allows a broadcaster and so on to control trigger information, thereby making a coordinated application be compatible with various operation forms.

Thus, the second embodiment has been described.

Third Embodiment

[Exemplary Configuration of a Broadcasting-Communication Coordinated System]

In the description done above, the reception apparatus 20 or the reception apparatus 21 receives broadcast content supplied from the transmission apparatus 10. It is also practicable to distribute communication content, rather than broadcast content, by VOD (Video On Demand) through the Internet 90.

To be more specific, in the description done above, trigger information, TPT and AMT, or a coordinated application is transmitted through the Internet or by broadcasting. It is also practicable to distribute AV (Audio Visual) content that is received by the reception apparatus 20 and so on, not only by broadcasting as broadcast content but also through the Internet as communication content.

Referring to FIG. 45, there is shown a broadcasting-communication coordinated system 3 practiced as the third embodiment of the technology disclosed herein. With reference to FIG. 45, components similar to those previously described with reference to FIG. 1 are denoted by the same reference numerals and the description of these similar components is skipped.

To be more specific, as compared with the configuration shown in FIG. 1, the configuration shown in FIG. 45 has a distribution server 60 connected to the Internet 90. In response to a request from a reception apparatus 20, the distribution server 60 distributes communication content such as VOD content to the reception apparatus 20 through the Internet 90. In addition, the distribution server 60 transmits trigger information to the reception apparatus 20 with VOD content.

The reception apparatus 20 extracts the trigger information transmitted from the distribution server 60 with VOD content to obtain a TPT and an AMT corresponding to domain_name and segment_id included in the trigger information from a TPT/AMT server 30. Then, on the basis of a time indicated by the media clock set on the basis of this trigger information, the reception apparatus 20 references the obtained TPT and AMT to identify a coordinated application that is executed in coordination with the VOD content, thereby controlling the operation of the coordinated application.

As described above, the reception apparatus 20 can receive AV content including broadcast content and communication content and, at the same time, control the operation of a coordinated application that is executed in coordination with this AV content.

It should be noted that the broadcasting-communication coordinated system 3 shown in FIG. 45 is configured corresponding to the broadcasting-communication coordinated system 1 shown in FIG. 1; however, it is also practicable to configure the broadcasting-communication coordinated system 3 so as to correspond to the broadcasting-communication coordinated system 2 shown in FIG. 34 additionally having the ACR server 70, by additionally arranging the distribution server 60.

Thus, the third embodiment has been described.

As described above, the AV content, the trigger information, the TPT and AMT, or the coordinated application that is received by the reception apparatus 20 or the reception apparatus 21 may be transmitted by Internet distribution and broadcasting distribution, thereby providing operations with these distribution schemes combined. For example, although not stated in the description done above, only AV content may be distributed by the Internet, the other items including trigger information, TPT and AMT, and coordinated application being distributed by broadcasting.

It should be noted that, in the description done above, two or more such servers are arranged for each function provided as the TPT/AMT server 30, the application server 40, the distribution server 60, the ACR server 70, and the trigger server 80; it is also practicable to combine a part or all of these functions in two or more servers.

In the description done above, the broadcasting distribution of trigger information is executed by including trigger information in the caption data in the user data area of a video stream; it is also practicable to arrange trigger information by another method such as inserting trigger information in an audio signal or a video signal for example.

[Description of a Computer to which the Present Technology is Applied]

The above-mentioned sequence of processing operations may be executed by software as well as hardware. If the above-mentioned sequence of processing operations is executed by software, the programs constituting the software are installed in a computer which is built in dedicated hardware equipment or installed, from a network or recording media, into a general-purpose personal computer for example in which various programs may be installed for the execution of various functions.

Referring to FIG. 46, there is shown an exemplary hardware configuration of a computer that executes the above-mentioned sequence of processing operations by computer programs.

In a computer 900, a CPU (Central Processing Unit) 901, a ROM (Read Only Memory) 902, and a RAM (Random Access Memory) 903 are interconnected by a bus 904.

The bus 904 is connected with an input/output interface 905. The input/output interface 905 is connected with an input block 906, and output block 907, a recording block 908, a communication block 909, and a drive 910.

The input block 906 is made up of a keyboard, a mouse, and a microphone, for example. The output block 907 is made up of a display monitor and a speaker, for example. The recording block 908 is made up of a hard disk unit or a nonvolatile memory, for example. The communication block 909 is made up of a network interface for example. The drive 910 drives a removable media 911 such as an optical disk or a semiconductor memory, for example.

The above-mentioned sequence of processing operations are executed when the CPU 901 loads a program from the recording block 908 for example into the RAM 903 through the input/output interface 905 and the bus 904 and executes the loaded program in the computer 900.

Programs to be executed by the computer 900 (or the CPU 901) may be recorded to the removable media 911 that is a package media and provided therein. In addition, programs may be provided through wired or wireless transmission media such as the local area network, the Internet, and the digital satellite broadcasting.

In the computer 900, loading the removable media 911 on the drive 910 installs programs into the recording block 908 through the input/output interface 905. In addition, programs may be received at the communication block 909 through wired or wireless transmission media to be installed in the recording block 908. Alternatively, programs may be installed in the ROM 902 or the recording block 908 in advance.

It should be noted that the programs to be executed by the computer 900 may be executed in a time-dependent manner in the sequences described herein or in parallel or on an on-demand basis.

It should be noted that the programs to be executed by the computer 900 need not always be executed in a time-dependent manner in the sequence described in the flowcharts attached hereto; these programs may be executed in a time-dependent manner in the sequences described herein or in parallel or on an on-demand basis (parallel processing or object processing, for example).

It should also be noted that each program may be executed by a single unit of computer or two or more units of computers in a distributed manner. Further, programs may be transferred to a remote computer for execution.

It should be noted that a "system" as used herein denotes a collection of two or more component elements (apparatuses, modules (parts), and the like) and all component elements need not be arranged in a single housing. Therefore, two or more apparatuses housed in two or more different houses and interconnected by a network and one apparatus in which two or more modules are arranged in a single house each constitute a system.

While preferred embodiments of the present technology disclosed herein have been described using specific terms, such description is for illustrative purpose only, and it is to be understood that changes and variations may be made without departing from the spirit or scope of the following claims.

For example, the present technology may take a configuration of cloud computing in which one function is distributed among two or more apparatuses through a network to be jointly processed.

It should be noted that each of the steps described in the flowcharts attached hereto may be executed not only by a single apparatus, but also by two or more apparatuses in a distributed manner.

It should also be noted that, if two or more processing operations are included in one step, these processing operations may be executed not only by a single apparatus, but also by two or more apparatuses in a distributed manner.

It should be noted that the present technology may take the following configuration.

(1) A reception apparatus including:
a reception block configured to receive AV content;
a trigger information capture block configured to capture trigger information for controlling an operation of an application program to be executed in coordination with the AV content; and
a control block configured to control an operation of the application program in accordance with an operation mode specified in the trigger information.

(2) The reception apparatus according (1) above, wherein the operation mode is determined in accordance with a control scheme of the application program.

(3) The reception apparatus according to (2) above, wherein the operation mode includes a first mode for operating a standard application program obtained by standardizing the application program; and,
if the first mode is specified as the operation mode, the control block controls an operation of the standard application program in accordance with the trigger information.

(4) The reception apparatus according (3) above, wherein the trigger information includes additional information for use in controlling an operation of the standard application program; and
the control block controls an operation of the standard application program in accordance with the additional information.

(5) The reception apparatus according to (3) or (4) above, further including:
a storage block configured to store the standard application program,
the control block controlling an operation of the standard application program read from the storage block in accordance with the trigger information.

(6) The reception apparatus according to (3) or (4), further including:
an application capture block configured to capture the standard application program through a network,
the control block controlling an operation of the standard application program captured by the application capture block in accordance with the trigger information.

(7) The reception apparatus according to any one of (3) through (6) above, wherein the operation mode further includes
a second mode for controlling the application program by use of a table including control information for controlling an operation of the application program; and
a third mode for operating a specific application program not standardized.

(8) The reception apparatus according to any one of (1) through (7) above, wherein the trigger information is transmitted along with the AV content; and
the trigger information capture block extracts trigger information from data of the AV content.

(9) The reception apparatus according to any one of (1) through (7) above, further including:
a feature quantity extraction block configured to extract a feature quantity from data of the AV content,
the trigger information capture block capturing the trigger information corresponding to an identification result of the AV content identified by use of the feature quantity.

(10) A reception method of a reception apparatus including the steps of:
receiving AV content;
capturing trigger information for controlling an operation of an application program to be executed in coordination with the AV content; and
controlling an operation of the application program in accordance with an operation mode specified in the trigger information.

(11) A computer program for causing a computer to function as:
a reception block configured to receive AV content;
a trigger information capture block configured to capture trigger information for controlling an operation of an application program to be executed in coordination with the AV content; and
a control block configured to control an operation of the application program in accordance with an operation mode specified in the trigger information.

(12) A transmission apparatus including:
a trigger information generation block configured to generate trigger information for controlling an operation of an application program to be executed in coordination with AV content, the trigger information being specified with an operation mode defined in accordance with a control scheme of the application program; and
a transmission block configured to transmit the trigger information along with the AV content.

(13) A transmission method of a transmission apparatus including the steps of:
generating trigger information for controlling an operation of an application program to be executed in coordination with AV content, the trigger information being specified with an operation mode defined in accordance with a control scheme of the application program; and
transmitting the trigger information along with the AV content.

(14) A computer program for causing a computer to function as:
a trigger information generation block configured to generate trigger information for controlling an operation of an application program to be executed in coordination with AV content, the trigger information being specified with an operation mode defined in accordance with a control scheme of the application program; and
a transmission block configured to transmit the trigger information along with the AV content.

It should be understood by those skilled in the art that various modifications, combinations, sub-combinations and alterations may occur depending on design requirements and other factors in so far as they are within the scope of the appended claims or the equivalents thereof.

What is claimed is:

1. A reception apparatus comprising:
   at least one processor configured to
      receive a content including at least one of audio content or video content,
      extract fingerprint information from the content,
      provide the fingerprint information to a first server via a communication network,
      receive, from the first server in response to providing the fingerprint information, control information including an operation mode indicating whether or not the reception apparatus requires event information for controlling an operation of an application in coordination with outputting the content, and
      in response to the operation mode included in the received control information indicating that the reception apparatus requires the event information, acquire the event information from a location of the event information included in the control information, and acquire a location of the application based on the control information.

2. The reception apparatus according to claim 1, wherein the at least one processor is configured to receive the content from a broadcast network.

3. The reception apparatus according to claim 1, wherein the at least one processor is configured to extract the fingerprint information from at least one of:
   a video signal in the content;
   an audio signal in the content; or
   both the video signal and the audio signal in the content.

4. The reception apparatus according to claim 1, wherein the reception apparatus is a television set.

5. The reception apparatus according to claim 1, wherein the at least one processor is configured to set a media time of the content according to media time included in the control information.

6. The reception apparatus according to claim 3, further comprising
   outputting the content including at least one of display of the video signal and sound of the audio signal.

7. The reception apparatus according to claim 1, wherein
   in response to the operation mode included in the received control information indicating that the reception apparatus does not require the event information, the circuitry at least one processor is configured to determine whether the application is to be acquired from a location included in the control information or whether the application already stored in the reception apparatus is to be executed in coordination with outputting the content.

8. The reception apparatus according to claim 1, wherein the control information includes trigger information.

9. A reception method comprising:
   receiving a content including at least one of audio content or video content;
   extracting, by at least one processor of a reception apparatus, fingerprint information from the content;
   providing, by the at least one processor of the reception apparatus, the fingerprint information to a first server via a communication network;
   receiving, from the first server in response to providing the fingerprint information, control information including an operation mode indicating whether or not the reception apparatus requires event information for controlling an operation of an application in coordination with outputting the content; and
   in response to the operation mode included in the received control information indicating that the reception apparatus requires the event information, acquiring the event information from a location of the event information included in the control information, and acquiring a location of the application based on the control information.

10. A non-transitory computer-readable medium storing program codes that, when executed by a processor of a reception apparatus, cause the processor to perform a method, the method comprising:
    receiving a content including at least one of audio content or video content;
    extracting fingerprint information from the content;
    providing the fingerprint information to a first server via a communication network;
    receiving, from the first server in response to providing the fingerprint information, control information including an operation mode indicating whether or not the reception apparatus requires event information for controlling an operation of an application in coordination with outputting the content; and
    in response to the operation mode included in the received control information indicating that the reception apparatus requires the event information, acquiring the event information from a location of the event information included in the control information, and acquiring a location of the application based on the control information.

11. A transmission apparatus comprising:
    at least one processor configured to
       receive fingerprint information associated with a content including at least one of audio content or video content, the fingerprint information being received from a reception apparatus,
       generate control information in response to the fingerprint information, the control information including an operation mode indicating whether or not the reception apparatus requires event information for controlling operation of an application in coordination with outputting the content, such that, in response to the operation mode included in the generated control information indicating that the reception apparatus requires the event information, the reception apparatus acquires the event information from a location of the event information included in the control information and the reception apparatus acquires a location of the application based on the control information, and
       transmit the control information to the reception apparatus.

12. A transmission method of a transmission apparatus comprising:
    receiving, by at least one processor of the transmission apparatus, fingerprint information associated with a content including at least one of audio content or video content, the fingerprint information being received from a reception apparatus,
    generating, by the at least one processor of the transmission apparatus, control information in response to the fingerprint information, the control information including an operation mode indicating whether or not the reception apparatus requires event information for controlling an operation of an application in coordination with outputting the content, such that, in response to the operation mode included in received control information indicating that the reception apparatus requires the event information, the reception apparatus acquires the event information from a location of the event information included in the control information and the reception apparatus acquires a location of the application based on the control information, and transmitting the control information to the reception apparatus.

13. The reception method according to claim 9, further comprising receiving the content from a broadcast network.

14. The reception method according to claim 9, wherein the fingerprint information is extracted from at least one of:
a video signal in the content;
an audio signal in the content; or
both the video signal and the audio signal in the content.

15. The reception method according to claim 9, further comprising setting a media time of the content according to media time included in the control information.

16. The reception method according to claim 14, further comprising
outputting the content including at least one of display of the video signal and sound of the audio signal.

17. The reception method according to claim 9, further comprising, in response to the operation mode included in the received control information indicating that the reception apparatus does not require the event information, determining whether the application is to be acquired from a location included in the control information or whether the application already stored in the reception apparatus is to be executed in coordination with outputting the content.

18. The reception method according to claim 9, wherein the control information includes trigger information.

19. The reception method according to claim 9, wherein the reception apparatus is a television set.

* * * * *

UNITED STATES PATENT AND TRADEMARK OFFICE
CERTIFICATE OF CORRECTION

PATENT NO. : 11,206,457 B2
APPLICATION NO. : 15/854602
DATED : December 21, 2021
INVENTOR(S) : Naohisa Kitazato et al.

It is certified that error appears in the above-identified patent and that said Letters Patent is hereby corrected as shown below:

In the Claims

At Column 59, Lines 45-46, replace "the circuitry at least one" with --the at least one--

Signed and Sealed this
Twenty-second Day of August, 2023

Katherine Kelly Vidal
*Director of the United States Patent and Trademark Office*